US010521024B2

(12) United States Patent
Kinrot et al.

(10) Patent No.: US 10,521,024 B2
(45) Date of Patent: Dec. 31, 2019

(54) DEVICES AND METHODS FOR GENERATING INPUT

(71) Applicant: OTM TECHNOLOGIES LTD., Ra'anana (IL)

(72) Inventors: Opher Kinrot, Raanana (IL); Uri Kinrot, Hod Hasharon (IL); Gilad Lederer, Herzliya (IL)

(73) Assignee: OTM TECHNOLOGIES LTD., Ra'Anana (IL)

( * ) Notice: Subject to any disclaimer, the term of this patent is extended or adjusted under 35 U.S.C. 154(b) by 96 days.

(21) Appl. No.: 15/544,793

(22) PCT Filed: Jan. 19, 2016

(86) PCT No.: PCT/IB2016/000096
§ 371 (c)(1),
(2) Date: Jul. 19, 2017

(87) PCT Pub. No.: WO2016/116810
PCT Pub. Date: Jul. 28, 2016

(65) Prior Publication Data
US 2018/0004309 A1    Jan. 4, 2018

Related U.S. Application Data

(60) Provisional application No. 62/268,807, filed on Dec. 17, 2015, provisional application No. 62/105,401, filed on Jan. 20, 2015.

(51) Int. Cl.
*G06F 3/03* (2006.01)
*G06F 3/038* (2013.01)
(Continued)

(52) U.S. Cl.
CPC .......... *G06F 3/0325* (2013.01); *G06F 3/0304* (2013.01); *G06F 3/038* (2013.01);
(Continued)

(58) Field of Classification Search
CPC .. G06F 3/0325; G06F 3/0386; G06F 3/03542; G06F 3/0308; G06F 3/038;
(Continued)

(56) References Cited

U.S. PATENT DOCUMENTS 5,247,137 A    9/1993 Epperson
7,342,575 B1   3/2008 Hartwell et al.
(Continued)

FOREIGN PATENT DOCUMENTS

EP    0 690 409    1/1996
EP    0 738 950   10/1996
(Continued)

OTHER PUBLICATIONS

International Search Report from the European Patent Office for International Application No. PCT/IB2016/000096, dated Jun. 20, 2016.

*Primary Examiner* — Aneeta Yodichkas
(74) *Attorney, Agent, or Firm* — Finnegan, Henderson, Farabow, Garrett & Dunner LLP

(57) ABSTRACT

Devices and methods are disclosed for generating input. In one implementation, a stylus is provided for generating writing input. The stylus includes an elongated body having a distal end, and a light source configured to project coherent light on an opposing surface adjacent the distal end. The stylus further includes at least one sensor configured to measure first reflections of the coherent light from the opposing surface while the distal end moves in contact with the opposing surface, and to measure second reflections of the coherent light from the opposing surface while the distal end moves above the opposing surface and out of contact with the opposing surface. The stylus also includes at least one processor configured to receive input from the at least one sensor and to enable determining three dimensional (Continued)

positions of the distal end based on the first reflections and the second reflections.

19 Claims, 22 Drawing Sheets

(51) Int. Cl.
    *G06F 3/0354*     (2013.01)
    *G06K 9/22*     (2006.01)
    *G06K 9/32*     (2006.01)
    *G09G 5/26*     (2006.01)
    *G09G 5/30*     (2006.01)

(52) U.S. Cl.
    CPC .......... *G06F 3/0308* (2013.01); *G06F 3/0386* (2013.01); *G06F 3/03542* (2013.01); *G06F 3/03545* (2013.01); *G06K 9/222* (2013.01); *G06K 9/224* (2013.01); *G06F 2203/0384* (2013.01); *G06K 9/3283* (2013.01); *G09G 5/26* (2013.01); *G09G 5/30* (2013.01)

(58) Field of Classification Search
    CPC .............. G06F 3/03545; G06F 3/0304; G06F 2203/0384; G06K 9/224; G06K 9/222; G06K 9/3283; G09G 5/30; G09G 5/26
    See application file for complete search history.

(56) References Cited

U.S. PATENT DOCUMENTS

| | | |
|---|---|---|
| 2002/0148655 A1 | 10/2002 | Cho et al. |
| 2005/0289225 A1 | 12/2005 | Zhuang et al. |
| 2009/0251338 A1 | 10/2009 | Marggraff et al. |
| 2009/0267896 A1 | 10/2009 | Hiramatsu |
| 2011/0050573 A1 | 3/2011 | Stavely et al. |
| 2011/0143671 A1 | 6/2011 | Hsieh |
| 2011/0256831 A1 | 10/2011 | Hsieh |
| 2013/0257777 A1 | 10/2013 | Benko et al. |
| 2013/0321356 A1 | 12/2013 | Al-Sharif et al. |
| 2014/0146021 A1 | 5/2014 | Trethewey et al. |
| 2015/0009146 A1 | 1/2015 | Song |
| 2015/0293612 A1* | 10/2015 | Chang ................ G06F 3/03545 345/158 |

FOREIGN PATENT DOCUMENTS

| | | |
|---|---|---|
| EP | 1 255 185 | 11/2002 |
| EP | 1 388 779 | 2/2004 |
| EP | 1 403 755 | 3/2004 |
| EP | 1 404 106 | 3/2004 |
| WO | WO 03/058394 | 7/2003 |

\* cited by examiner

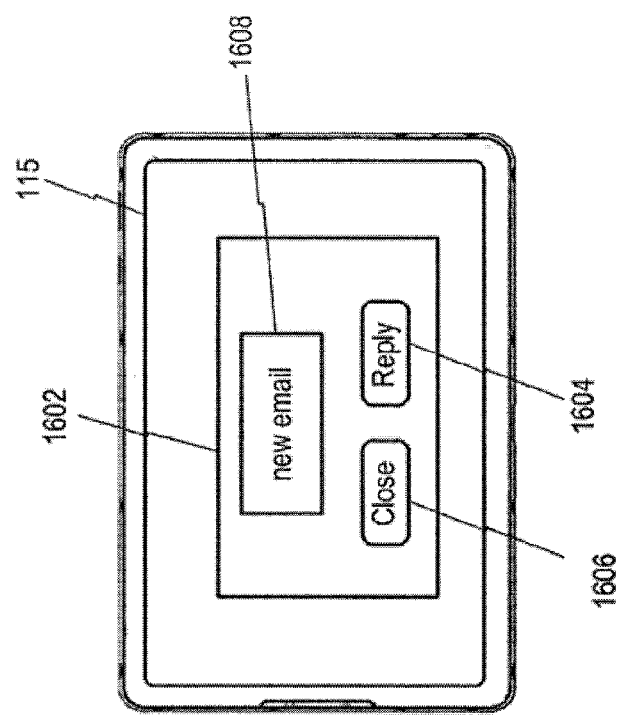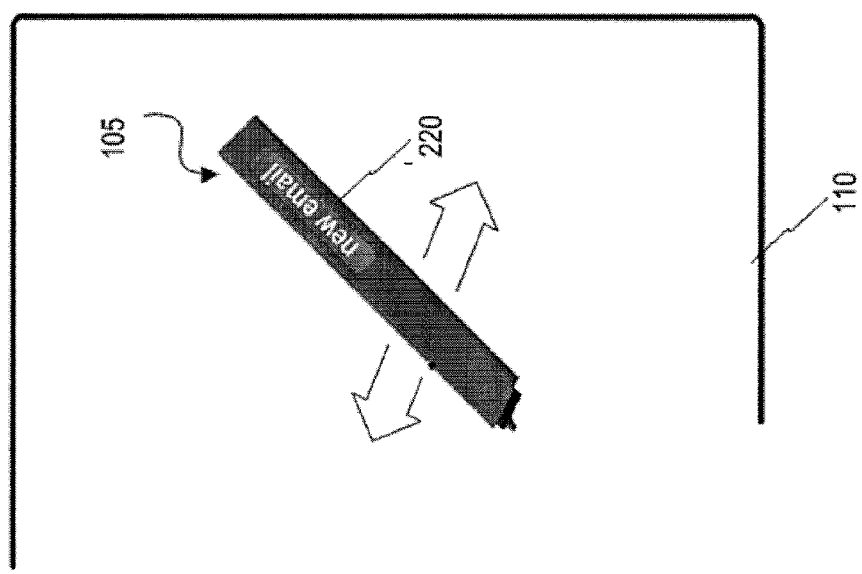
FIG. 16A

DEVICES AND METHODS FOR GENERATING INPUT

CROSS REFERENCE TO RELATED APPLICATIONS

This application claims the benefit of priority of U.S. Provisional Patent Application No. 62/105,401, filed on Jan. 20, 2015; and U.S. Provisional Patent Application No. 62/268,807, filed on Dec. 17, 2015, both of which are incorporated herein by reference in their entirety.

BACKGROUND

I. Technical Field

This disclosure generally relates to devices and methods for providing input. More particularly, this disclosure relates to devices and methods for providing input by determining a three dimensional position of a stylus.

II. Background Information

Smartphone and tablet use has grown rapidly and, in many aspects, these devices have replaced traditional computers (e.g., laptops and PCs). One advantage of traditional computers over smartphones and tablets is ease of text input. While smartphones and tablets have built-in touch keyboards in their touchscreen interfaces, the touch keyboards are significantly less convenient than traditional keyboards. The characters in these touch keyboards are positioned closely together and the user often needs to access different versions of the touch keyboard for special characters and numerals. In addition, to display the touch keyboard, the area displaying previously-entered text is reduced on the touchscreen interface. All these limitations make typing text using touch keyboards a laborious and potentially error prone task.

Understanding the limitations of a user's finger as an input device, various companies offer different types of surfaces-dependent styluses as an input device for smartphones and tablets. A common type of surfaces-dependent styluses is a capacitive-based stylus. The capacitive-based stylus works in the same way as the user's finger; it has a capacitive tip that distorts the screen's electrostatic field when touching it. While providing better accuracy than the user's finger, capacitive-based styluses are still far from being an ideal solution since all capacitive-based styluses are limited to writing on the same area used for displaying previously-entered text.

Another type of surfaces-dependent styluses is a camera-based stylus. The camera-based stylus can electronically save copies of written notes when the camera-based stylus is paired with a coded surface. An example of a coded surface is a special paper that has dots that a camera can use to track movement of the stylus. In another example, a camera-based stylus may have a camera with a very high resolution that can track an LCD display output and identify individual pixels on the LCD display. Again, the camera-based stylus is limited to specific surfaces.

The disclosed devices and methods are directed to provide a new type of stylus; one that is not bound to any surface and solves one or more problems outlined above.

SUMMARY

Embodiments consistent with the present disclosure provide devices and methods for generating input by determining three dimensional positions of a stylus. In accordance with a disclosed embodiment, a stylus is provided for generating writing input, the stylus may include an elongated body having a distal end, and a light source configured to project coherent light on an opposing surface adjacent the distal end. The stylus may further include at least one sensor configured to measure first reflections of the coherent light from the opposing surface while the distal end moves in contact with the opposing surface, and to measure second reflections of the coherent light from the opposing surface while the distal end moves above the opposing surface and out of contact with the opposing surface. The stylus also includes at least one processor configured to receive input from the at least one sensor and to enable determining three dimensional positions of the distal end based on the first reflections and the second reflections.

Embodiments consistent with the present disclosure provide devices and methods for generating writing input. In accordance with a disclosed embodiment, a stylus is provided for generating writing input. The stylus may include a housing having a distal end, and a light source configured to project coherent light on at least one opposing surface adjacent the distal end. The stylus may further include at least one sensor configured to measure at least three non-collinear reflections of the coherent light from the at least one surface when the distal end is moved relative to the at least one opposing surface. The stylus may also include at least one processor configured to determine changing positions of the distal end based on the at least three non-collinear reflections. The at least one processor is further configured to determine, based on the changing positions of the distal end during a first writing input period, text input resulting from changing positions of the distal end in a first area of the at least one surface, and cause text captured during the first writing input period to be presented on a display. The at least one processor is further configured to determine, based on the changing positions of the distal end during a second writing input period after the housing is lifted and returned to a second area of the at least one surface non-contiguous with the first area, text input resulting from changing positions of the distal end in the second area, and cause text captured during the second writing input period to be contiguously presented on the display with the text captured during the first writing input period despite that the text input during the first writing input period and text input during the second writing input period did not occur contiguously.

Embodiments consistent with the present disclosure provide devices and methods for generating text input from multiple surfaces. In accordance with a disclosed embodiment a stylus is provided for generating text input from multiple surfaces. The stylus may include a housing having a distal end and at least one sensor. The at least one sensor is configured to measure first data indicative of changing positions of the distal end when the distal end is moved relative to a first opposing non-coded surface constructed of a first material, wherein the first data includes information distinguishing between movement of the distal end in contact with the first opposing non-coded surface and movement of the distal end out of contact with the first opposing non-coded surface, and measure second data indicative of positions of the distal end when the distal end is moved relative to a second opposing surface constructed of a second material different from a material of the first opposing non-coded surface, wherein the second data includes information distinguishing between movement of the distal end in contact with the second opposing surface and movement of the distal end out of contact with the second opposing surface. The stylus may further include a transmitter configured to communicate with a paired device and at least one processor. The at least one processor is configured to generate from the first data indicative of the changing positions relative to the first opposing non-coded surface a series of first strokes by the distal end, and generate from the second data indicative of the changing positions relative to the second opposing surface a series of second strokes by the distal end. The at least one processor is further configured to transmit the first strokes and the second strokes via the transmitter to the paired device to cause, on a third surface associated with the paired device, a melding of the first strokes and the second strokes for display on the third surface as if the first strokes and the second strokes occurred on a common surface.

Embodiments consistent with the present disclosure provide devices and methods for determining three dimensional positions of a stylus. In accordance with a disclosed embodiment, a three-dimensional stylus positioning system is provided. The stylus may include a housing having a distal end, and a light source within the housing configured to project coherent light on a surface opposing the distal end. The stylus may further include at least one sensor within the housing and configured to measure reflections of the coherent light from the opposing surface as the distal end is moved relative to the opposing surface, and at least one movement sensor within the housing configured to detect acceleration and/or rotation as the distal end is moved relative to the opposing surface. The stylus may also include at least one processor configured to determine three dimensional positions of the distal end based on coherent light reflections information received from the at least one sensor and acceleration information received from the at least one movement sensor.

Embodiments consistent with the present disclosure provide devices and methods for triggering predefined functionality in a paired device. In accordance with a disclosed embodiment, a stylus configured to trigger predefined functionality in a paired device is provided. The stylus may include a housing having a distal end, a light source in the housing configured to project coherent light on a non-coded surface opposing the distal end, and at least one sensor configured to receive reflections of the coherent light from the non-coded surface when the distal end is moved in a first manner in contact with the non-coded surface and when the distal end is moved in a second manner, out of contact with the non-coded surface. The stylus may further include a transmitter configured to communicate with the paired device and at least one processor configured to determine three-dimensional positions of the stylus and to send to the paired device, via the transmitter, information relating to three-dimensional positions, wherein the information represents a three-dimensional stylus gesture that corresponds to at least one predefined function of the paired device, such that transmittal of the information to the paired device causes the paired device to execute the predefined function.

Embodiments consistent with the present disclosure provide devices and methods for controlling a plurality of unrelated devices. According to a disclosed embodiment, a stylus for controlling a plurality of unrelated devices is provided. The stylus may include a housing having a distal end configured for movements on a plurality of differing non-coded surfaces constructed of differing materials, at least one sensor in the housing configured to detect in three dimensions the movements when the distal end is in contact with at least one of the plurality of non-coded surfaces and when the distal end is out of contact with the at least one non-coded surface, and a transmitter configured to selectively communicate with the plurality of unrelated devices. The stylus may further include at least one processor. In some embodiments, the at least one processor may be configured to enable the transmitter to be selectively and wirelessly paired with the plurality of unrelated devices, and based on a selection by a user, control, with movements of the distal end, at least one of the plurality of unrelated devices. The processor may be further configured to receive a user-selection of an unrelated device that the user desires to control using movements of the distal end, determine control commands for the selected unrelated device from user movements of the distal end relative to the at least one non-coded surface, instruct the transmitter to communicate with the selected unrelated device, and send, via the transmitter, the movements-based control commands to the selected unrelated device to thereby permit control of the selected unrelated device based on the movements relative to the at least one non-coded surface.

Consistent with other disclosed embodiments, non-transitory computer readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 14 is a schematic illustration that depicts coordinate systems of the example stylus shown in FIG. 1 and the surface it moves relative to;

FIG. 16A is a schematic illustration that depicts an example of a predefined functionality being triggered by a stylus gesture;

DETAILED DESCRIPTION

Figure 1:
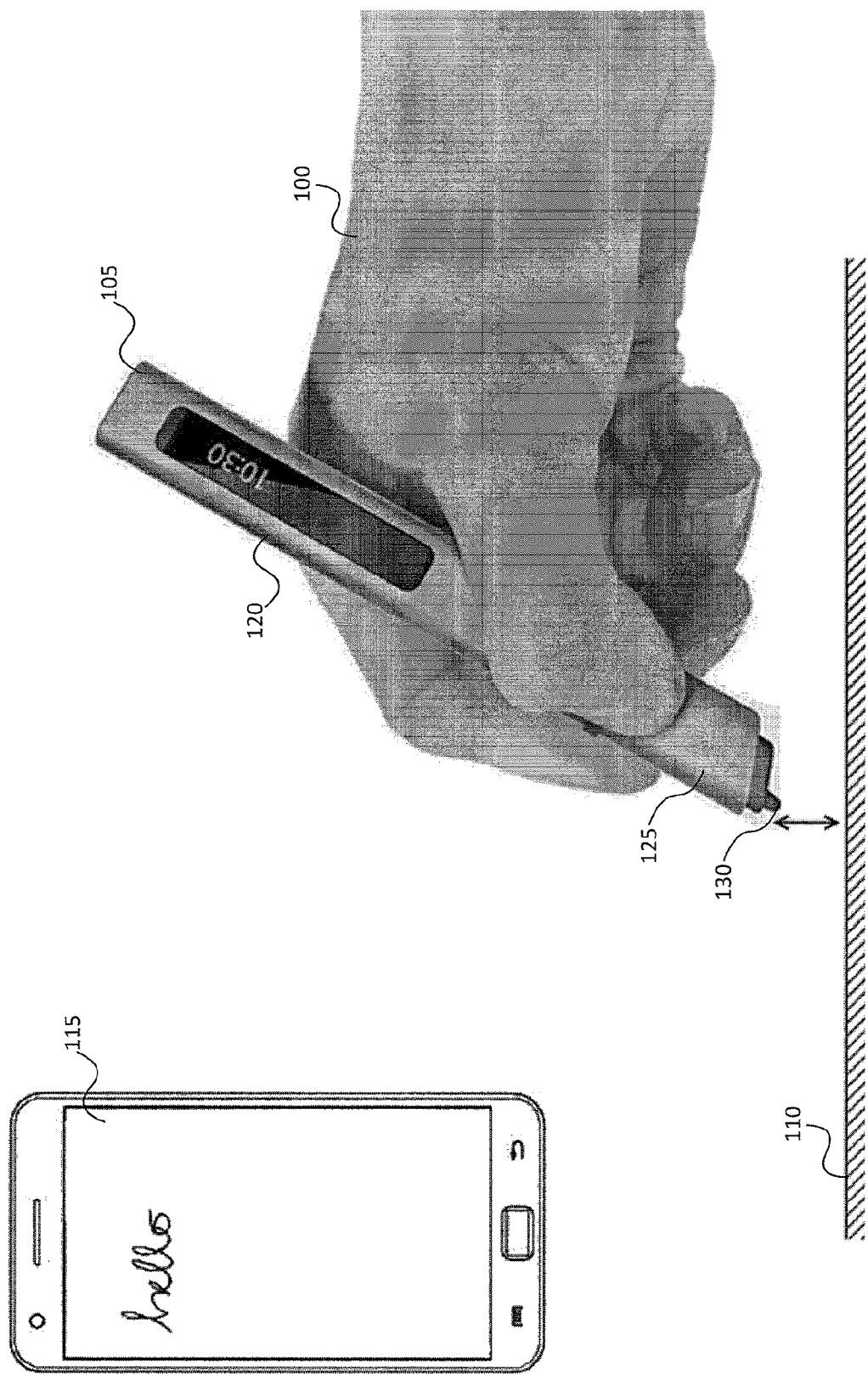
FIG. 1 is a schematic illustration of a user using an example stylus to generate writing input for an associated smartphone.

The following detailed description refers to the accompanying drawings. Wherever possible, the same reference numbers are used in the drawings and the following description to refer to the same or similar parts. The disclosure is not limited to the described embodiments and examples. Instead, the proper scope is defined by the appended claims.

Disclosed embodiments may involve a stylus. As used herein, the term "stylus" broadly includes any structure that is used for data input. By way of example only, a stylus may be formed in the shape of a pen or pencil, but need not assume such a shape. The cross section of a stylus may be round, square, triangular, rectangular, oval, or any other shape capable of being grasped by a hand of a user. The width of the stylus may be uniformed or varied and may have a flattened appearance where a thickness is substantially greater or smaller than the width. The edges of a stylus may be abrupt or may be curved. One example of a stylus according to the present disclosure is depicted in FIG. 1.

In some embodiments, the stylus may be used for generating input. In one example the stylus may generate writing input. As used herein the term "generating writing input" broadly includes creating any type of input that could, for example, have been drawn with a pen on a piece of paper. Examples of types of writing input may include: text input (e.g., words, sentences), punctuation input (e.g., dots, commas), format input (e.g., underlines, highlights), emoji input (e.g., smiley, symbols), text editing input (e.g., delete text, copy-paste text), drawing input (e.g., free hand sketching), commands input, and more. However, unlike a pen, writing input as used herein may not leave any discernible marking on the surface on which the stylus is moved. Rather, as discussed later in greater detail, movements of the stylus may be sensed electronically, and data derived from those movements may constitute "writing input," despite the lack of markings on a writing surface. Alternatively, other embodiments may employ a stylus with a marking element.

In other embodiments, the stylus may generate input for controlling a paired device. The paired device may include a portable computing device with a screen; for example, a smartwatch, a smartphone, a tablet, a television, a telephone, a personal computer, a laptop, a home entertainment device, or any other portable or non-portable electronic device for which there is a desire to exert control or transmit information. In other embodiments, the paired device may include a computing device without a screen; for example, a smart lamp, smart clothing, a smart appliance (e.g., refrigerator, freezer, washer, dryer, air conditioner, dishwasher, HVAC system (thermostat) or any other wearable or non-wearable electronic device for which there is a desire to exert control or transmit information. As used herein the term "controlling a paired device" broadly includes transmitting information to a device having a receiver which may cause the device to execute an action. Examples of the actions may include, controlling operational modes of the prior mentioned appliances, changing the brightness of a smart lamp, varying the temperature of a smart shirt, activating a screen of the paired device, opening a specific application in the paired device, causing text captured to be presented on the screen of the paired device, initiating a communication session, performing a text editing function, or any other action that alters in any way the mode, function, or display of the paired device.

A stylus in accordance with embodiments of the disclosure may include a housing having a distal end. As used herein the term "housing" broadly includes any casing or enclosure. In one example, the housing may have an elongated portion that is capable of being grasped in the hand of a user, with a length substantially longer than a width or thickness. The housing may be tubular such as may be consistent with the shape of a barrel of a pen. The elongated portion may have a cross-section that is round, triangular, square, rectangular, oval, or any other regular or irregular shape capable of being grasped. The cross section may be flat, with a width substantially greater than a thickness. Such a structure may permit repeatable, consistent grasping during use. A distal end of the housing may be arranged to be moved over one or more multiple surfaces to generate input. The distal end may share dimension with other portions of the housing or may, for example, include a tip or some other structure with lesser dimension than a typical dimension of the housing or the elongated portion.

Consistent with disclosed embodiments, the stylus may include a light source configured to project coherent light. The light source may include any device configured to emit coherent light. For example, one type of light source that may be used is a vertical-cavity surface-emitting laser (VCSEL). Another type of light source that may be used is an external cavity diode laser (ECDL). In some examples, the light source may include a laser diode configured to emit light at a wavelength between about 650 nm and 1000 nm. Alternatively, the light source may include a laser diode configured to emit light at a wavelength between 800 nm and 900 nm.

As used herein the term "projecting coherent light" may include radiating a monochromatic wave having a well-defined phase relationship across its wavefront) in a defined direction. The stylus may include optics for directing the coherent wave towards an opposing surface adjacent the distal end. The spot diameter of the projected light, when the distal end is spaced about 10 mm from the opposing surface, may be between 1.5 mm to 8 mm. In addition, the light projected from the light source may have a coherence length larger than 10 mm, higher than 25 mm, higher than 50 mm, or higher than 75 mm. In some embodiments, the light source may project coherent light on an opposing surface adjacent the distal end. The term "surface" includes any type of tangible material, such as a surface made of wood, metal, ceramic, plastic, paper, fabric, glass, crystal, stone, or any other synthetic or natural material.

In disclosed embodiments, the stylus may include at least one sensor configured to measure reflections of the coherent light. The term "sensor" broadly includes any device, element, or system capable of determining information associated with movement. Such movement may include, for example, the changing positions of the distal end when the stylus is moved relative to the opposing surface. In one example, the at least one sensor may include an ultrasonic transducer that converts ultrasound waves to electrical signals. In this example, a sensor may generate high-frequency sound waves and evaluate the echo which is received back. By measuring the time interval between sending the signal and receiving the echo, the stylus may determine the changing positions of the distal end. In another example, which is described in greater detail below with reference to FIG. 3, the at least one sensor may include at least one light detector for measuring reflections of coherent light projected from an associated light source to determine the changing positions of the distal end. The term "light detector" includes any device configured to measure properties (e.g., power, frequency) of electromagnetic waves and to generate an output relating to the measured properties.

In some embodiments, the at least one sensor may include a plurality of light detectors. Each light detector may have a similar construction or the light detectors may be of differing constructions that are electrically connected or disconnected from each other. For example, the light detectors may be of a different size or a different shape. When more than one light detector is used, the light detectors may be configured to operate independently or collaboratively. The light detectors may be coupled electrically, optically, mechanically or by other means that permit them to interact. As used herein, the term "measuring reflections of the coherent light" may include receiving at least part of the coherent light reflected from the opposing surface, and collecting data associated with the reflections of the coherent light. The collected data may be provided to a processor so that the changing positions of the stylus can be ascertained by the processor.

In some embodiments, the at least one sensor may measure three non-collinear reflections of the coherent light. Two non-collinear reflections are reflections from a common plane but not along a same line of action. The two non-collinear reflections may be used to determine a two dimensional position of the distal end. Similarly, three non-collinear reflections are reflections from a common space but not along a same plane of action. The three non-collinear reflections may be used to determine a three dimensional position of the distal end.

Consistent with disclosed embodiments, the stylus may include or communicate with at least one processor configured to determine the three dimensional positions of the distal end based on the reflections. The at least one processor may constitute any physical device having an electric circuit that performs a logic operation on input or inputs. For example, the at least one processor may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by at least one processor may, for example, be pre-loaded into a memory integrated with or embedded into the controller or may be stored in a separate memory. The memory may comprise a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the memory is configured to store information representative of the movements of stylus. In one example, the memory may store three-dimensional pattern information relating to a user's typical handwriting. In another example, the memory may store data indicative of the changing positions of the distal end when the stylus is out of reach of the paired device.

In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

In some embodiments, the term "determining three dimensional positions of the distal end" may include determining the coordinates (X, Y, and Z) of the distal end relative to a reference point in the surface. Alternatively, the term "determining three dimensional positions of the distal end" may include determining the incremental position change (dX, dY, and dZ) of the distal end relative to a reference point in the surface. For example, a three-dimensional movement of the stylus may be considered as three movements along three orthogonal directions. The processor may apply one or more algorithms to estimate a phase shift by comparing the reflections from the surface and a reflection from a reference plane. Specifically, the phase of a portion of a beam whose phase is not changed may be compared with the phase of a portion which is changed, to determine the direction of motion along three dimensions. In other embodiments, the term "determining three dimensional positions of the distal end" may include the collection of data indicative of the speed, direction, and/or location of the distal end from the at least one sensor; and transmitting the collected data to the paired device.

In some embodiments, the stylus may generate a series of strokes from data indicative of the changing positions relative to the opposing surface. As used herein, the term "generating series of strokes" may include participating in the process of causing indications of stylus movement to be presented on a display of the paired device. In one example, the series of strokes may be used to generate writing. Specifically, the stylus may transmit to the paired device a data stream of the X and Y coordinates of a cursor position. The data stream may be used by the paired device to present graphical lines on its display. The data stream may be transmitted substantially in real-time, such that any movement of the stylus relative to the opposing surface will result in movement of the curser in the display of the paired device. In addition, the data stream may include additional values, such as the force applied against the opposing surface and/or the location of the distal end along a Z axis. Alternatively, the stylus may provide something less than all the information needed to present the writing input on a display. For example, the stylus may transmit to the paired device raw data stream collected from the at least one sensor, thus enabling the paired device to determine the X and Y coordinates of a cursor or a stylus tip position.

In another example, generating series of strokes may be part of the process of controlling a paired device. For example, the data stream may be used to cause the device to execute an action. In addition, the data stream may include additional values, such as the force applied against the opposing surface. For example, an identified value of force above a predetermined threshold may represent a selection, similar to a mouse click action. Alternatively, the stylus may provide something less than all the information needed to control the paired device. For example, the stylus may transmit to the paired device raw data collected from the at least one sensor.

FIG. 1 illustrates a user 100 holding a stylus 105 opposing a surface 110. Consistent with some embodiments, user 100 may move stylus 105 relative to surface 110 to generate writing input. The writing input may concurrently (or at a later time) be displayed on the display of a paired device 115. Consistent with other embodiments, user 100 may move stylus 105 relative to surface 110 to generate input for controlling paired device 115. Examples of commands may include: scroll up/down, select an item, open an application, execute a function, and more.

As shown in FIG. 1, user 100 holds stylus 105 similar to holding a regular pen. In some embodiments, stylus 105 may include a housing 120 having a distal end 125 and a tip 130. Housing 120 may have an elongated body with a flattened shape which facilitates repeatable grasping orientation by a user to generate input when a distal end 125 is moving relative to surface 110. As described in greater detail below, stylus 105 may generate input when tip 130 is in contact with surface 110, and even when tip 130 is out of contact with surface 110. By generating input when tip 130 is out of contact with surface 110, the present disclosure provides a solution that overcomes some of the drawbacks of surface-dependent styluses.

Figure 2A:
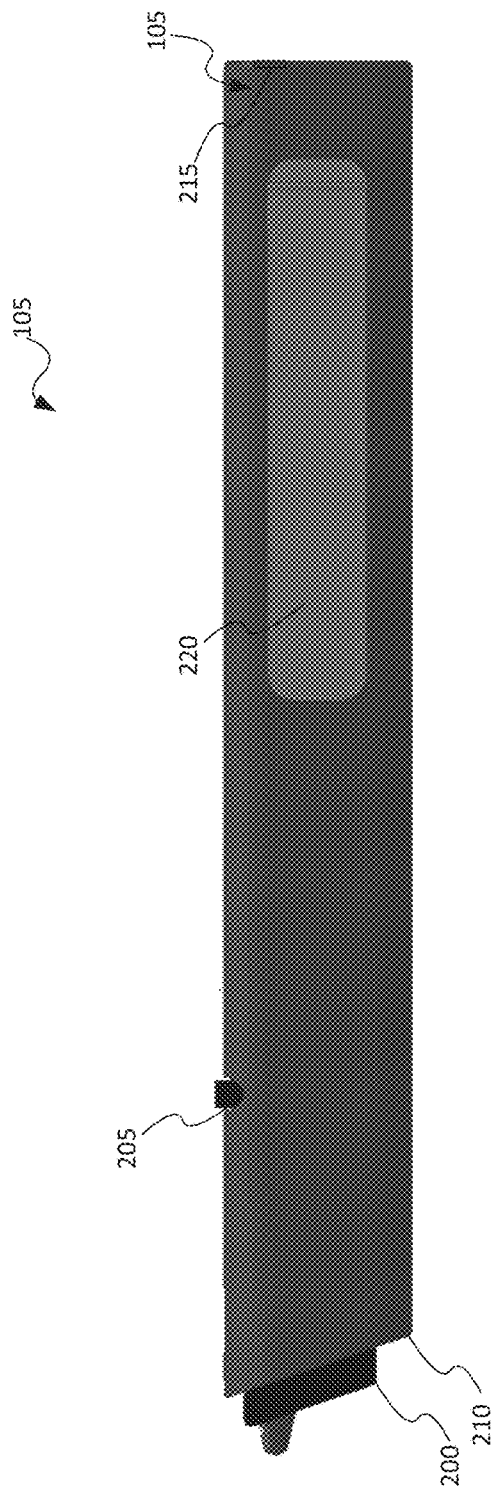
FIG. 2A is a schematic side-view illustration of the example stylus shown in FIG. 1.
Figure 2B:
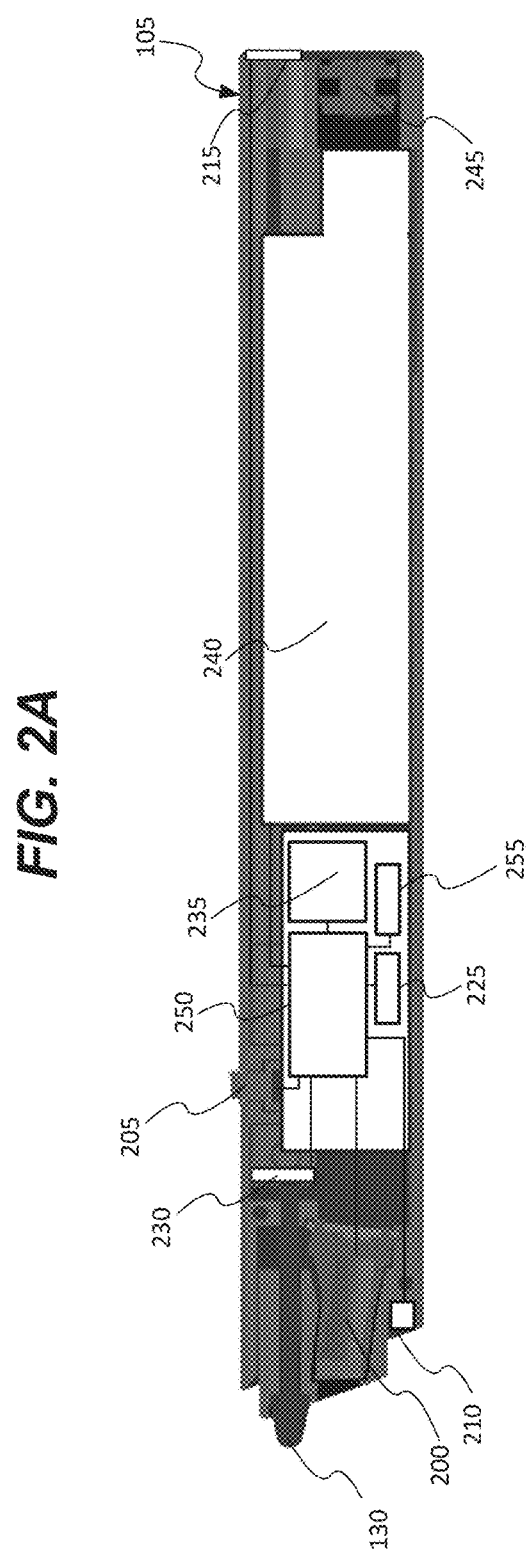
FIG. 2B is a schematic cross-section illustration of the components of the example stylus shown in FIG. 1.

FIG. 2A and FIG. 2B depict various components of stylus 105. Specifically, FIG. 2A is a schematic side-view illustration of stylus 105, and FIG. 2B is a cross-section illustration of stylus 105. As shown in FIG. 2A, stylus 105 may include a sensor 200, a button 205, a microphone 210, a speaker 215, and a screen 220. Additionally, as shown in FIG. 2B, stylus 105 may further include a transmitter 225, a force sensor 230, a movement sensor 235, a mobile power source 240, a charging connector 245, a processor 250, and a memory 255. The various components in stylus 105 may be coupled by one or more communication buses or signal lines. One skilled in the art will appreciate that the configuration of stylus 105 may have numerous variations and modifications.

As shown in FIG. 2B, stylus 105 may include button 205 for accepting additional type of input from user 100. Button 205 may take the form of one or more press buttons, switches, touch sensitive controls, scroll wheels, and the like. In one example, button 205 may be an on/off switch. In another example, button 205 may be a scroll wheel that enables user 100 to select from among a plurality of paired devices 115. In some embodiments, button 205 may serve as a right mouse for menu control in applications running on paired device 115. Alternatively, when user 100 uses button 205 simultaneously with moving distal end 125 relative to surface 110, it can be used to send commands to processor 250.

In some embodiments, stylus 105 may also function as a head set. Thus, according to these embodiments stylus 105 may include microphone 210 located adjacent to a first distal end of stylus 105 and speaker 215 located adjacent to a second distal end of stylus 105. In one example, user 100 can use stylus 105 for accepting incoming calls from paired device 115 while continuing to enable generating writing input. In other embodiments, microphone 210 may be used for detecting spoken voice commands. Examples of voice commands may include: changing the color of the writing input, changing the size of the writing input, undo last action, and more.

Consistent with some embodiments, stylus 105 includes screen 220 that may or may not be a touchscreen. Screen 220 may be configured to present information and notifications from paired device 115. For example, screen 220 may present incoming text messages, calendar reminders, and incoming emails. User 100 can select to respond to the incoming notifications using paired device 115 or stylus 105. When using stylus 105, user 100 can respond to the incoming notifications either by touch control of screen 220, or by generating a writing input. For example, in response to a text message sent to paired device 115 and presented on screen 220, user 100 may use stylus 105 to scribble a smiley emoji. In other embodiments, screen 220 allows quick switching between various paired devices 115. For example, a representation of the currently paired device 115 may be shown on screen 220. User 100 can use stylus 105 to interact with a first paired device (e.g., smartphone) or switch to interaction with a second paired device (e.g., TV). The shift of control between the various paired devices 115 can happen by selecting an icon on screen 220 or by using button 205.

As shown in FIG. 2B, stylus 105 may include transmitter 225. The term "transmitter" as used herein refers to any device capable of wirelessly transmitting signals to paired device 115. In some embodiments of the disclosure, transmitter 225 may also be capable of wirelessly transmitting and receiving signals from paired device 115 (e.g., a transceiver). Alternatively, stylus 105 may include transmitter 225 and a separate receiver for communicating with paired device 115 using one or more of the following exemplary short range communication standards: Bluetooth, infrared, WiFi, LiFi, near field communication, ultraband, and Zigbee. Additionally, embodiments of the disclosure may involve transmitters, receivers, or transceivers that use other known or future wireless protocols.

Stylus 105 may include force sensor 230 and movement sensor 235. The term "force sensor" may include any type of device configured to measure a parameter representative of the force applied by tip 130 on surface 110. For example, force sensor 230 may include a Force Sensitive Resistor (FSR) that changes its resistive value depending on how much force is applied by tip 130 on surface 110. The read rate of force sensor 230 may be between 50 Hz and 2000 Hz. The term "movement sensor" may include any device configured to measure the linear and/or angular acceleration of stylus 105 in a number of predefined directions. In one example, movement sensor 235 may include a plurality of accelerometers and is configured to detect acceleration in at least two (e.g., three) non-collinear directions. In addition, movement sensor 235 may also include a plurality of gyroscopes, disposed substantially orthogonally with respect to each other, and configured to detect rotations in three directions. Force sensor 230 and movement sensor 235 may provide additional information that may be used to better determine the input from user 100. Further details regarding force sensor 230 and movement sensor 235 are provided below with reference to FIGS. 13-15.

In some embodiments, stylus 105 may be powered by power source 240. The term "power source" includes any device that can repeatedly store and dispense electric power, including but not limited to chemical batteries (e.g., a lead-acid battery, a lithium ion battery, a nickel-metal hydride battery, a nickel-cadmium battery). In some embodiments, the power source may be mobile, which means that stylus 105 can be easily carried by a hand (e.g., the total weight of power source 240 may be less than a pound). The mobility of the power source enables user 100 to use stylus 105 in a variety of situations. Consistent with some embodiments, user 100 may recharge power source 240 using charging connector 245. Charging connector 245 may be compatible with one or more charging cables and/or with an inductive charging station. In other embodiments, power source 240 may include one or more energy harvesting devices for converting ambient energy into electrical energy (e.g., human vibration units that convert the handwriting movement to electricity, etc.).

In some embodiments, stylus 105 may generate input from data indicative of the changing positions of distal end 125 relative to surface 110. Processor 250 may determine the data indicative of the changing positions of distal end 125 based on information measured by stylus 105. In one example, stylus 105 may include processor 250 within housing 120. In other examples, stylus 105 may communicate directly or indirectly with processor 250 located remotely from stylus 105. Further details regarding the process of determining the data indicative of the changing positions of distal end 125 is provided below with reference to FIG. 13.

Figure 3:
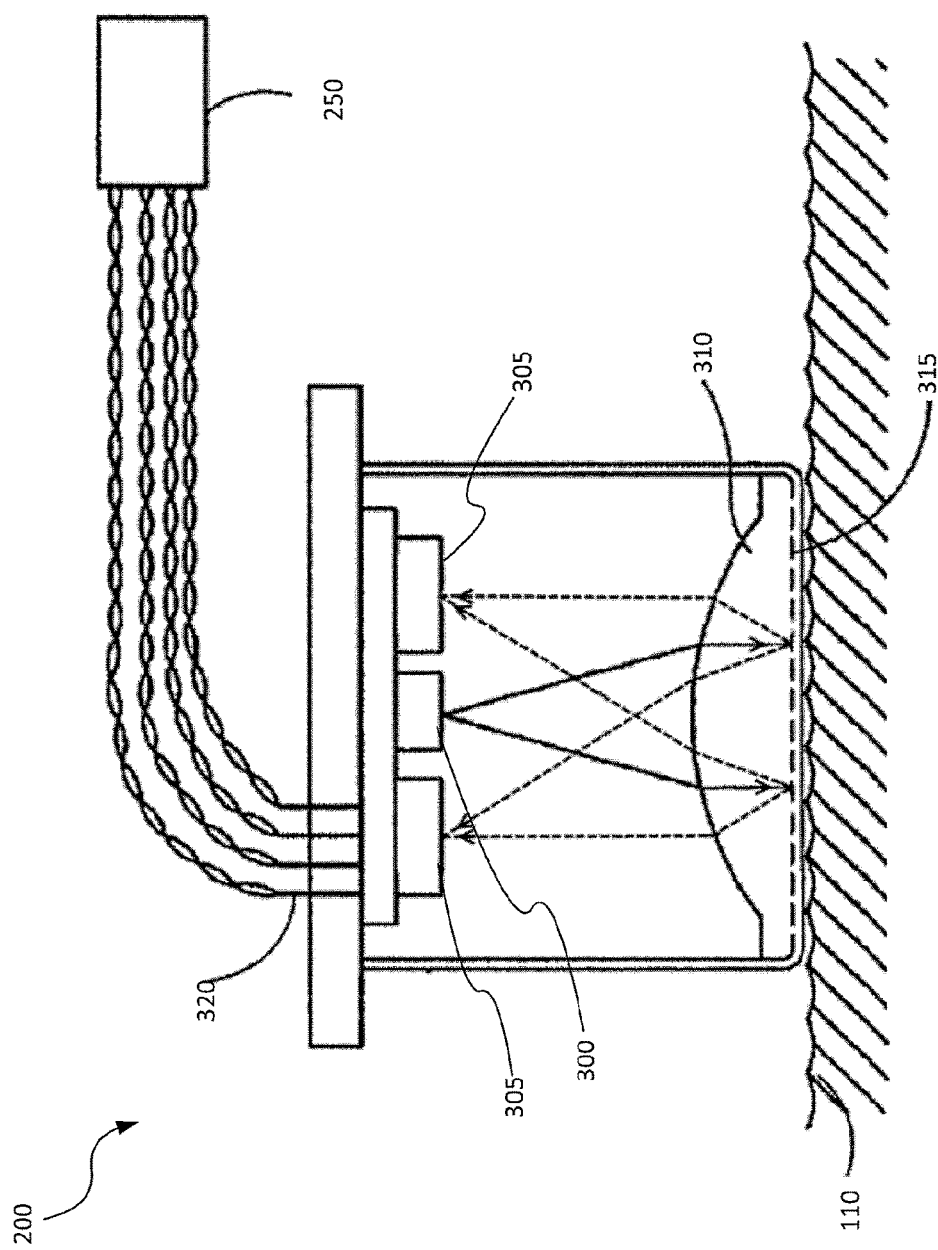
FIG. 3 is a schematic illustration of a sensor that may be used in the example stylus shown in FIG. 1.

FIG. 3 is a schematic illustration of a simplified example of sensor 200 that can detect phase ("Doppler") shift and perform accurate motion measurement. As discussed above, one example of sensor 200 may measure reflections of coherent light from surface 110 to determine the changing positions of distal end 125.

As shown in FIG. 3, sensor 200 may include light source 300, a plurality of light detectors 305, and a lens 310. Light source 300 is configured to project a coherent light via lens 310 to surface 110. Thereafter, plurality of light detectors 305 are configured to measure reflections of the coherent light from a reference plane 315 and from surface 110 and to transmit the measured values via exit leads 320 to processor 250. The light beam projected from light source 300 is depicted as straight lines, and the reflected beams measured by light detectors 305 are depicted as dashed lines. In this simplified example, sensor 200 includes only two light detectors 305, thus it can only measure the changing positions of distal end 125 in two-dimensions. However, one skilled in the art will realize that sensor 200 may include at least three light detectors 305 to measure sufficient data that enables processor 250 to determine the three-dimensional change in positions of distal end 125. Additional information and details regarding characteristics of a sensor that are consistent with some embodiments of sensor 200 are available in Applicant's U.S. Pat. No. 6,741,335, which is incorporated herein by reference.

In some embodiments, light source 300 is configured to project a coherent light along a projecting path adjacent to tip 130. Light source 300 may or may not be included in sensor 200. In some embodiments, the operating power of light source 300 may be between about 50 microwatts and about 1000 microwatts, between about 75 microwatts and 600 microwatts, or between about 400 microwatts and 800 microwatts.

Sensor 200 may include a plurality of light detectors 305 arranged in a substantially coplanar manner to light source 300 and being configured to measure at least three non-collinear beams reflected from surface 110. In some embodiments, a plurality of light detectors 305 and light source 300 may be mounted on a common substrate. In addition, the plurality of light detectors 305 may be positioned peripheral to light source 300. For example, the plurality of light detectors 305 may include four pairs of light detectors arranged in a rectangle. In a first configuration, light source 300 may be located substantially in the center of the rectangle. In a second configuration, light source 300 may be located in a position offset from the center of the rectangle.

As is evident from the foregoing, stylus 105 provides a wide range of functionality.

Some embodiments consistent with the present disclosure provide a stylus configured to detect on-surface and/or above-surface motions. In most commonly used languages, handwriting involves on-surface and above-surface motions. When using a surface-dependent stylus on coded surfaces or on touch surfaces, the above-surface motions may be less important. The positions of the distal end of surface-dependent stylus (e.g., after the tip is lifted and returned to a different position) are determined using the surfaces. However, when entering text from a non-coded surface, the capability of stylus 105 to detect on-surface and above-surface motions becomes more advantageous. That is because the surface-dependent styluses cannot rely on information from the non-coded surface to determine the position of the tip after an above-surface motion. The term "non-coded surface" broadly includes any type of tangible material without a predefined pattern. The predefined pattern may include any regularly or irregularly spaced visual indicators forming areas on a surface that may be used as a reference for locating the position of a stylus.

Embodiments consistent with the present disclosure provide devices and methods for generating input by determining three dimensional positions of a stylus. In accordance with a disclosed embodiment, a stylus is provided for generating writing input, the stylus may include an elongated body having a distal end, and a light source configured to project coherent light on an opposing surface adjacent the distal end. The stylus may further include at least one sensor configured to measure first reflections of the coherent light from the opposing surface while the distal end moves in contact with the opposing surface, and to measure second reflections of the coherent light from the opposing surface while the distal end moves above the opposing surface and out of contact with the opposing surface. The stylus also includes at least one processor configured to receive input from the at least one sensor and to enable determining three dimensional positions of the distal end based on the first reflections and the second reflections.

In some embodiments, the at least one sensor includes at least three pairs of light detectors, each pair configured to detect a differing reflection of the coherent light in non-collinear spatial directions. The at least three pairs of light detectors are arranged in a substantially co-planar relationship with respect to each other. The at least one processor is further configured to determine from the output of the at least three pairs of light detectors the three dimensional positions. The distal end includes a tip configured to contact the opposing surface and to maintain a space between the elongated body and the opposing surface, and wherein the light source includes a laser diode configured to project the coherent light on the opposing surface adjacent to the tip. The stylus further includes an optical aperture through which the coherent light, the first reflections, and the second reflections are configured to pass, and wherein the optical aperture has an opening size of between about 1.6 mm and about 8 mm. The tip is configured to engage the opposing surface without substantially leaving marks on the opposing surface. The stylus further includes a transmitter configured to transmit the writing input to a paired device and to thereby cause a display of the writing input on the paired device. The stylus further includes a force sensor configured to detect when the distal end is in contact with the opposing surface. The at least one processor is further configured to distinguish between measurements of the first reflections and measurements of the second reflections. The at least one processor is configured to determine the three dimensional positions when the distal end is spaced about 10 mm from the opposing surface. The at least one processor is configured to determine the three dimensional positions when the distal end is spaced between 20 mm and 30 mm from the opposing surface. The light source is configured to project coherent light having a coherence length of at least about 50 mm. The light source is configured to project coherent light having a wavelength between about 650 nm and about 1000 nm. The optical power of the light source is between about 50 microwatts and about 1000 microwatts. The light source is configured to project substantially collimated coherent light towards the opposing surface.

In accordance with another disclosed embodiment, a device is provided for generating writing input, the device may include at least one processor configured to control a light source configured to project coherent light on an opposing surface adjacent a distal end of a stylus. The at least one processor is further configured to receive from at least one sensor measurements of first reflections of the coherent light from the opposing surface while the distal end moves in contact with the opposing surface, and receive from at least one sensor measurements of second reflections of the coherent light from the opposing surface while the distal end moves above the opposing surface and out of contact with the opposing surface. In addition, the at least one processor is further configured to enable determining three dimensional positions of the distal end based on the first reflections and the second reflections.

In some embodiments, receiving from the at least one sensor includes receiving signals from at least three pairs of light detectors each configured to detect a differing reflection of the coherent light when the at least three pairs of light detectors are arranged in a substantially co-planar relationship with respect to each other. The at least one processor is further configured to determine from output of the at least three pairs of light detectors the three dimensional positions. The distal end includes a tip configured to contact the opposing surface and to maintain a space between the stylus and the opposing surface, wherein the light source includes a laser diode, and wherein the at least one processor is further configured to control the laser diode to project the coherent light on the opposing surface adjacent to the tip. The at least one processor is further configured to control a transmitter for transmitting the writing input to a paired device and to thereby cause a display of the writing input on the paired device. The at least one processor is configured to receive from a force sensor a signal indicating when the distal end is in contact with the opposing surface. The at least one processor is further configured to distinguish between the first reflections and the second reflections. The at least one processor is configured to determine the three dimensional positions when the distal end is spaced about 10 mm from the opposing surface. The at least one processor is configured to determine the three dimensional positions when the distal end is spaced between 20 mm and 30 mm from the opposing surface.

In accordance with yet another disclosed embodiment, a method for generating writing input using a stylus is provided. The method includes projecting coherent light on an opposing surface adjacent a distal end of the stylus. The method also includes measuring first reflections of the coherent light from the opposing surface while the distal end moves in contact with the opposing surface, and measuring second reflections of the coherent light from the opposing surface while the distal end moves above the opposing surface and out of contact with the opposing surface. In addition, the method includes determining three dimensional positions of the distal end based on the first reflections and the second reflections.

In related embodiments, the method further includes transmitting the writing input to a paired device to thereby cause a display of the writing input on the paired device. The method further includes determining an incremental position change of the distal end in three orthogonal directions. The method further includes measuring the second reflections of the coherent light occurring when the distal end is spaced between 10 mm and 30 mm from the opposing surface. The method further includes determining writing input without substantially leaving marks on the opposing surface.

Figure 4:
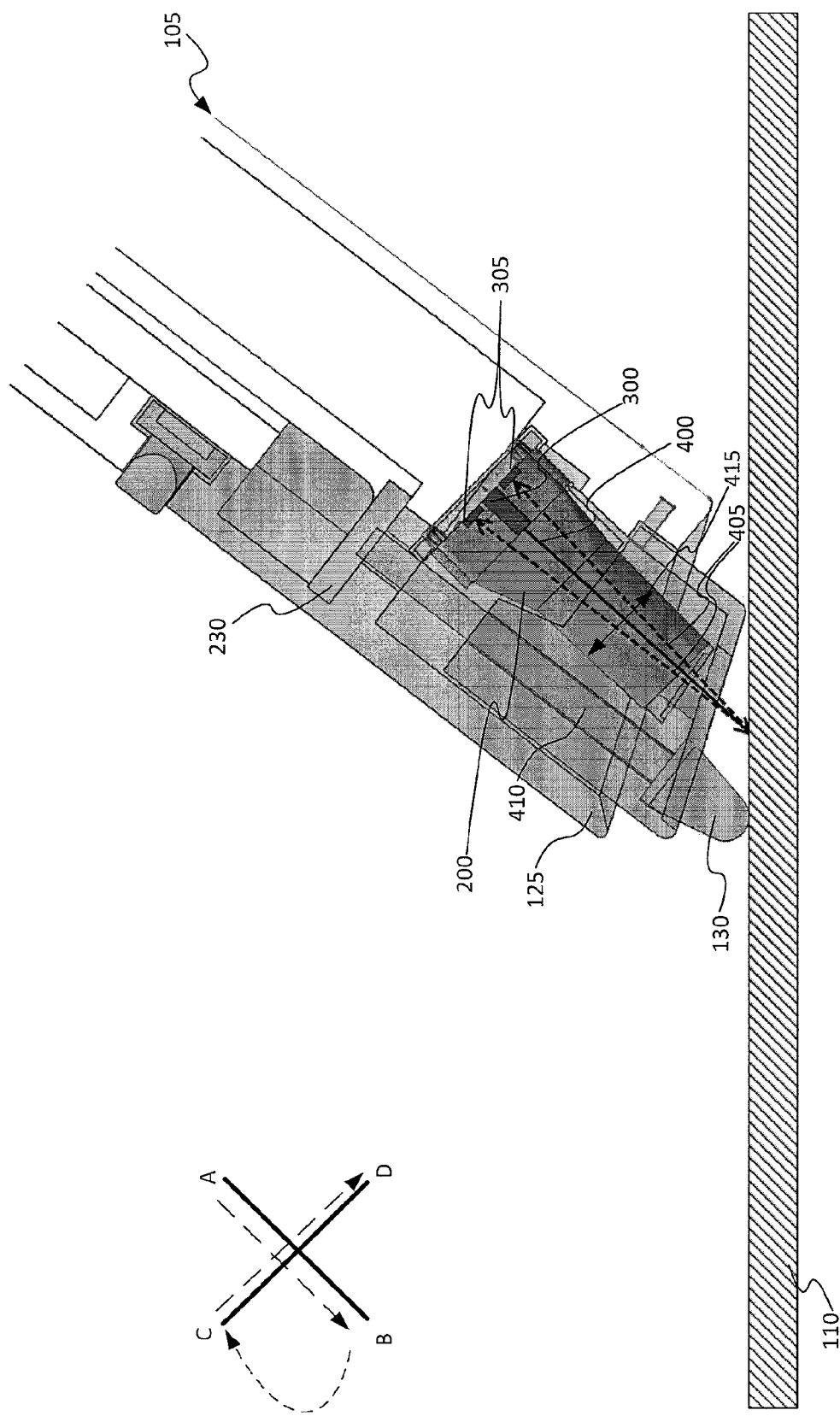
FIG. 4 is another cross-section view of the example stylus shown in FIG. 1 that depicts the placement of an example sensor.

FIG. 4 is a cross-section view of stylus 105 that depicts the relative placement of sensor 200 in housing 120. Sensor 200 may include a light source 300 for projecting coherent light 400 and a plurality of light detectors 305 for measuring reflections 405 of coherent light 400 from surface 110. In one embodiment, the plurality of light detectors 305 may be arranged in a substantially co-planar relationship with respect to each other. A person skilled in the art would recognize that the example depicted in FIG. 4 is simplified in several aspects. In one aspect, sensor 200 may include optical equipment that may change the optical path of reflections 405 and/or may split reflections 405. In another aspect, sensor 200 may include more than two light detectors 305. For example, sensor 200 may include at least three pairs of light detectors 305 each pair configured to detect a differing reflection of the coherent light in non-collinear spatial directions. The at least three pairs of light detectors 305 may measure three non-collinear reflections 405 of coherent light 400 from surface 110.

Also, as shown in FIG. 4, stylus 105 may include force sensor 230 configured to detect when distal end 125 is in contact with surface 110. Processor 250 may use information from force sensor 230 to distinguish between measurements of first reflections 405 and measurements of second reflections 405. Force sensor 230 may be connected to a rod 410 extending to tip 130. In some embodiments, force sensor 230 may provide feedback when tip 130 is in contact with surface 110, and processor 250 may determine the stylus movements based on a combination of feedback from the sensor 200 and force sensor 230. In other embodiments, force sensor 230 may provide a value representing the force applied against surface 110, and processor 250 may change the formatting of the writing input based on the value provided. For example, processor 250 may change the thickness of the writing input based on the value provided.

In addition, stylus 105 may include an optical aperture 415 through which coherent light 400, first reflections 405, and second reflections 405 are configured to pass. Optical aperture 415 may be part of sensor 200 and may be used to limit the amount of reflections 405 arriving at the plurality of light detectors 305. In some embodiments, optical aperture 415 may have an opening size of between about 1.6 mm and about 8 mm. For example, optical aperture 415 may have an opening size of about 3 mm, about 4 mm, about 5 mm, or about 6 mm.

In one embodiment consistent with the present disclosure, stylus 105 may detect two types of movements, a first on-surface motion and a second above-surface motion. FIG. 4 illustrates the first on-surface motion, where tip 130 is in contact with surface 110. In this type of movement, tip 130 may be configured to maintain a space between distal end 125 and surface 110, such that light source 300 can project coherent light 400 on surface 110 adjacent tip 130. Sensor 200 may be configured to measure first reflections 405 of coherent light 400 from surface 110 while distal end 125 moves in contact with surface 110. In the first on-surface motion, tip 130 is configured to engage surface 110 without substantially leaving marks on surface 110. In the second above-surface motion, tip 130 may be out of contact with surface 110. In this type of movement, sensor 200 may measure second reflections 405 of coherent light 400 from surface 110 even when distal end 125 may be spaced between 1 mm and 50 mm from surface 110. Processor 250 may be configured to distinguish between the first on-surface motion and the second above-surface motion, based on input from sensor 200 and/or input from force sensor 230. Processor 250 may also determine three dimensional positions of distal end 125 based on the first and second reflections 405.

FIG. 4 also illustrates a sequence of movements typically used for drawing the English letter "X". The first movement is from point A to point B when stylus 105 moves diagonally left-downward. The second movement is from point B to point C when stylus 105 moves upward and above surface 110. The third movement is from point C to point D when stylus 105 moves diagonally right-downward. One way of understanding the operation of stylus 105 is to consider it as a writing input device that uses virtual ink. While stylus 105 may be configured to engage surface 110 without substantially leaving marks on surface 110. Movements of stylus 105 relative to surface 110 may cause presentation of strokes on the display of paired device 115. For example, the first movement from point A to point B may generate presentation of a virtual ink of the symbol "/" on the display of paired device 115. The second movement from point B to point C may generate a presentation of virtual ink of the symbol "(" or may not cause any presentation. The third movement is from point C to point D may generate presentation of a virtual ink of the symbol "\". Applying these three distinct movements sequentially may cause the presentation of the English letter "X" on the display of paired device 115. Alternatively, applying the three distinct movements sequentially may cause the presentation of the Greek letter "α" on the display of paired device 115.

Figure 5:
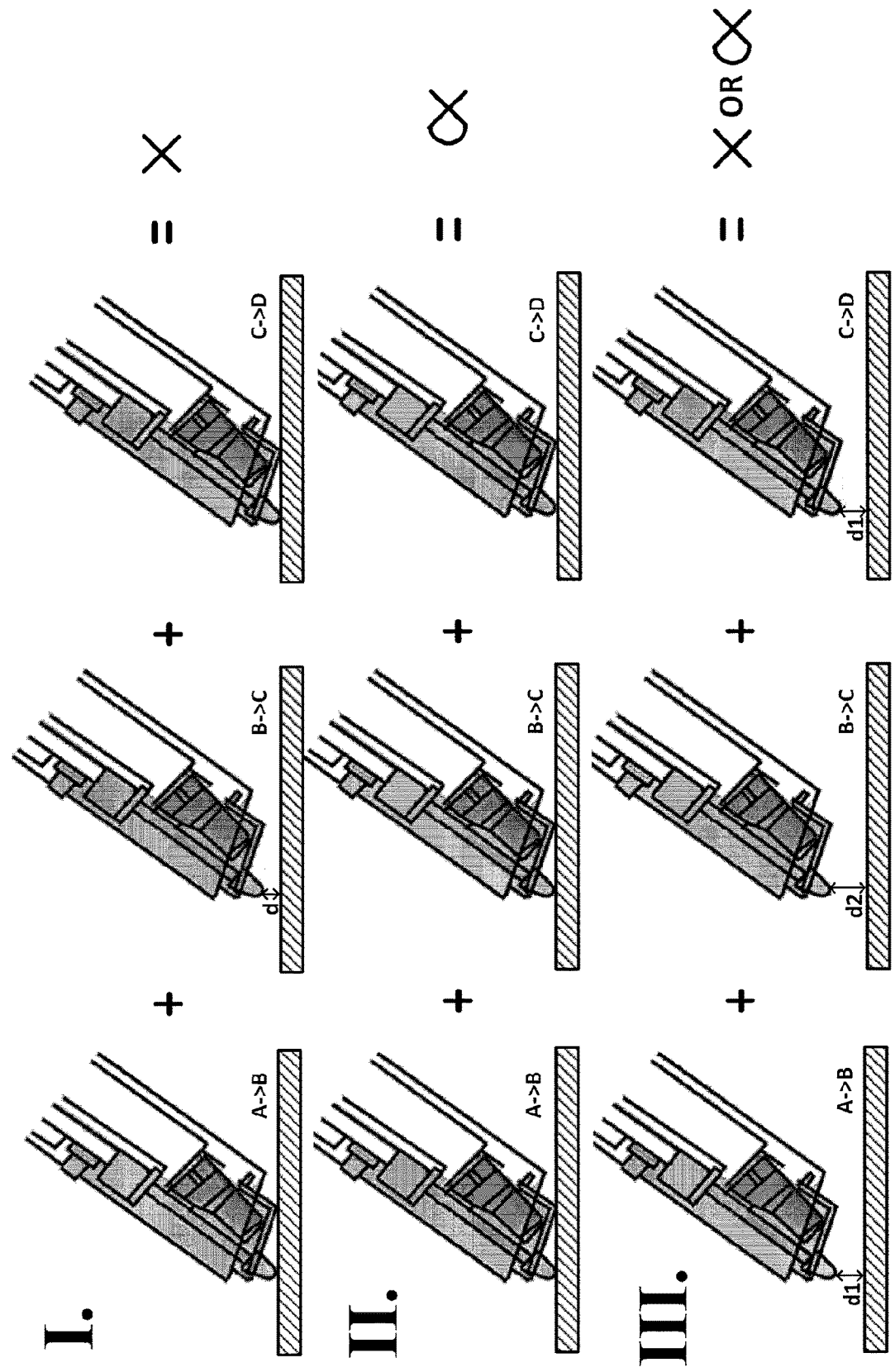
FIG. 5 is a schematic illustration that depicts three situations of generating writing input based on on-surface motions and above-surface motions.

FIG. 5 illustrates three situations of applying the sequence of movements described above. Each of these situations may result in a different output based on the capability of stylus 105 to detect on-surface and above-surface motions. The first situation depicts a sequence of movements that causes the presentation of the English letter "X". The second situation depicts a sequence of movements that causes the presentation of the Greek letter "α". The third situation depicts a sequence of movements that may cause the presentation of the English letter "X" or the presentation of the Greek letter "α".

In the first situation, the first movement, from point A to point B, is when stylus 105 moves diagonally left-downward while being in contact with surface 110. The second movement, from point B to point C, is when stylus 105 moves upward while being spaced up a distance d from surface 110. The third movement, from point C to point D, is when stylus 105 moves diagonally right-downward while being in contact with surface 110. Applying these three distinct movements sequentially may cause the presentation of the English letter "X" on the display of paired device 115. The first situation demonstrates certain capabilities of stylus 105. During the second movement, processor 250 may distinguish that this is a second above-surface motion and avoid from generating virtual ink along the path from point B to point C. In addition, processor 250 may track the changing positions of distal end 125 during the second movement based on input from sensor 200. Tracking the changing positions of distal end 125 during the second movement is used to locate the starting point of the third movement at point C. If one were to use the same sequence of movements using a typical optical mouse, the result would be: <, because a typical optical mouse cannot track the movement of the mouse when the mouse is out of contact with a surface, there will be no information on the relation between the two motion sequences and the third movement would start from point B.

In the second situation, the first movement, from point A to point B, is when stylus 105 moves diagonally left-downward while being in contact with surface 110. The second movement, from point B to point C, is when stylus 105 moves upward while being in contact with surface 110. The third movement, from point C to point D, is when stylus 105 moves diagonally right-downward while being in contact with surface 110. Applying these three distinct movements sequentially may cause the presentation of the Greek letter "α" on the display of paired device 115.

In the third situation, the first movement, from point A to point B, is when stylus 105 moves diagonally left-downward while being spaced up a distance d1 from surface 110. The second movement, from point B to point C, is when stylus 105 moves upward while being spaced up a distance d2 from surface 110. The third movement, from point C to point D, is when stylus 105 moves diagonally right-downward while being spaced up a distance d1 from surface 110. Applying these three distinct movements sequentially may cause the presentation of the English letter "X" or the Greek letter "α" on the display of paired device 115. According to some embodiments, stylus 105 can not only distinguish between on-surface and above-surface motions, but can continuously track the changing positions of distal end 125 when it moves out of contact with surface 110. Therefore, processor 250 can determine when distance d2 is substantially larger than distance d1, and cause the presentation of the English letter "X". Additionally, processor 250 can determine when distance d2 is substantially equal to distance d1 and cause the presentation of the Greek letter "α".

According embodiments associated with the third situation, processor 250 may be able to determine one or more writing inputs from changing positions of distal end 125 relative to surface 110 when tip 130 is not touching surface 110 at all. In one example, processor 250 may be able to generate text input associated with a complete sentence while distal end 125 moves above surface 110 and out of contact with surface 110. The sequence of movements that generated the text input may include strokes that cause presentation of virtual ink on the display of paired device 115, and strokes that do no cause presentation of virtual ink on the display of paired device 115.

Figure 6:
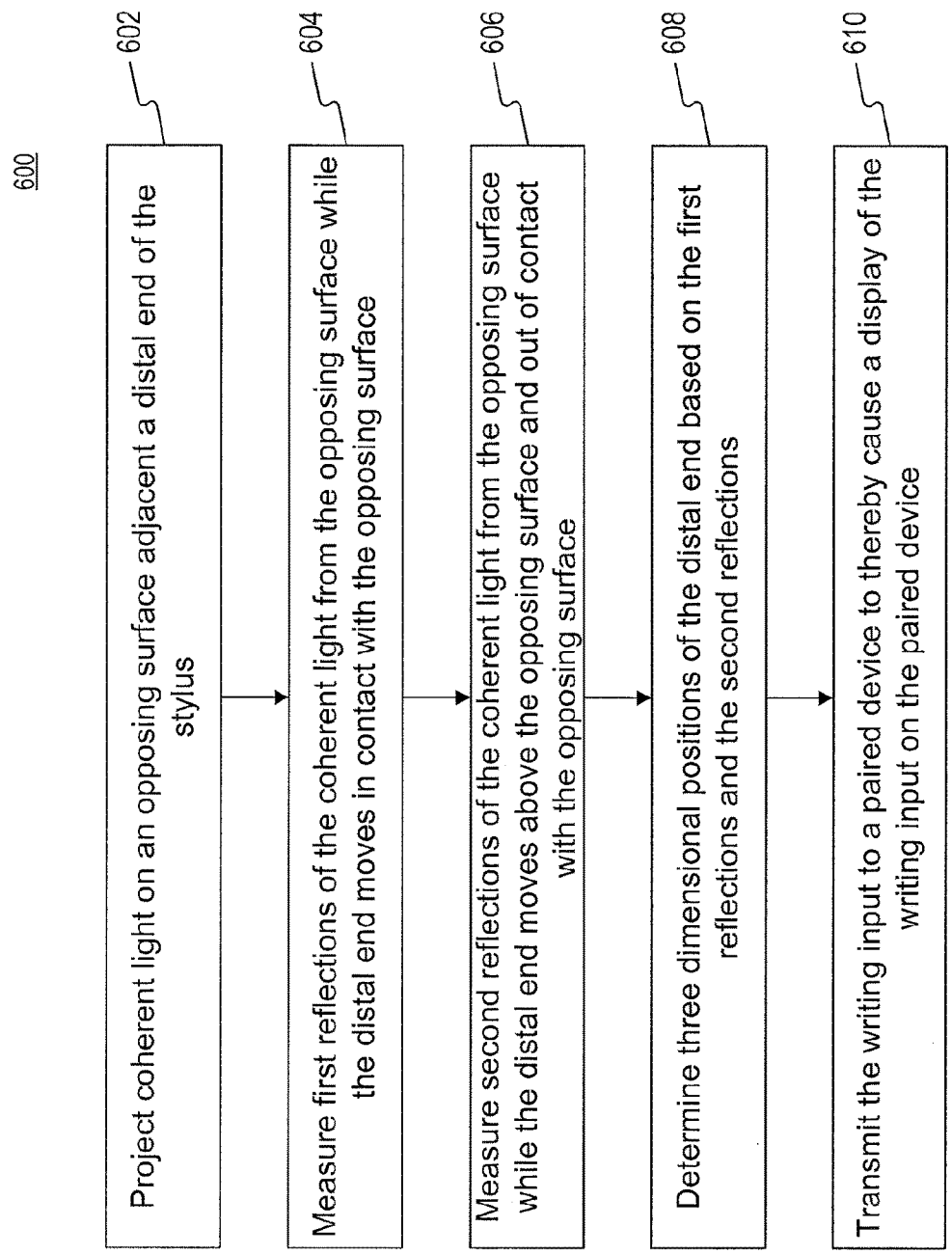
FIG. 6 is a flow diagram of an exemplary process for generating writing input using a stylus, consistent with disclosed embodiments.

FIG. 6 is a flowchart showing an exemplary process 600 for generating writing input using stylus 105, consistent with disclosed embodiments. At step 602, light source 300 may project coherent light 400 on surface 110 adjacent distal end 125 of stylus 105. In some embodiments, light source 300 is configured to project substantially collimated coherent light 400 towards surface 110. In addition, light source 300 may be configured to project coherent light 400 having a wavelength between about 700 nm and about 900 nm and having a coherence length of at least about 15 mm. The coherence length refers to the propagation distance over which a coherent wave maintains a predetermined degree of coherence. In some examples, light source 300 is configured to project coherent light 400 having a coherence length of about 25 mm, about 50 mm, about 75 mm, about 100 mm, about 500 mm, or more than 1000 mm.

At step 604, sensor 200 may measure first reflections 405 of coherent light 400 from surface 110 while distal end 125 moves in contact with surface 110. In some embodiments, sensor 200 includes at least three pairs of light detectors 305, wherein each pair is configured to detect a differing reflection of coherent light 400 in non-collinear spatial directions. Each of the at least three pairs of light detectors 305 may form a polarization sensitive quadrature signal detector. Moreover, the at least three pairs of light detectors 305 may be arranged in a substantially co-planar relationship with respect to each other.

At step 606, sensor 200 may measure second reflections 405 of coherent light 400 from surface 110 while distal end 125 moves above surface 110 and out of contact with surface 110. As used herein, the term "above the surface" broadly includes any spacing from surface 110 (e.g., if surface 110 is positioned vertically then distal end 125 may move at a certain horizontal distance from it). In some embodiments, such as illustrated in FIG. 1, processor 250 may determine the three dimensional positions of distal end 125 when tip 130 is spaced a distance D from surface 110. In some instances, D may have a value of between 0 and 30 mm, for example, D is about 10 mm, about 20 mm, or about 30 mm At step 608, processor 250 may determine three dimensional positions of distal end 125 based on first reflections 405 and second reflections 405. In some embodiments, processor 250 may determine an incremental position change of distal end 125 in three orthogonal directions. Processor 250 may further determine from the output of the at least three pairs of light detector 305 a differing component of the three dimensional positions. Calculating x, y, z components may occur when first reflections 405 include three non-collinear reflections 405 or second reflections 405 include three non-collinear reflections 405. But it does not necessarily mean that each of the at least three pairs of light detector 305 measure an orthogonal components. In some embodiments, processor 250 may enable determining the three dimensional positions of distal end 125 by sending information from sensor 200 to be processed in a separate processor 250. In addition, stylus 105 may further include a movement sensor 235, and processor 250 may determine the three dimensional positions of distal end 125 based on a combination of the output of sensor 200 and the output of movement sensor 235.

At optional step 610, processor 250 may generate writing input from the determined three dimensional positions of distal end 125, and transmitter 225 may transmit the writing input to paired device 115 to thereby cause a display of the writing input on paired device 115. Alternatively, transmitter 225 may transmit a data stream including information associated with the three dimensional positions of distal end 125 (e.g., the X and Y coordinates of a cursor position), and paired device 115 is configured to generate the writing input from the received data stream. Transmitter 225 may use a short-range communication protocol, such as Bluetooth protocol, to transmit the writing input and/or the data stream.

Some embodiments consistent with the present disclosure provide a stylus configured to cause text captured during different writing input periods to be contiguously presented on the display of paired device 115 despite that the text entered during the different writing input periods did not occur contiguously. As described above, in some embodiments, stylus 105 is configured to engage surface 110 without substantially leaving marks on surface 110. This enables user 100 to enter text even when paired device 115 screen is not visible to user 100, such as when paired device 115 is inside a bag or pocket and hidden from view.

In accordance with a disclosed embodiment, a stylus is provided for generating writing input. The stylus may include a housing having a distal end, and a light source configured to project coherent light on at least one opposing surface adjacent the distal end. The stylus may further include at least one sensor configured to measure at least three non-collinear reflections of the coherent light from the at least one surface when the distal end is moved relative to the at least one opposing surface. The stylus may also include at least one processor configured to determine changing positions of the distal end based on the at least three non-collinear reflections. The at least one processor is further configured to determine, based on the changing positions of the distal end during a first writing input period, text input resulting from changing positions of the distal end in a first area of the at least one surface, and cause text captured during the first writing input period to be presented on a display. The at least one processor is further configured to determine, based on the changing positions of the distal end during a second writing input period after the housing is lifted and returned to a second area of the at least one surface non-contiguous with the first area, text input resulting from changing positions of the distal end in the second area, and cause text captured during the second writing input period to be contiguously presented on the display with the text captured during the first writing input period despite that the text input during the first writing input period and text input during the second writing input period did not occur contiguously.

In some embodiments, the at least one processor is configured to determine the text input during the first writing input period and the text input during the second writing input period in an absence of detection of code and without detection of physical marks made by the stylus on the at least one opposing surface. The display may be associated with a paired device, and the stylus further includes a transmitter configured to transmit the text input to the paired device to thereby cause text captured during the first and second writing input periods to be contiguously presented on the display of the paired device. The at least one processor is further configured to cause the text to be presented on the display in a manner simulating pen strokes. The at least one processor is further configured to determine an initial alignment of text during the first writing input period and to align text of the second writing period with the initial alignment. The determined text input from the first area is non-horizontal and causing the text captured during the first writing input period to be presented on the display involves aligning the text input to be presented horizontally. The determined text input from the second area is non-horizontal and wherein causing the text captured during the second writing input period to be contiguously presented involves aligning the text input to be presented horizontally. The determined text input from the first area is a first part of a sentence and the determined text input from the second area is a second part of the sentence, and the at least one processor is further configured to cause the first and second parts of the sentence to be presented in a same line. The determined text input during the first writing input period occurs along a first azimuth and the determined text input during the second writing input period occurs along a second azimuth, non-aligned with the first azimuth, and the at least one processor is further configured to cause the determined text input during the first and second writing input periods to be displayed along a common azimuth. The determined text input from the first area has a first character size and the determined text input from the second area has a second character size different from the first character size, and the at least one processor is further configured to the first text and the second text to be displayed in a substantially common character size. The determined text input from the first area has a general first slant and the determined text input from the second area has a general second slant different from the first slant, and the at least one processor is further configured to cause the first text input and the second text input to be displayed at a substantially common slant. The at least one surface includes a first surface and a second surface constructed of a material different from a material of the first surface, and the at least one processor is further configured to during the first writing period, determine text input resulting from changing positions of the distal end relative to the first surface, and during the second writing period, determine text input resulting from changing positions of the distal end relative to the second surface. The light source includes a laser diode. The stylus further includes at least one movement sensor, and determining changing positions of the distal end is based on a combination of an output of the at least one sensor and an output of the at least one movement sensor.

In accordance with another disclosed embodiment, a device is provided for generating writing input. The device may include at least one processor configured to control a light source configured to project coherent light on an opposing at least one surface adjacent a distal end of a stylus, and receive from at least one sensor measurements of at least three non-collinear reflections of the coherent light from the at least one surface when the distal end is moved relative to the at least one surface. The at least one processor is further configured to determine changing positions of the distal end based on the at least three non-collinear reflections. The at least one processor is also configured to determine, based on the changing positions of the distal end during a first writing input period, text input resulting from changing positions of the distal end in a first area of the at least one surface, and cause text captured during the first writing input period to be presented on a display. The at least one processor is further configured to determine, based on the changing positions of the distal end during a second writing input period after the housing is lifted and returned to a second area of the at least one surface non-contiguous with the first area, text input resulting from changing positions of the distal end in the second area, and cause text captured during the second writing input period to be contiguously presented on the display with the text captured during the first writing input period despite that the text input during the first writing input period and text input during the second writing input period did not occur contiguously on the at least one surface.

In some embodiments, the determined text input during the first writing input period occurs along a first azimuth and the determined text input during the second writing input period occurs along a second azimuth, non-aligned with the first azimuth, and the at least one processor is further configured to cause the determined text input during the first and second writing input periods to be displayed along a common azimuth. The determined text input from the first area has a first character size and the determined text input from the second area has a second character size different from the first character size, and the at least one processor is further configured to the first text and the second text to be displayed in a substantially common character size. The determined text input from the first area has a general first slant and the determined text input from the second area has a general second slant different from the first slant, and wherein the at least one processor is further configured to cause the first text input and the second text input to be displayed at a substantially common slant. The at least one surface including a first surface and a second surface constructed of a material different from a material of the first surface, and the at least one processor is further configured to during the first writing period, determine text input resulting from changing positions of the distal end relative to the first surface, and during the second writing period, determine text input resulting from changing positions of the distal end relative to the second surface.

In accordance with another disclosed embodiment, a software product stored on a non-transitory computer readable medium and comprising computer implementable instructions for carrying out a method for generating writing input using a stylus, is provided. The method includes projecting coherent light on an opposing at least one surface adjacent a distal end of the stylus, and measuring at least three non-collinear reflections of the coherent light from the at least one surface when the distal end is moved relative to the at least one surface. The method further includes determining changing positions of the distal end based on the at least three non-collinear reflections. The method further includes determining, based on the changing positions of the distal end during a first writing input period, text input resulting from changing positions of the distal end in a first area of the at least one surface, and causing text captured during the first writing input period to be presented on a display. The method further includes determining, based on the changing positions of the distal end during a second writing input period after the housing is lifted and returned to a second area of the at least one surface non-contiguous with the first area, text input resulting from changing positions of the distal end in the second area, and causing text captured during the second writing input period to be contiguously presented on the display with the text captured during the first writing input period despite that the text input during the first writing input period and text input during the second writing input period did not occur contiguously on the at least one surface.

Figure 7:
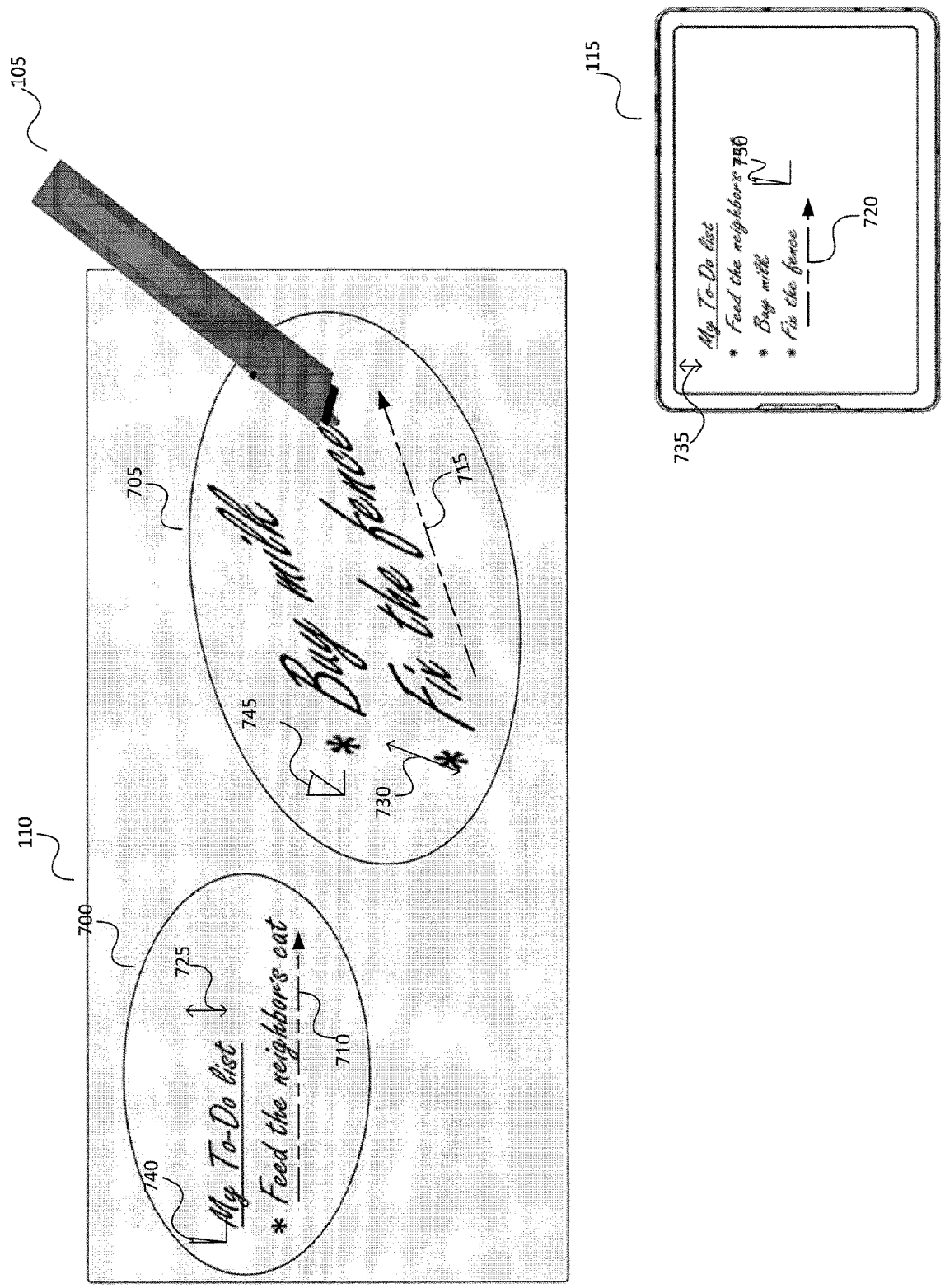
FIG. 7 is a schematic illustration of the example stylus shown in FIG. 1 generating writing input from different areas of a surface, according to some embodiments.
Figure 8:
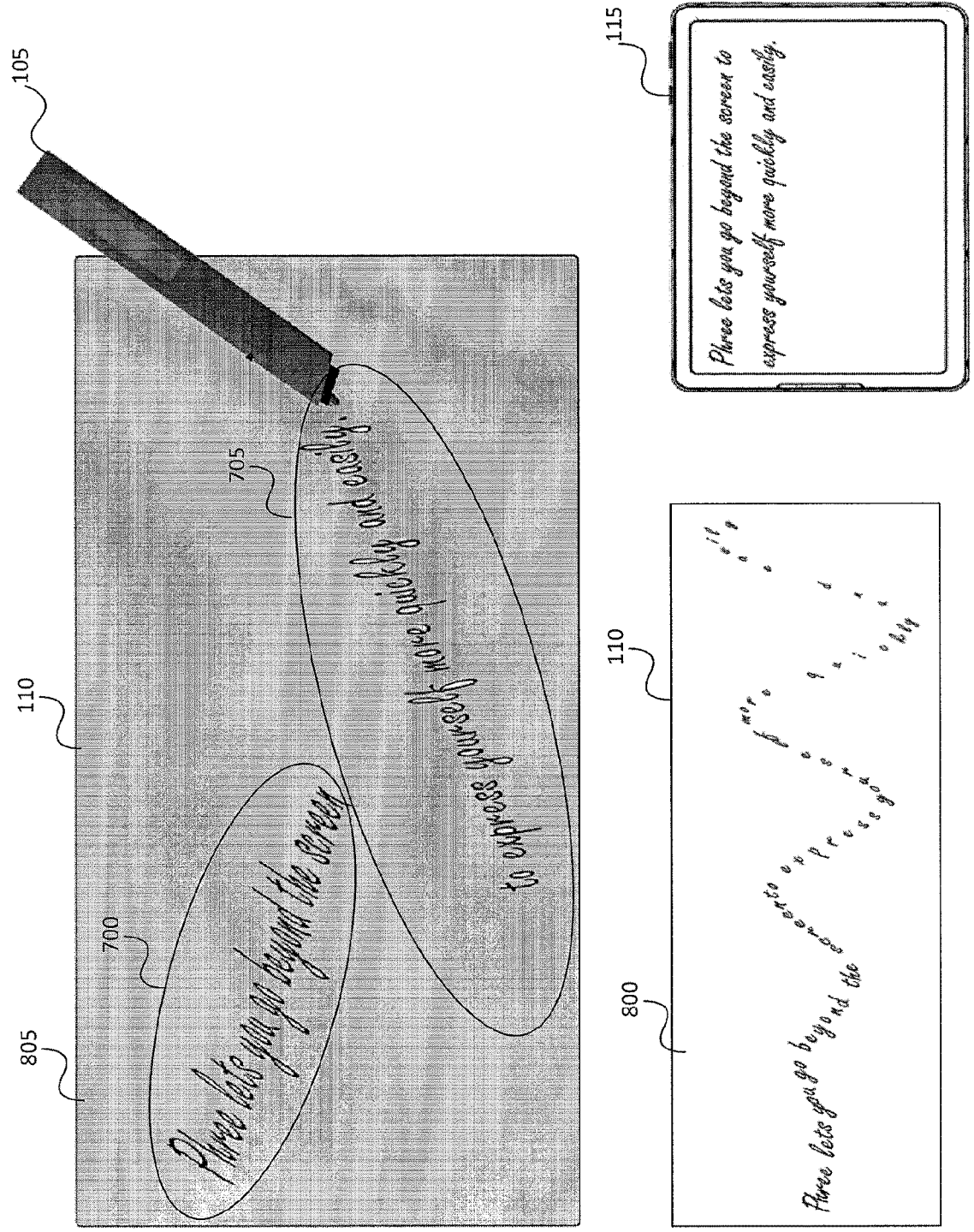
FIG. 8 is a schematic illustration of the example stylus shown in FIG. 1 generating writing input from different areas of a surface, according to additional embodiments.

FIGS. 7 and 8 are diagrammatic representations of stylus 105 moving relative to surface 110 to generate writing input that may be presented on paired device 115, consistent with disclosed embodiments. In FIGS. 7 and 8, surfaces 110 include presentation of text that was previously entered. It should be understood that the presentation of the text on surface 110 is only exemplary and optional. In some embodiments, stylus 105 does not leave any marks on surface 110 when it enters writing input. Furthermore, as discussed above, stylus 105 may generate all the writing input presented in FIGS. 7 and 8 when stylus 105 is not touching surface 110.

FIG. 7 illustrates surface 110 having a first area 700 including text entered during a first writing input period and a second area 705 including text entered during a second writing input period. In some embodiments, stylus 105 may identify an event that distinguishes between the first and the second writing input periods. The event may include a change in one or more appearance parameters, for example, writing azimuth, character size, and slant degree. Alternatively, the event may include passing of a predefined period of time or passing of a height threshold above surface 110. In some cases, the predefined period of time separating the two writing input periods may be between, for example, about 1 sec to 2 hours, more than 5 seconds, more than 10 minutes, or more than 1 hour. In the example illustrated in FIG. 7, user 100 is writing a "To-Do list," the first item of the To-Do list was entered during the first writing input period, while the second and third items of the To-Do list were entered during the second writing input period. Processor 250 may perform alignment actions to present the text captured during the first and second writing input periods differently than the movement of distal end 125 relative to surface 110. For example, while second area 705 is located right to first area 700, the second and third items of the To-Do list are presented in paired device 115 below the first item.

In some embodiments, different symbols identified in the writing input may affect the presentation of the writing input in paired device 115. For example, processor 250 may identify an asterisk in the beginning of the writing input entered in the second writing input period, and determine that the writing input of the second writing period should be presented below the writing input of the first writing period. In a different example, processor 250 may identify a period as the last symbol entered in first writing input period, and determine that the writing input of the second writing period should be presented in a new line. In other embodiments different stylus gestures, identified by processor 250, may affect the presentation of the writing input in paired device 115. For example, a certain stylus gesture may change the size of the text being presented on paired device 115, while a different stylus gesture may change the color of the text being presented on paired device 115.

Consistent with disclosed embodiments, the determined text input during the first writing input period may occur along a first azimuth 710 and the determined text input during the second writing input period may occur along a second azimuth 715, non-aligned with first azimuth 710. Processor 250 may cause the determined text input during the first and second writing input periods to be displayed along a common azimuth 720. In some examples, common azimuth 720 may be first azimuth 710, an average of the first and second azimuths, or a horizontal azimuth.

Consistent with other embodiments, the determined text input from first area 700 may have a first character size 725 and the determined text input from second area 705 may have a second character size 730 different from first character size 725. Processor 250 may cause the determined text input during the first and second writing input periods to be displayed in a substantially common character size 735. In some examples, common character size 735 may be first character size 725, an average of the first and second sizes, or an adjustable default size value associated with paired device 115.

Consistent with additional embodiments, the determined text input from first area 700 has a general first slant 740 and the determined text input from second area 705 has a general second slant 745 different from general first slant 740. The second slant may result from the shape of the second surface. Processor 250 may cause the determined text input during the first and second writing input periods to be displayed in a substantially common slant 750. For example, common slant 750 may be general first slant 740, an average of the first and second general slants, or an adjustable default slant value associated with paired device 115.

FIG. 8 illustrates generating the sentence "Phree lets you go beyond the screen to express yourself more quickly and easily" in a first example 800 and in a second example 805. In first example 800, the above sentence was entered continuously but in an unconventional format. Specifically, the writing input was entered in a continuous wave-shape format where the writing azimuth, the character size, and the slant degree change. While it may seem unlikely that user 100 would write in a wave format, in some embodiments, surface 110 may have a three-dimensional shape that may cause a continuous writing input to change in more than one appearance parameter. As described above, the plurality of writing input periods may differ from one another by at least one appearance parameter. While no specific areas were identified, in one embodiment, each writing direction change may be considered as an event that distinguishes between two writing input periods. Accordingly, processor 250 may identify a plurality of writing input periods in first example 800. Processor 250 may further adjust the writing input in all the plurality of writing input periods such that the entered writing input may be presented on the display of paired device 115 with the same values of the one or more appearance parameters. As shown in FIG. 8, the sentence "Phree lets you go beyond the screen to express yourself more quickly and easily" is presented with a single writing azimuth, a single character size, and a single slant degree.

In second example 805, the determined text input from first area 700 is a first part of a sentence (i.e., "Phree lets you go beyond the screen") and the determined text input from second area 705 is a second part of the sentence (i.e., "to express yourself more quickly and easily."). Processor 250 may cause the determined text input during the first and second writing input periods to be presented in the same line. In second example 805, only the first word from the text entered during the second writing input period (i.e., "to") is illustrated in the same line as the text entered during the first writing input period. However, as one skilled in the art would recognize the number of words presented in a single line of paired device 115 is a function of the size of the characters and the size of the display of paired device 115. In some embodiments, after the generated text reaches to the end of line, processor 250 is further configured to present the text in a new line. In other embodiments, after the generated text reaches to the end of line, processor 250 is further configured to readjust the presentation of the text in the display of paired device 115 to enable user 100 adding text to the existing line.

In some embodiments, stylus 105 is further configured to detect different types of languages and apply different alignment rules based on the detected languages. For example, English is a left-to-right language and therefore the text entered during the second writing period may be presented right to the previously entered text from the first writing period. In other examples, stylus 105 may detect that user 100 is entering text using a right-to-left language, and may cause text entered during the second writing period to be presented left to the previously entered text from the first writing period.

While FIGS. 7 and 8 illustrate a single surface 110 used to generate the writing input, in other embodiments, stylus 105 may generate text from multiple surfaces 110. For example, first area 700 may be located at a first surface and second area 705 may be located at a second surface. In these embodiments, stylus 105 may cause text captured during the second writing input period to be contiguously presented on paired device 115 with the text captured during the first writing input period, when the text entered during the first writing input period resulting from changing positions of distal end 125 relative to the first surface; and the text entered during the second writing input period resulting from changing positions of distal end 125 relative to the second surface. A detailed implementation of this embodiment is disclosed with reference to FIGS. 10-13.

Figure 9:
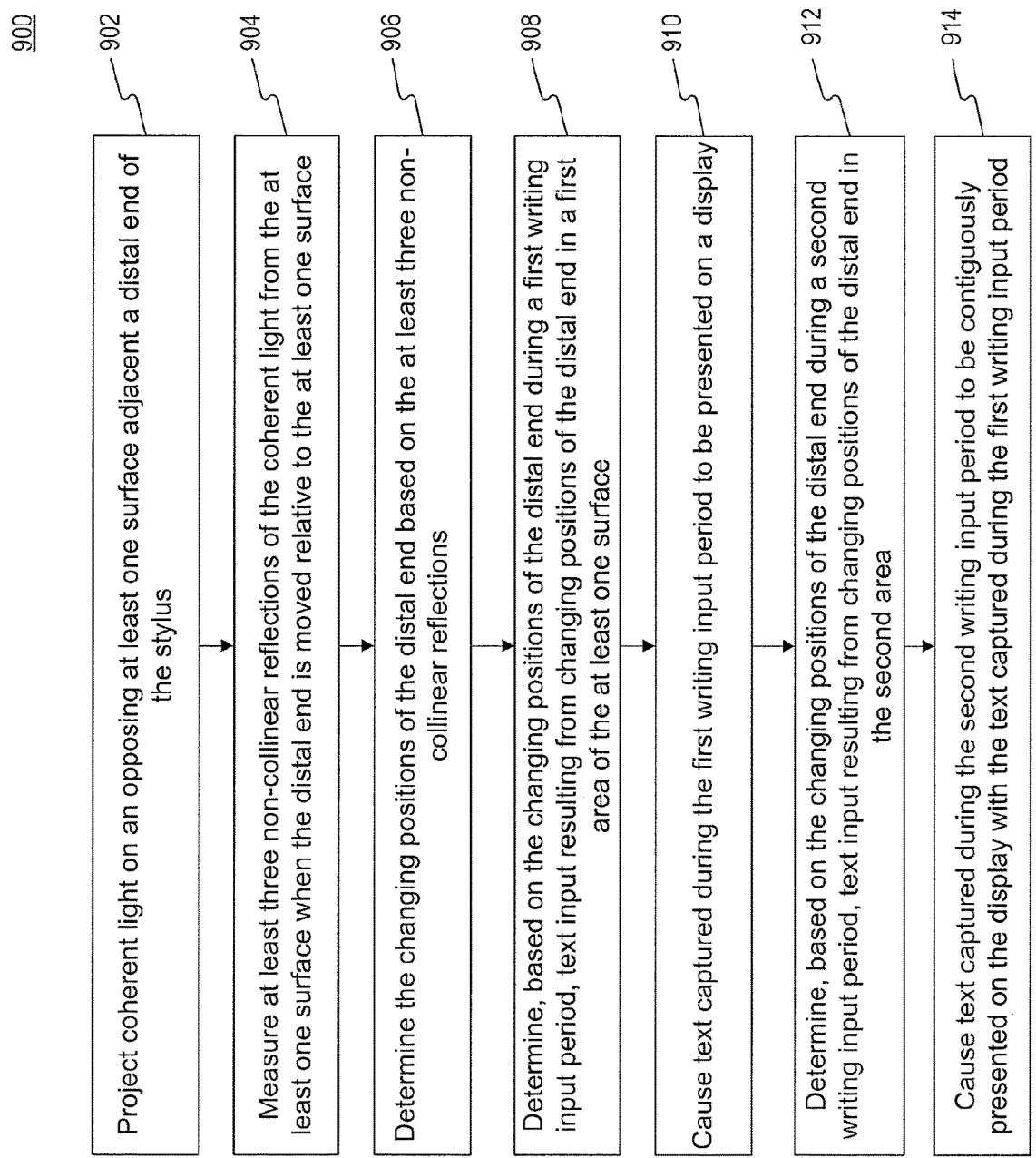
FIG. 9 is a flow diagram of an exemplary process for causing text captured during different writing input periods to be contiguously presented on the display of a paired device, consistent with disclosed embodiments.

FIG. 9 is a flowchart showing an exemplary process 900 for causing text captured during different writing input periods to be contiguously presented on the display of paired device 115, consistent with disclosed embodiments. At step 902, light source 300 may project coherent light 400 on at least one surface 110 adjacent distal end 125 of stylus 105. At step 904, sensor 200 may measure at least three non-collinear reflections 405 of coherent light 400 from at least one surface 110 when distal end 125 is moved relative to at least one surface 110. The at least three non-collinear reflections 405 may or may not be orthogonal. Using the combined information from the at least three non-collinear reflections 405, processor 250 can determine three-dimensional positions of distal end 125 relative to at least one surface 110.

At step 906, processor 250 may determine the changing positions of distal end 125 based on the at least three non-collinear reflections 405. Determining the changing positions of distal end 125 may include determining the changing positions of distal end 125 in three dimensions (X, Y, and Z) or determining the changing positions of distal end 125 in two dimensions (X and Y) when distal end 125 moves in three dimensions. In some embodiments, stylus 105 may further include movement sensor 235, and processor 250 may determine the changing positions of distal end 125 based on a combination of the output of sensor 200 and the output of movement sensor 235. In one example, movement sensor 235 may include a plurality of accelerometers and is configured to detect acceleration in three non-collinear directions. In another example, movement sensor 235 may include a plurality of gyroscopes and is configured to detect rotations in three directions.

At step 908, processor 250 may determine, based on the changing positions of distal end 125 during a first writing input period, text input resulting from changing positions of distal end 125 in first area 700 of at least one surface 110. At step 910, processor 250 may cause text captured during the first writing input period to be presented on a display. In some embodiments, the display may be screen 220. In other embodiments, the display may be associated with paired device 115, and stylus 105 may further include transmitter 225 configured to transmit the text input to paired device 115 to thereby cause text captured during the first input period to be presented on the display of paired device 115. In addition, processor 250 may identify that the determined text input from first area 700 is not along a straight line, e.g., horizontal line. In this case, causing the text captured during the first writing input period to be presented on the display involves aligning the text input to be presented along a straight line, e.g., a horizontal line.

At step 912, processor 250 may determine, based on the changing positions of distal end 125 during a second writing input period after housing 120 is lifted and returned to second area 705 non-contiguous with first area 700, text input resulting from changing positions of distal end 125 in second area 705. In some embodiments, processor 250 may determine text input (during the first writing input period and during the second writing input period) in an absence of detection of code and without detection of physical marks made by stylus 105 on at least one surface 110. In other embodiments, at least one surface 110 may include a first surface and a second surface constructed of a material different from a material of the first surface. In these embodiments, processor 250 may, during the first writing period, determine text input resulting from changing positions of the distal end relative to the first surface; and, during the second writing period, determine text input resulting from changing positions of the distal end relative to the second surface. For example, first area 700 may be part of a wooden surface and second area 705 may be of a fabric surface.

At step 914, processor 250 may cause text captured during the second writing input period to be contiguously presented on the display of paired device 115 with the text captured during the first writing input period, despite that the text input during the first writing input period and text input during the second writing input period did not occur contiguously on at least one surface 110. For example, the determined text input from first area 700 may be a first part of a sentence and the determined text input from second area 705 may be a second part of the sentence, and processor 250 may cause the first and second parts of the sentence to be presented in a same line. In some embodiments, processor 250 may determine an initial alignment of text during the first writing input period and to align text of the second writing period with the initial alignment. In addition, processor 250 may identify that the determined text input from second area 705 is not along a straight line, e.g., a horizontal line. In this case, causing the text captured during the second writing input period to be presented on the display involves aligning the text input to be presented along a straight line, e.g., a horizontal line.

Some embodiments consistent with the present disclosure provide a stylus configured to generate text input from multiple surfaces. Because the technology of stylus 105 is surface-indifferent, it can seamlessly accept input from multiple surfaces during the same writing session. As used herein the term "writing session" broadly includes a period of time in which user 100 may enter text related to one or more subjects, for example, a single common subject. Alternatively, a writing session may be a period of time in which user 100 may enter text that is part of communications with a specific individual. A writing session can be continuous or in segments of a number of writing periods. For example, writing a short email may take place during a continuous writing session while writing a To-Do list may take place during a segmented writing session (e.g., multiple writing periods divided by one or more break periods). The break period between each writing period of a segmented writing session is not fixed, and it can vary between seconds, minutes and days. Because stylus 105 may be designed to be easy to carry around, user 100 can enter text input whenever and wherever he/she desired. Therefore, the capability of accepting text input from multiple surfaces is particularly useful when entering text during a segmented writing session.

In accordance with a disclosed embodiment, a stylus is provided for generating text input from multiple surfaces. The stylus may include a housing having a distal end and at least one sensor. The at least one sensor is configured to measure first data indicative of changing positions of the distal end when the distal end is moved relative to a first opposing non-coded surface constructed of a first material, wherein the first data includes information distinguishing between movement of the distal end in contact with the first opposing non-coded surface and movement of the distal end out of contact with the first opposing non-coded surface, and measure second data indicative of positions of the distal end when the distal end is moved relative to a second opposing surface constructed of a second material different from a material of the first opposing non-coded surface, wherein the second data includes information distinguishing between movement of the distal end in contact with the second opposing surface and movement of the distal end out of contact with the second opposing surface. The stylus may further include a transmitter configured to communicate with a paired device and at least one processor. The at least one processor is configured to generate from the first data indicative of the changing positions relative to the first opposing non-coded surface a series of first strokes by the distal end, and generate from the second data indicative of the changing positions relative to the second opposing surface a series of second strokes by the distal end. The at least one processor is further configured to transmit the first strokes and the second strokes via the transmitter to the paired device to cause, on a third surface associated with the paired device, a melding of the first strokes and the second strokes for display on the third surface as if the first strokes and the second strokes occurred on a common surface.

In some embodiments, the stylus further includes a light source configured to project coherent light on the first opposing non-coded surface and the second opposing surface, and wherein measuring the first data includes measuring first reflections as the distal end moves relative to the first opposing non-coded surface, and measuring the second data includes measuring second reflections as the distal end moves relative to the second opposing surface. The at least one processor is further configured to distinguish between the first reflections and the second reflections and to classify the first reflections and the second reflections differently from each other when generating the series of first strokes and series of second strokes. The at least one sensor is configured to enable measurement of the first data when the first opposing non-coded surface includes a concave portion, and to enable measurement of the second data when the second opposing surface includes a convex portion. The at least one sensor is configured to enable measurement of the first data when the first opposing non-coded surface is a display of a computing device, and to enable measurement of the second data when the second opposing surface is made of fabric. The at least one processor is configured to generate both the series of first and second strokes in an absence of codes or stylus marks on both the first surface and the second surface. The at least one sensor is further configured to measure third data indicative of positions of the distal end when the distal end is moved relative to the third surface, and the at least one processor is configured to generate from the third data a series of third strokes by the distal end. Melding of the first strokes and the second strokes includes displaying the first strokes and the second strokes in a same line. The at least one processor is further configured to set an initial alignment and to align with the initial alignment non-aligned text input associated with the first strokes. The at least one processor is further configured to cause text input associated with the first strokes to be contiguously presented on the third surface with the text input associated with the second strokes despite that the first strokes and second strokes did not occur contiguously on a same surface. The first strokes occurs along a first azimuth and the second strokes occurs along a second azimuth, non-aligned with the first azimuth, and wherein the at least one processor is further configured to cause the second strokes to be displayed along the first azimuth.

In accordance with another disclosed embodiment, a device is provided for generating text input from multiple surfaces. The device may include at least one processor configured to receive from at least one sensor contained in a stylus having a distal end first data indicative of changing positions of the distal end when the distal end is moved relative to a first opposing non-coded surface constructed of a first material, wherein the first data includes information distinguishing between movement of the distal end in contact with the first opposing non-coded surface and movement of the distal end out of contact with the first opposing non-coded surface. The at least one processor is further configured to receive from at least one sensor second data indicative of positions of the distal end when the distal end is moved relative to a second opposing surface constructed of a second material different from a material of the first opposing non-coded surface, wherein the second data includes information distinguishing between movement of the distal end in contact with the second opposing surface and movement of the distal end out of contact with the second opposing surface. The at least one processor is further configured to generate from the first data indicative of the changing positions relative to the first opposing non-coded surface a series of first strokes by the distal end, and generate from the second data indicative of the changing positions relative to the second opposing surface a series of second strokes by the distal end. The at least one processor is further configured to transmit the first strokes and the second strokes via a transmitter to a paired device to cause, on a third surface associated with the paired device, a melding of the first strokes and the second strokes for display on the third surface as if the first strokes and the second strokes occurred on a common surface.

In some embodiments, the at least one processor is configured to generate both the series of first and second strokes in an absence of codes or stylus marks on both the first surface and the second surface. The at least one processor is further configured to receive from the at least one sensor data related to first reflections as the distal end moves relative to the first opposing non-coded surface, and data related to second reflections as the distal end moves relative to the second opposing surface. The at least one processor is further configured to cause text input associated with the first strokes to be contiguously presented on the third surface with the text input associated with the second strokes despite that the first strokes and second strokes did not occur contiguously on a same surface. The at least one sensor is configured to enable measurement of the first data when the first opposing non-coded surface includes a concave portion, and to enable measurement of the second data when the second opposing surface includes a convex portion.

In accordance with another disclosed embodiment, a method is provided for generating text input from multiple surfaces. The method includes measuring first data indicative of changing positions of a distal end of a stylus when the distal end is moved relative to a first opposing non-coded surface constructed of a first material, wherein the first data includes information distinguishing between movement of the distal end in contact with the first opposing non-coded surface and movement of the distal end out of contact with the first opposing non-coded surface, and generating from the first data indicative of the changing positions relative to the first opposing non-coded surface a series of first strokes by the distal end. The method further includes measuring second data indicative of positions of the distal end when the distal end is moved relative to a second opposing surface constructed of a second material different from a material of the first opposing non-coded surface. The second data includes information distinguishing between movement of the distal end in contact with the second opposing surface and movement of the distal end out of contact with the second opposing surface. The method further includes generating from the second data indicative of the changing positions relative to the second opposing surface a series of second strokes by the distal end. The method also includes transmitting the first strokes and the second strokes via the transmitter to the paired device to cause, on a third surface associated with the paired device, a melding of the first strokes and the second strokes for display on the third surface as if the first strokes and the second strokes occurred on a common surface.

In some embodiments, the method further includes projecting coherent light adjacent the distal end. Measuring the first data includes measuring first reflections as the distal end moves relative to the first opposing non-coded surface, and measuring the second data includes measuring second reflections as the distal end moves relative to the second opposing surface. The method further includes distinguishing between the first reflections and the second reflections and classifying the first reflections and the second reflections differently from each other when generating the series of first strokes and series of second strokes. Melding of the first strokes and the second strokes includes displaying the first strokes and the second strokes in a same line.

Figure 10:
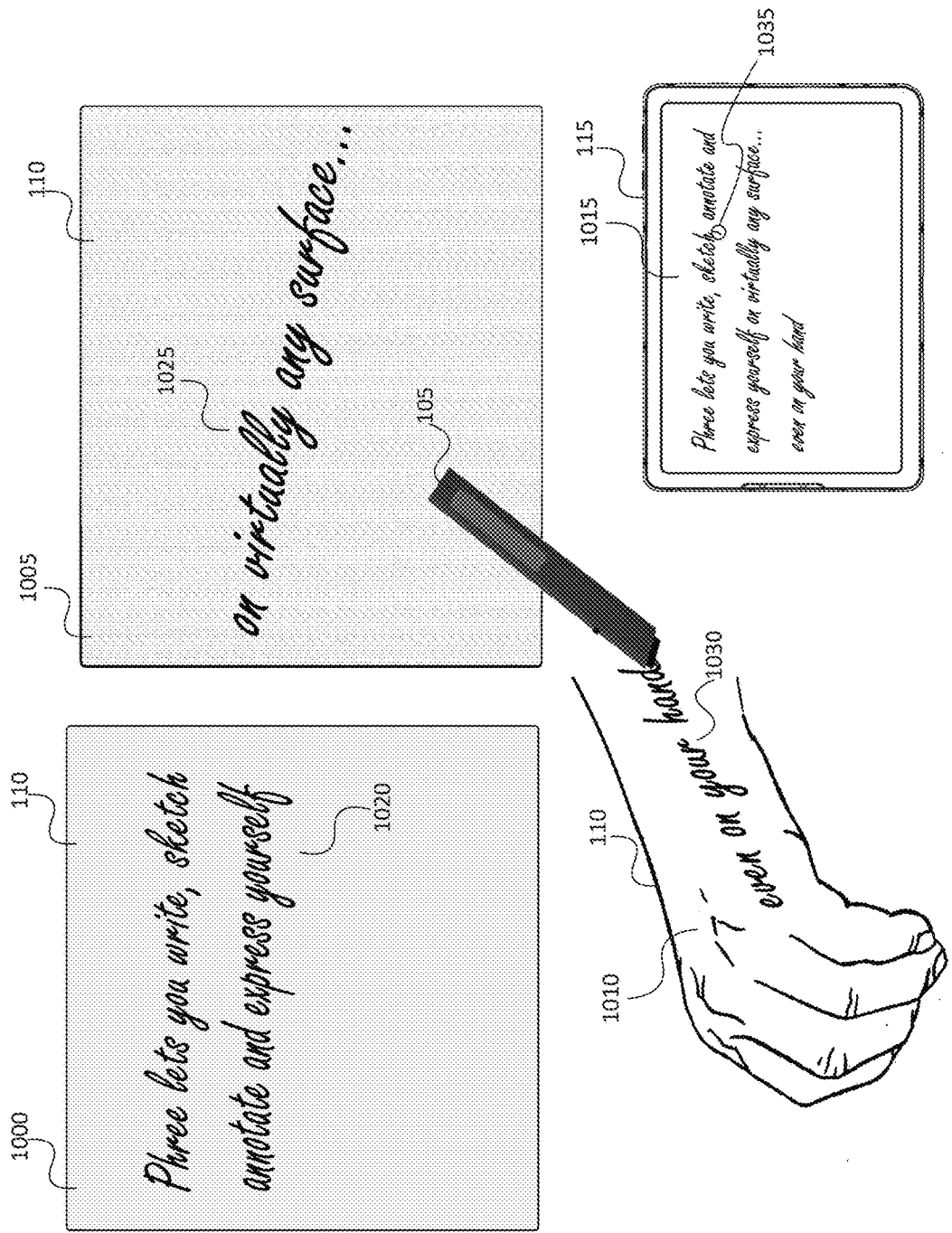
FIG. 10 is a schematic illustration of the example stylus shown in FIG. 1 generating writing input from multiple surfaces, according to some embodiments.

FIG. 10 is a diagrammatic representation of stylus 105 moving relative to multiple surfaces 110 to generate writing input that may be presented on the display of paired device 115, consistent with disclosed embodiments. In FIG. 10, multiple surfaces 110 include presentation of text that was previously entered. As discussed above with reference to FIGS. 7 and 8, it should be understood that the presentation of the text on multiple surfaces 110 is only exemplary and optional. In some embodiments, stylus 105 may not leave any marks on multiple surfaces 110 when it generates writing input.

FIG. 10 illustrates a simplified example of stylus 105 accepting writing input from a plurality of distinct surfaces 110: a first non-coded surface 1000, a second surface 1005, and a hand 1010 that may serve as an additional non-coded surface. In some embodiments, stylus 105 may measure data indicative of the changing positions of distal end 125 when distal end 125 moves relative to the plurality of surfaces 110. Stylus 105 may also generate from the measured data a plurality of series of strokes by distal end 125, and transmit the plurality of series of strokes to paired device 115 to cause presentation of all the plurality of series of strokes on a third surface 1015 associated with paired device 115.

FIG. 10 illustrates an example of entering a single sentence from three surfaces during a segmented writing session. In the figure, user 100 enters first strokes 1020 ("Phree lets you write, sketch annotate and express yourself") being the first part of the sentence from first non-coded surface 1000, enters second strokes 1025 ("on virtually any surface . . . ") being the second part of the sentence from second surface 1005, and enters third strokes 1030 ("even on your hand") being the third and last part of the sentence from hand 1010. As shown, the complete sentence may be contiguously presented on third surface 1015. Specifically, third surface 1015 displays a melding of first strokes 1020, second strokes 1025, and third strokes 1030 as if the strokes occurred on a common surface. As used herein, the term "displaying a melding of strokes" broadly means presenting writing input that was generated from different sources in a single location.

The display of paired device 115 is referred herein as third surface 1015 because in some implementations the display of paired device 115 may be one of the multiple surfaces 110 that stylus 105 may move relative to when entering text. Processor 250 may be configured to treat the movement of distal end 125 relative to the display of paired device display of paired device 115 in several ways. In the first way, the display of paired device 115 may be considered as any regular surface 110. Therefore, any movement of distal end 125 will be presented subsequent to previously entered text. In a second way, the location of distal end 125 relative to the displayed text may have a meaning, and stylus 105 may enable user 100 to revise previously entered text. Accordingly, in some embodiments, processor 250 may identify that if stylus 105 moved relative to the display of paired device 115 and treat the generated input differently. For example, upon entering the sentence "Phree lets you write, sketch annotate and express yourself on virtually any surface . . . even on your hand," user 100 decided to enter a comma between the word "sketch" and the word "annotate." In the first way, stroke 1035 may generate a comma that would have been presented after the last word of the sentence "hand." But in the second way, stroke 1035 may generate a comma between the word "sketch" and the word "annotate." In related embodiments, stylus 105 enables user 100 to select which way to treat the display of paired device 115.

Figure 11:
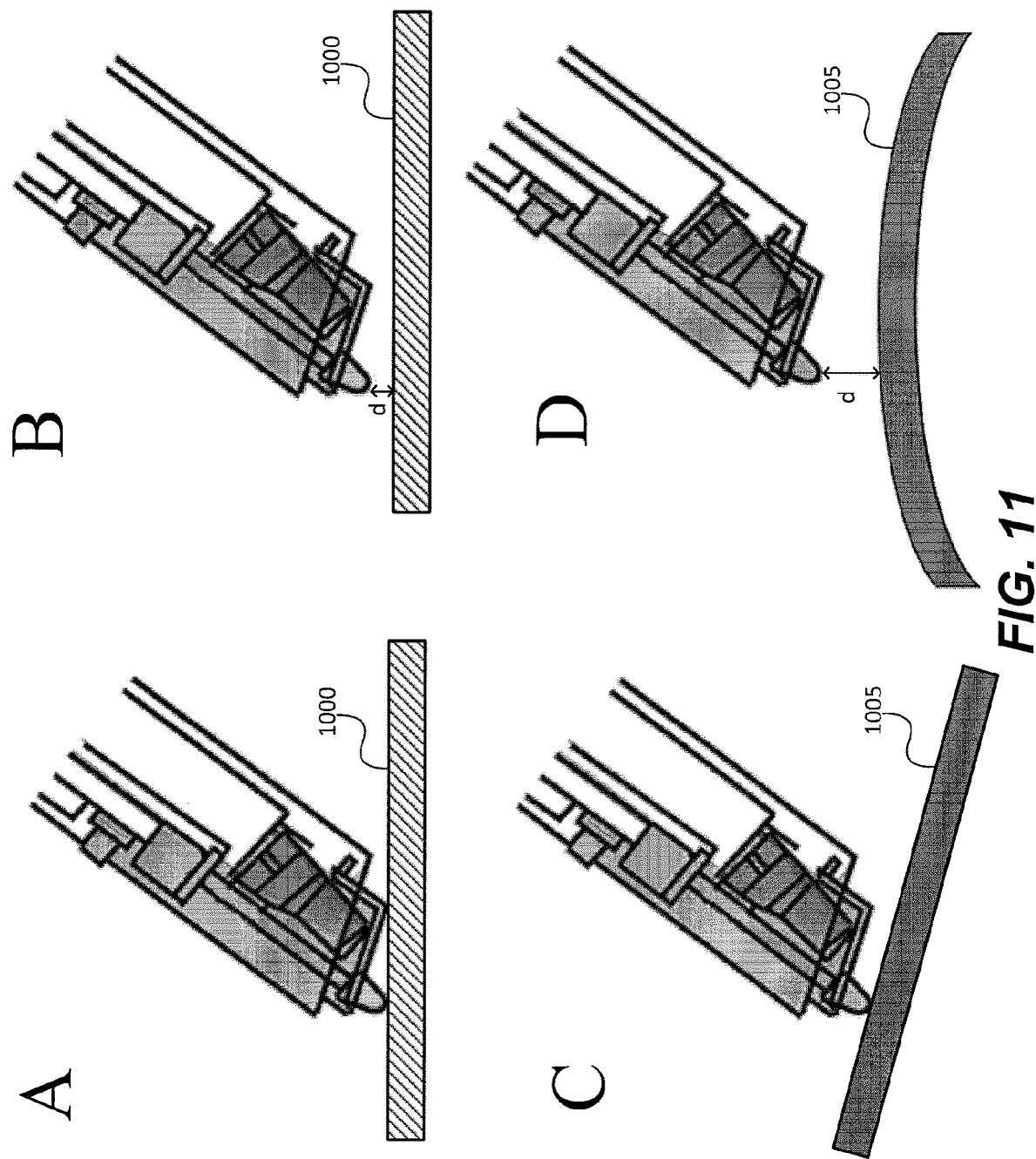
FIG. 11 is a schematic illustration that depicts four views representing how the example stylus shown in FIG. 1 may move relative to multiple surfaces.

FIG. 11 includes four views representing how stylus 105 may move relative to first non-coded surface 1000 and relative to second surface 1005 in a single writing session. In view A, processor 250 may determine the movements of distal end 125 when stylus 105 moves in contact with first non-coded surface 1000. During on-surface motions, tip 130 may be in contact with first non-coded surface 1000. In view B, stylus 105 moves out of contact with first non-coded surface 1000. During above-surface motions, processor 250 may determine the movements of distal end 125 relative to first non-coded surface 1000 from information measured by sensor 200 and from other sources (e.g., force sensor 230 and movement sensor 235). In one embodiment, sensor 200 may measure reflections 405 of coherent light 400 from first non-coded surface 1000 even when distal end 125 may be spaced more than 15 mm from first non-coded surface 1000. The combination of on-surface motions and above-surface motions is discussed in detail above with reference to FIGS. 4-6. In one example, stylus 105 may identify the combination of on-surface motions and above-surface motions relative to first non-coded surface 1000 to generate a first part of a writing session. Stylus 105 may transmit the first part of the writing session via transmitter 225 to paired device 115 to cause presentation of the first part of the writing session on the display of paired device.

In view C, stylus 105 moves in contact with second surface 1005. Consistent with some embodiments, first non-coded surface 1000 may be constructed of a first material and second surface 1005 may be constructed of a second material different from the first material. For example, first non-coded surface 1000 may be constructed of a rigid material, such as metal, while second surface 1005 may be constructed of a material somewhat flexible, such as stretched fabric. As shown in the view C, second surface 1005 may be tilted down. In some embodiments, stylus 105 may generate writing input when surface 110 may be positioned horizontally, vertically, or in any other angle. In view D, stylus 105 moves out of contact with second surface 1005. As shown in the view D, second surface 1005 may include a convex portion. In some embodiments, stylus 105 may generate writing input when surface 110 includes a flat portion, a concave portion, a convex portion, or any combination thereof. In one example, stylus 105 may identify the combination of on-surface motions and above-surface motions relative to second surface 1005 to generate a second part of the writing session. Stylus 105 may transmit the second part of the writing session via transmitter 225 to paired device 115 to cause melding of the first and second parts of the writing session, such that the first and second parts of the writing session appeared to have occurred on a common surface.

In some embodiments, before using stylus 105 for generating writing input, user 100 may use paired device 115 to identify a previous writing session. Thereafter, the generated writing input may be included in the identified writing session. For example, user 100 may identify an existing conversation (e.g., a chat) with a friend, and the generated writing input will be included in the existing conversation. In other embodiments, processor 250 may detect one or more stylus gestures identifying different writing sessions. For example, one stylus gesture may indicate that user 100 wants to start a new writing session, another stylus gesture may indicate that user 100 wants to continue the last writing session, and additional stylus gesture may indicate that user 100 wants to enter text to a specific writing session (e.g., a To-Do list). After identifying a stylus gesture associated with a specific writing session, processor 250 may instruct paired device to present the subsequent writing input contiguously with previously writing input in the identified writing session, regardless of that the previously writing input was generated on a different surface 110.

Figure 12:
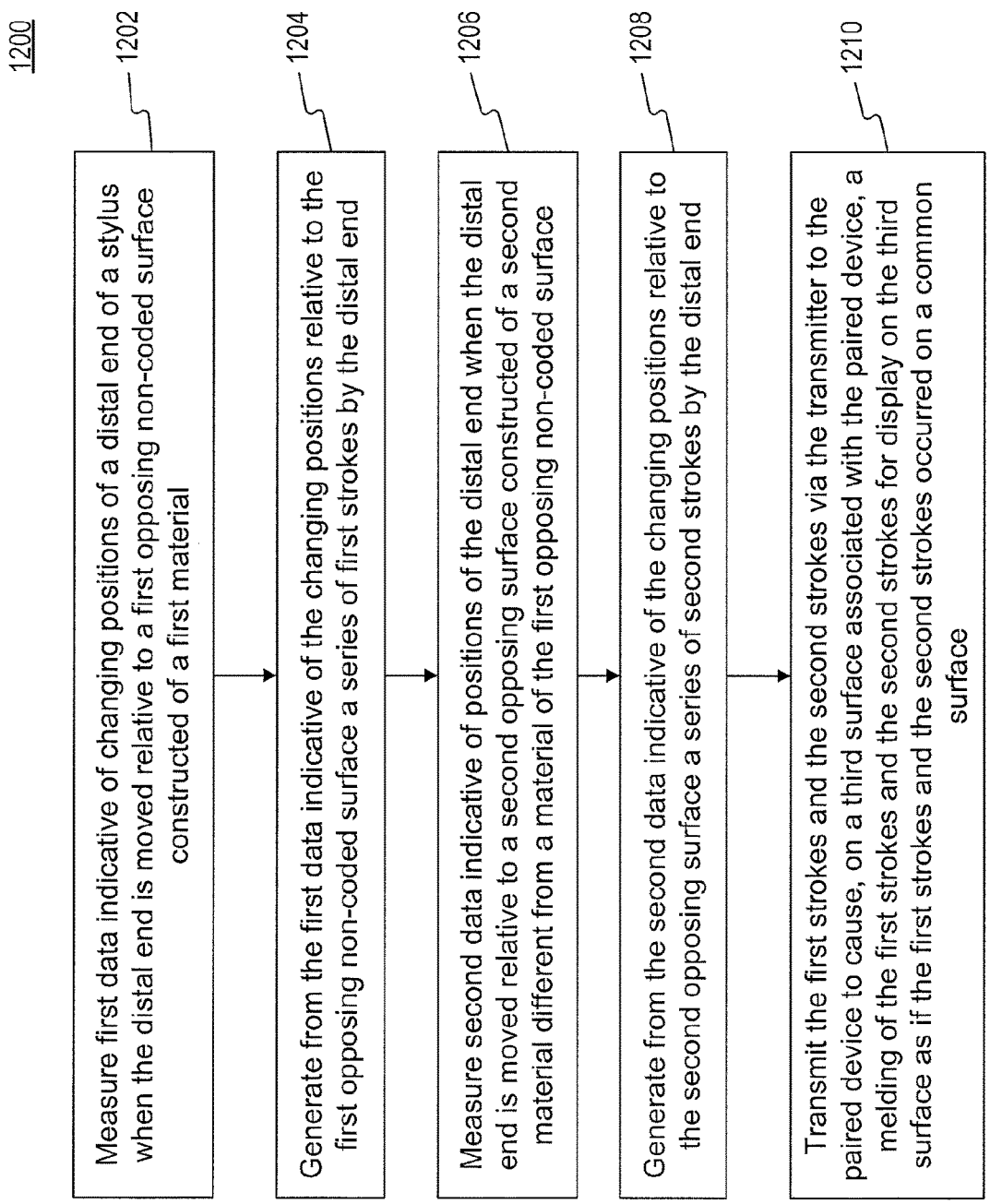
FIG. 12 is a flow diagram of an exemplary process for generating writing input using a stylus, consistent with disclosed embodiments.

FIG. 12 is a flowchart showing an exemplary process 1200 for generating text input from multiple surfaces, consistent with disclosed embodiments. At step 1202, sensor 200 may measure first data indicative of changing positions of distal end 125 when distal end 125 is moved relative to first non-coded surface 1000 constructed of a first material. The first data may include information distinguishing between movement of distal end 125 in contact with first non-coded surface 1000 and movement of distal end 125 out of contact with first non-coded surface 1000. At step 1204, processor 250 may generate, from the first data indicative of the changing positions relative to first non-coded surface 1000, a series of first strokes 1020 by distal end 125. The series of first strokes 1020 may be associated with a first part of a writing input to be presented with virtual ink on the display of paired device 115

At step 1206, sensor 200 may measure second data indicative of the positions of distal end 125 when distal end 125 is moved relative to second surface 1005 constructed of a second material different from a material of first non-coded surface 1000. The second data may include information distinguishing between movement of distal end 125 in contact with second surface 1005 and movement of distal end 125 out of contact with second surface 1005. In a specific example, sensor 200 may be configured to enable measurement of the first data when first non-coded surface 1000 includes a concave portion, and to enable measurement of the second data when second surface 1005 includes a convex portion. In a specific example, sensor 200 may be configured to enable measurement of the first data when first non-coded surface 1000 is the display of a computing device (e.g., a TV, smartphone, tablet, or a smartwatch) that may or may not be paired to stylus 105, and to enable measurement of the second data when second surface 1005 is made of fabric (e.g., jeans).

In some embodiments, sensor 200 includes light source 300 configured to project coherent light 400 on first non-coded surface 1000 and second surface 1005. Accordingly, measuring the first data may include measuring first reflections 405 as distal end 125 moves relative to first non-coded surface 1000, and measuring the second data may include measuring second reflections 405 as distal end 125 moves relative to second surface 1005. In addition, processor 250 may distinguish between first reflections 405 and second reflections 405 and classify first reflections 405 and second reflections 405 differently from each other when generating the series of first strokes 1020 and series of second strokes 1025. In some cases, the first material may have one or more different light absorption characteristics than the second material. Processor 250 may identify, from the changes of reflections 405, when user 100 starts to generate input from a surface made of the second material and when user 100 returns to generate input from the surface made of the first material. Processor 250 may use this identification to determine if user 100 desire to start a new writing session or to continue with a previous writing session.

At step 1208, processor 250 may generate, from the second data indicative of the changing positions relative to the second surface 1005, a series of second strokes 1025 by distal end 125. The series of second strokes 1025 may be associated with a second part of a writing input to be present with virtual ink on the display of paired device 115. Processor 250 may generate both the series of first and second strokes in an absence of codes or stylus marks on both first non-coded surface 1000 and second surface 1005. In some embodiments, sensor 200 may measure third data indicative of positions of distal end 125 when distal end 125 is moved relative to the display of paired device 115, and processor 250 may generate from the third data a series of third strokes by distal end 125.

At step 1210, processor 250 may transmit first strokes 1020 and second strokes 1025 via transmitter 225 to paired device 115 to cause, on third surface 1015 associated with paired device 115, a melding of first strokes 1020 and second strokes 1025 for display on third surface 1015 as if the first strokes 1020 and the second strokes 1025 occurred on a common surface. In one example, the melding of first strokes 1020 and second strokes 1025 includes displaying first strokes 1020 and at least part of second strokes 1025 in a same line. In another example, the melding of first strokes 1020 and second strokes 1025 includes displaying second strokes 1025 below first strokes 1020. In some embodiments, processor 250 may set an initial alignment and align with the initial alignment non-aligned text input associated with first strokes 1020. In other embodiments, processor 250 may cause text input associated with first strokes 1020 to be contiguously presented on the display of paired device 115 with text input associated with second strokes 1025 despite that first strokes 1020 and second strokes 1025 did not occur on a same surface. Processor 250 may also identify that first strokes 1020 occurs along a first azimuth and second strokes 1025 occurs along a second azimuth, non-aligned with the first azimuth, and to cause second strokes 1025 to be displayed on the display of paired device 115 along the first azimuth.

Some embodiments consistent with the present disclosure provide a stylus configured to generate input from data originating from multiple sources. When generating input, such as writing input or input for controlling paired device 115, an accurate determination of data indicative of the changing positions of distal end 125 is desired. Consistent with disclosed embodiments, processor 250 may determine the data based on information measured by stylus 105. As discussed above, processor 250 may or may not be located within stylus 105. Additionally, in some embodiments, processor 250 may determine the data indicative of the changing positions of distal end 125 relative to surface 110 solely from information measured by sensor 200. In other embodiments, processor 250 may determine the data from information measured by sensor 200 and from other sources (e.g., force sensor 230 and movement sensor 235). Combining multiple sources to determine the data indicative of the changing positions of distal end 125 may be advantageous because it can yield more accurate results. But the process of combining the information from sensor 200 with information from movement sensor 235 is far from being straightforward, since the different sensors may measure differing types of information in different frames of reference.

In accordance with a disclosed embodiment, a three-dimensional stylus positioning system is provided. The stylus may include a housing having a distal end, and a light source within the housing and configured to project coherent light on a surface opposing the distal end. The stylus may further include at least one sensor within the housing and configured to measure reflections of the coherent light from the opposing surface as the distal end is moved relative to the opposing surface, and at least one movement sensor within the housing and configured to detect acceleration as the distal end is moved relative to the opposing surface. The stylus may also include at least one processor configured to determine three dimensional positions of the distal end based on coherent light reflections information received from the at least one sensor and acceleration information received from the at least one movement sensor.

In some embodiments, the at least one sensor includes a plurality of light detectors and is further configured to detect reflections in three non-collinear directions. The at least one movement sensor includes a plurality of accelerometers and is further configured to detect acceleration in up to three non-collinear directions. The at least one movement sensor includes a plurality of gyroscopes and is further configured to detect rotations in three directions. The at least one processor is further configured to identify a situation where the coherent light reflections information is temporary unavailable, and to determine the three dimensional positions of the distal end based only on acceleration information received from the at least one movement sensor. The stylus may further include a contact sensor configured to provide feedback when the distal end is in contact with the opposing surface, and the at least one processor is further configured to determine stylus movement based on a combination of feedback from the contact sensor, the at least one movement sensor, and the at least one sensor. The at least one processor is further configured to determine writing input based on the three dimensional positions of the distal end as determined from feedback from the contact sensor, the at least one movement sensor, and the at least one sensor.

The stylus may further include a wireless transmitter, and the at least one processor is configured to wirelessly send to a paired device information reflective of the three dimensional positions of the distal end as determined from coherent light reflections information received from the at least one sensor, acceleration information received from the at least one movement sensor, and contact information received from the contact sensor. The at least one processor is further configured to control a plurality of unrelated paired devices based on the three dimensional positions of the distal end as determined from coherent light reflections information received from the at least one sensor, acceleration information received from the at least one movement sensor, and contact information received from the contact sensor. The at least one processor is further configured to identify a selection of an unrelated device based on the three dimensional positions of the distal end as determined from coherent light reflections information received from the at least one sensor, acceleration information received from the at least one movement sensor, and contact information received from the contact sensor. The at least one processor is further configured to access stored pattern information and to authenticate a user by determining whether a substantial match exists between the pattern information and the three dimensional positions of the distal end as determined from coherent light reflections information received from the at least one sensor and acceleration information received from the at least one movement sensor. The coherent light source includes a laser diode. The contact sensor includes a force-activated switch.

In accordance with another disclosed embodiment, a device is provided for determining three dimensional positions of a stylus including a coherent light source configured to project coherent light on a surface opposing a distal end of the stylus. The device may include at least one processor configured to receive information associated with reflections of the coherent light from the opposing surface as the distal end is moved relative to the opposing surface, and receive, from at least one movement sensor, information associated with acceleration of the stylus as the distal end is moved relative to the opposing surface. The at least one processor is further configured to determine three dimensional positions of the distal end based at least on information received from the at least one sensor and the at least one movement sensor.

In related embodiments, the at least one processor is further configured to receive information from a contact sensor, and to determine three dimensional positions of the distal end based on a combination of information received from the at least one sensor, the at least one movement sensor, and the contact sensor. The at least one sensor includes a plurality of light detectors for detecting reflections in three non-collinear directions. The at least one processor is further configured to determine three dimensional positions of the distal end based in part on the reflections in the three non-collinear directions. The at least one movement sensor includes a plurality of accelerometers and gyroscopes and wherein the at least one processor is further configured to determine acceleration and rotation in three directions based on output from the plurality of accelerometers and gyroscopes. The at least one processor is further configured to determine writing input based on the three dimensional positions of the distal end as determined from feedback from the contact sensor, the at least one movement sensor and the at least one sensor. The at least one processor is further configured to control a wireless transmitter to send to a paired device information reflective of the three dimensional positions of the distal end as determined from coherent light reflections information received from the at least one sensor and acceleration information received from the at least one movement sensor. The at least one processor is further configured to control a plurality of unrelated paired devices based on the three dimensional positions of the distal end as determined from coherent light reflections information received from the at least one sensor and acceleration information received from the at least one movement sensor. The at least one processor is further configured to identify a selection of an unrelated device based on the three dimensional positions of the distal end as determined from coherent light reflections information received from the at least one sensor and acceleration information received from the at least one movement sensor. The at least one processor is further configured to access stored pattern information and to authenticate a user by determining whether a substantial match exists between the pattern information and the three dimensional positions of the distal end as determined from coherent light reflections information received from the at least one sensor and acceleration information received from the at least one movement sensor.

In accordance with another disclosed embodiment, a method is provided for determining three dimensional positions of a stylus. The method includes projecting a coherent light on a surface opposing a distal end of the stylus. The method further includes receiving information associated with reflections of the coherent light from the opposing surface as the distal end is moved relative to the opposing surface, and receiving, from at least one movement sensor, information associated with acceleration of the stylus as the distal end is moved relative to the opposing surface. The method also includes determining three dimensional positions of the distal end based at least on information received from the at least one sensor and the at least one movement sensor.

Figure 13:
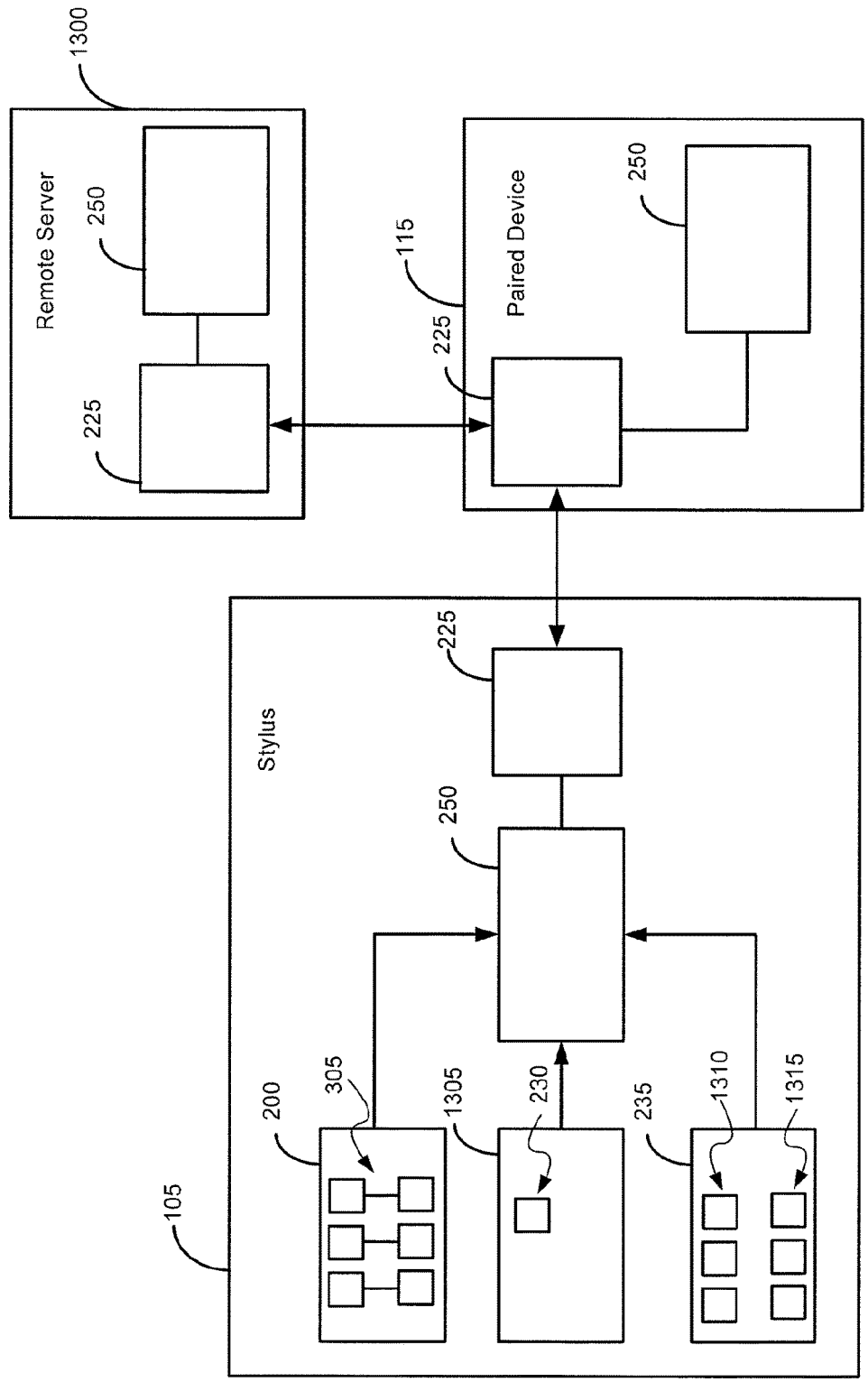
FIG. 13 is a block illustration that shows different approaches to determine the changing positions of a stylus, according to some embodiments.

FIG. 13 is a block diagram illustrating some of components of stylus 105, paired device 115, and a remote server 1300 that may be part of the process of determining the data indicative of the changing positions of distal end 125, consistent with disclosed embodiments. FIG. 13 depicts three possible locations of processor 250. Each possible location may be associated with a different approach for determining the data indicative of the changing positions of distal end 125.

In the first approach, processor 250 may be located in stylus 105. In this approach, stylus 105 may determine the data indicative of the changing positions of distal end 125 using information received directly from at least one of: sensor 200, force sensor 230 and movement sensor 235. Thereafter, stylus 105 may transmit the determined data to paired device 115 for generating writing input or for controlling paired device 115. For example, stylus 105 may identify to a series of strokes by distal end 125 and transmit the series of strokes to cause presentation of writing input on the display of paired device 115.

In the second approach, processor 250 may be located in paired device 115. In this approach, stylus 105 may transmit to paired device 115 a raw data stream including information from at least one of: sensor 200, force sensor 230 and movement sensor 235. The term "raw data stream" refers to any data stream that includes information that needs to be further processed in order to generate input. In one example, the raw data stream may include partially processed information. Stylus 105 may transmit raw data streams to a paired smartphone over a short range communication connection (e.g., a Bluetooth connection). Then, a previously installed off-line application on the smartphone may generate writing input from the raw data streams. In this approach, paired device 115 may store user specific information, such as calibration information associated with the way that user 100 holds stylus 105. The user specific information may assist processor 250 to accurately generate writing input for presentation on the display of paired device 115.

In the third approach, processor 250 may be located in remote server 1300. In this approach, stylus 105 may also transmit raw data streams to paired device 115. In turn, paired device 115 may communicate said data streams with the remote server that can determine the data indicative of the changing positions of distal end 125 and communicate back with paired device 115. For example, stylus 105 may transmit raw data streams to a device over a short range communication connection (e.g., a Bluetooth connection). The device may not be able to determine the data indicative of the changing positions of distal end 125 from the data stream, so it forwards the data stream to an Internet server. The Internet server may identify in the determined data an authentication pattern associated with the user 100 and transmit an identification of user 100 to the device.

As shown in FIG. 13, stylus 105 may include sensor 200 configured to measure reflections 405 of coherent light 400 from surface 110 as distal end 125 is moved relative to surface 110. Sensor 200 may include a plurality of light detectors 305 to detect reflections 405 in three non-collinear directions. For example, sensor 200 may include at least three pairs of light detectors 305 each pair configured to detect a differing reflection 405 of coherent light 400 in non-collinear spatial directions. In some embodiments, stylus 105 may further include a contact sensor 1305 configured to provide feedback when distal end 125 is in contact with surface 110. One example of contact sensor 1305 may include force sensor 230, which can provide a value of a parameter representative of the force applied by tip 130 on surface 110. Alternatively, contact sensor 1305 may include a device, such as a force-activated switch, which may provide contact information indicative when stylus 105 is in contact and out of contact with surface 110. In addition, force sensor 230 may provide a value representing the force applied against surface 110, and processor 250 may change the input based on the value provided. For example, processor 250 may change the thickness of the writing input based on the value provided.

In addition, stylus 105 may further include a movement sensor 235 configured to detect acceleration as distal end 125 is moved relative to surface 110. In one example, movement sensor 235 may include a plurality of accelerometers 1310 for detecting acceleration in two or three non-collinear directions. In addition, movement sensor 235 may include a plurality of gyroscopes 1315 for detecting rotations in at least two directions. Accordingly, processor 250 may determine the three dimensional positions of distal end 125 based on at least one of: coherent light reflections information received from sensor 200, linear and/or angular acceleration information received from movement sensor 235, and contact information received from the contact sensor 1305.

In one embodiment, processor 250 may use the data indicative of the changing positions of distal end 125 to authenticate user 100. For example, memory 255 may store a three-dimensional pattern information relating to a user's typical movements. Processor 250 may determine the data indicative of the changing positions of distal end 125 using information received directly from at least one of: sensor 200, force sensor 230 and movement sensor 235. Before or during a writing session, processor 250 may compare the determined data with the three-dimensional pattern information, and determine, based on the comparison, whether a substantial match exists between the received data and the three-dimensional pattern information. When processor 250 determines that substantial match exists, processor 250 may trigger an authentication of user 100.

Figure 14:
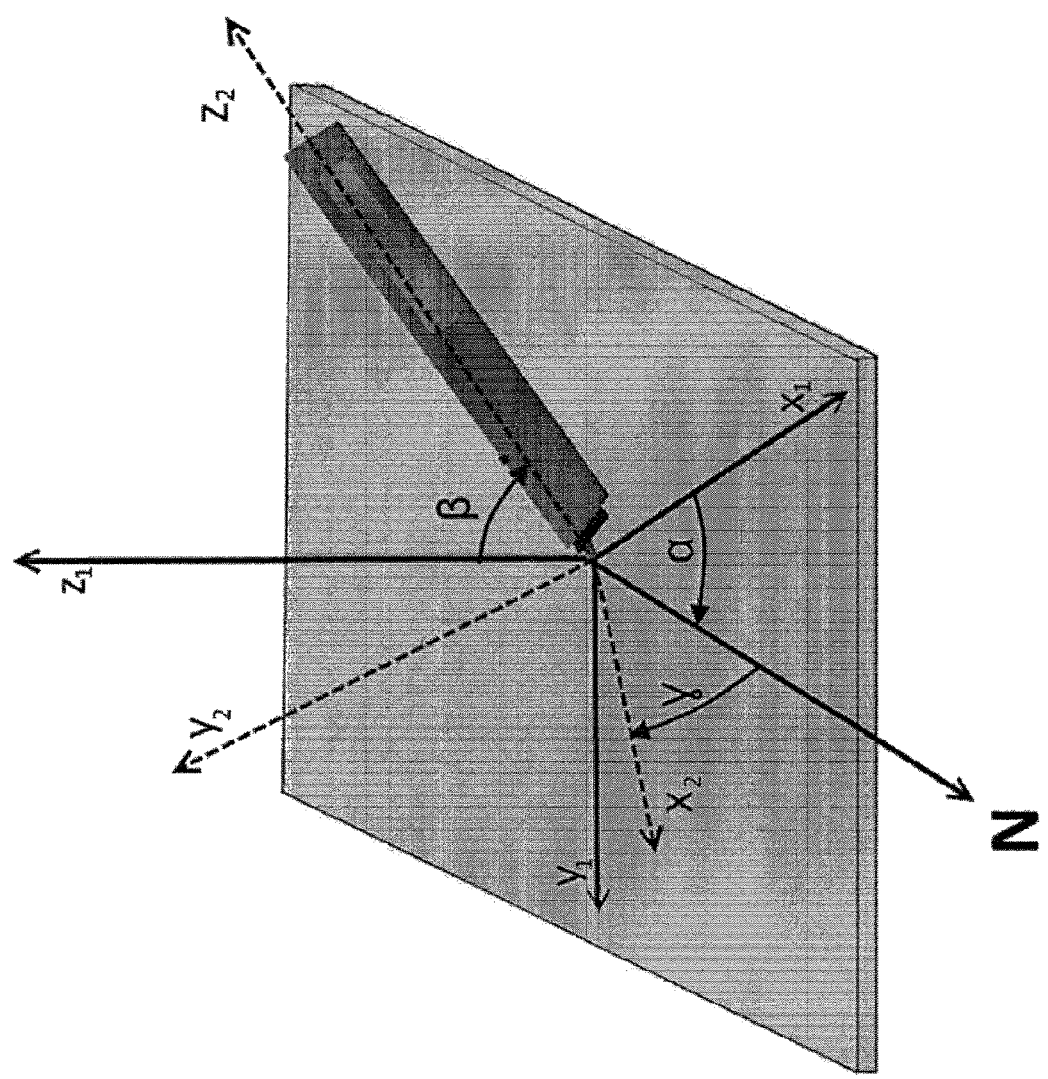

FIG. 14 is a schematic illustration of the coordinate system of surface 110 ($x_1$, $y_1$, and $z_1$) relative to the coordinate system of stylus 105 ($x_2$, $y_2$, and $z_2$). The surface's coordinate system $x_1y_1z_1$ is designated such that $z_1$ is along the normal to surface 110 and $x_1y_1$ is in the plane of surface 110. The stylus' coordinate system $x_2y_2z_2$ is designated such that $z_2$ is along the long axis of stylus 105. The intersection between planes $x_1y_1$ and $x_2y_2$ defines an additional axis known as "the line of nodes" N. In this figure, stylus 105 is tilted from surface 110 by angle β (the angle between $z_1$ and $z_2$), rotated around its long axis by angle Y (the angle between N and $x_2$) and its horizontal direction of motion is offset from surface x axis by angle α. Sensor 200 may measure relative motion of stylus 105 versus surface 110. When stylus 105 is moved while in contact with surface 110, sensor 200 may provide information regarding the tilt of stylus 105 (e.g., estimates of angles β and Y). Movement sensor 235 may measure the tilt with respect to earth's gravitational force, g. The relative tilts of stylus 100 with respect to surface 110 can be estimated also when distal end 125 is not in contact with surface 110 using information from movement sensor 235. In some embodiments, sensor 200 may be used to measure motion information in the stylus' coordinate system $x_2y_2z_2$, and movement sensor 235 may be used to measure motion information (e.g., tilt and rotation information) in the surface's coordinate system $x_1y_1z_1$. In other embodiments, sensor 200 and movement sensor 235 may be used to measure motion information in the stylus' coordinate system $x_2y_2z_2$, and motion information (e.g., tilt and rotation information) may be used to complement the information from sensor 200. The tilt information can be used to continuously track angle β, and the rotation information can be used to continuously track angle Y.

Consistent with disclosed embodiments, processor 250 may use the tilt information and the rotation information to continuously estimate the transformation between coordinate systems $x_1y_1z_1$ and $x_2y_2z_2$. In some embodiments, processor 250 may determine the three dimensional positions of distal end 125, when movement sensor 235 provides acceleration information in two directions and rotation information around a perpendicular direction. In other embodiments, processor 250 may determine the three dimensional positions of distal end 125, when movement sensor 235 provides acceleration information in three orthogonal directions.

When stylus 105 moves in direct contact with surface 110, there is no motion along $z_1$ direction. Accordingly, the tilt and rotation angles can be estimated by the instantaneous ratio of measured motion along $x_2$ and $z_2$ directions and $y_2$ and $z_2$ directions, respectively, and may be calculated from data received from sensor 200. When stylus 105 moves out of contact with surface 110, the measured motion may contain a component along $z_2$ direction, which may affect the accuracy of tilt estimation from measured motion by sensor 200. However, linear and/or angular acceleration information provided by movement sensor 235 can be used to keep an accurate estimate of the tilt and rotation angles when tip 130 does not touch surface 110. Accordingly, the information measured by movement sensor 235 may be used to improve the accuracy of the determination of the data indicative of the changing positions of distal end 125.

Figure 15:
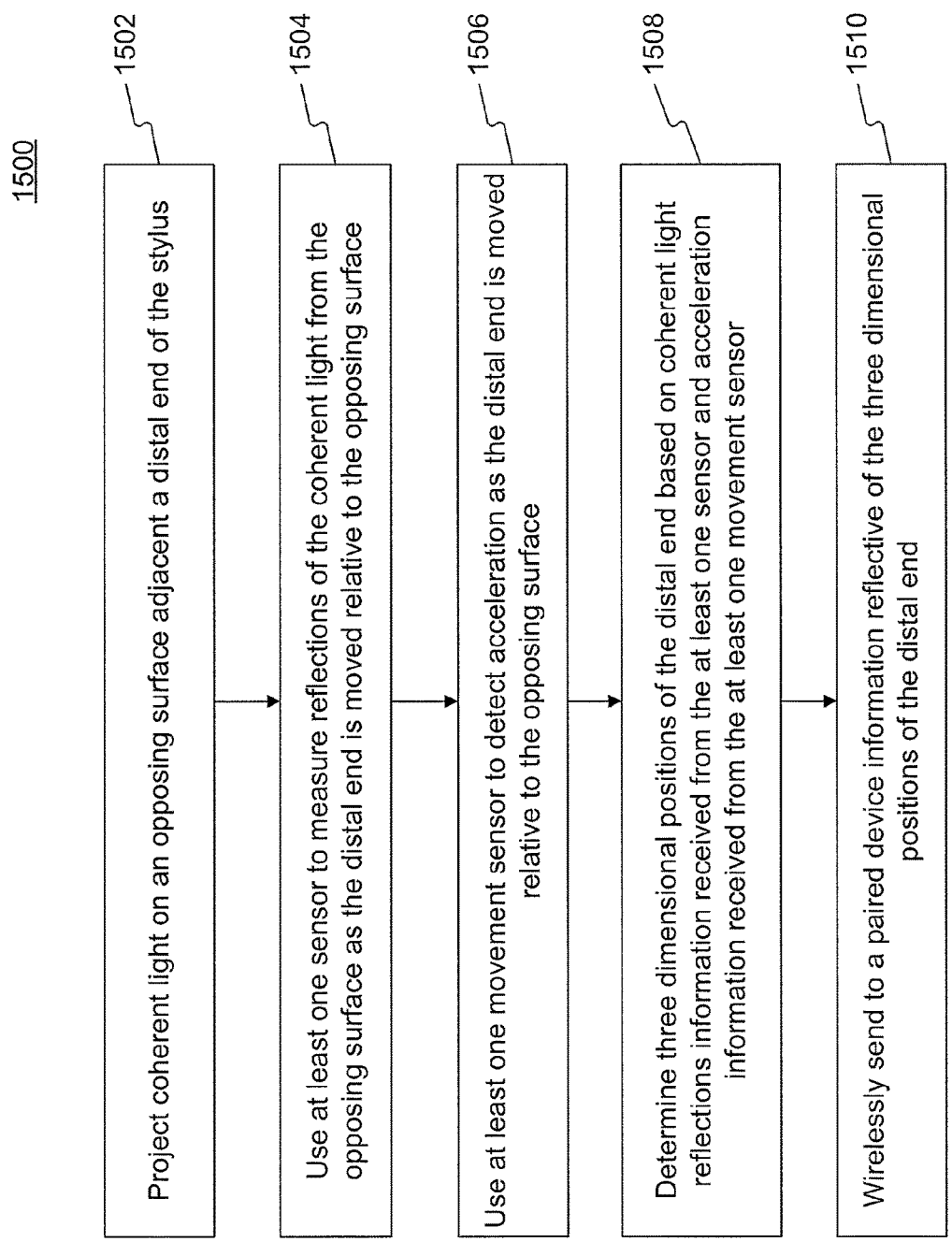
FIG. 15 is a flow diagram of an exemplary process for determining three dimensional positions of a stylus, consistent with disclosed embodiments.

FIG. 15 is a flowchart showing an exemplary process 1500 for determining three dimensional positions of stylus 105, consistent with disclosed embodiments. At step 1502, light source 300 may project coherent light 400 on surface 110 adjacent distal end 125 of stylus 105. In some embodiments, coherent light source 400 includes a laser diode. At step 1504, sensor 200 may measure reflections 405 of coherent light 400 from surface 110 when distal end 125 is moved relative to surface 110. In some embodiments, sensor 200 may include a plurality of light detectors and is further configured to detect reflections in three non-collinear directions.

At step 1506, movement sensor 235 may detect acceleration as distal end 125 is moved relative to earth's gravitational force g. In some embodiments, movement sensor 235 may include a plurality of accelerometers 1310 for detecting acceleration in at least three non-collinear directions. In another embodiment, movement sensor 235 may include a plurality of gyroscopes 1315 for detecting rotations in one or more directions, for example, at least three directions.

At step 1508, processor 250 may determine the three dimensional positions of distal end 125 based on coherent light reflections information received from sensor 200 and acceleration information received from movement sensor 235. In some embodiments, processor 250 may identify a situation where the coherent light reflections information is temporarily unavailable, and determine the three dimensional positions of distal end 125 based only on acceleration information received from movement sensor 235. For example, the coherent light reflections information may be temporarily unavailable when distal end 125 is moved more than 50 mm above surface 110. In other embodiments, processor 250 may access stored pattern information and authenticate user 100 by determining whether a substantial match exists between the pattern information and the three dimensional positions of distal end 125 as determined from coherent light reflections information received from sensor 200 and acceleration information received from movement sensor 235.

In some embodiments, stylus 105 may include contact sensor 1305 configured to provide feedback when distal end 125 is in contact with surface 110. For example, contact sensor 1305 may include a force-activated switch. In these embodiments, processor 250 may determine the stylus movements based on a combination of feedback from contact sensor 1305, movement sensor 235, and sensor 200. In addition, processor 250 may determine writing input based on the three dimensional positions of distal end 125 as determined from feedback from contact sensor 1305, movement sensor 235, and sensor 200.

At optional step 1510, processor 250 may wirelessly send to paired device 115 information reflective of the three dimensional positions of distal end 125 as determined from coherent light reflections information received from sensor 200, acceleration information received from movement sensor 235, and contact information received from contact sensor 1305. In some embodiments, processor 250 may control a plurality of unrelated paired devices 115 based on the three dimensional positions of distal end 125 as determined from coherent light reflections information received from sensor 200, acceleration information received from movement sensor 235, and contact information received from contact sensor 1305. In addition, processor 250 may identify a selection of an unrelated device based on the three dimensional positions of distal end 125 as determined from coherent light reflections information received from sensor 200, acceleration information received from movement sensor 235, and contact information received from contact sensor 1305.

In some embodiments, stylus 105 may trigger one or more predefined functionalities in paired device 115. The term "functionality" may broadly be defined to include any operation or a set of operations that can be executed. In some embodiments, a functionality may be contained in, for example, a program, an application, a script, or a macro. In these embodiments, the term "triggering a functionality" may refer to causing execution of, for example, the program, the application, the script, or the macro. Several motivations may exist for providing stylus 105 with the capability to trigger one or more predefined functionality in paired device 115. First, providing the capability may reduce the need for user 100 to physically access paired device 115 that may not be located in a readily accessible location, such as a backpack, a trunk of a vehicle, or a pants pocket. Second, providing the capability may reduce disruptions to user 100 while user 100 is focused on using stylus 105. For example, by providing predefined functionalities for text formatting, user 100 may create a rich text content using stylus 105 without diverting his or her attention towards paired device 115 to access the text formatting functionalities.

In accordance with a disclosed embodiment, a stylus configured to trigger predefined functionality in a paired device is provided. The stylus may include a housing having a distal end, a light source in the housing configured to project coherent light on a non-coded surface opposing the distal end, and at least one sensor configured to receive reflections of the coherent light from the non-coded surface when the distal end is moved in a first manner in contact with the non-coded surface and when the distal end is moved in a second manner, out of contact with the non-coded surface. The stylus may further include a transmitter configured to communicate with the paired device and at least one processor configured to determine three-dimensional positions of the stylus and to send to the paired device, via the transmitter, information relating to three-dimensional positions, wherein the information represents a three-dimensional stylus gesture that corresponds to at least one predefined function of the paired device, such that transmittal of the information to the paired device causes the paired device to execute the predefined function.

In some embodiments, the at least one sensor may be configured to receive at least three non-collinear reflections of the coherent light from the non-coded surface. The stylus gesture may be three-dimensional, and the at least one processor may be configured to determine, from the at least three non-collinear reflections, the three-dimensional stylus gesture. Furthermore, the reflections may include first reflections corresponding to movement of the distal end in contact with the opposing surface and second reflections corresponding to movement of the distal end out of contact with the opposing surface. The information relating to reflections sent to the paired device may correspond to both the first reflections and the second reflections.

In some embodiments, the reflections may correspond to at least one of text input and graphical input.

In some embodiments, the stylus gesture may include a predefined movement including a series of sub-movements at least one of which is in contact with the non-coded surface and at least one of which is out of contact with the non-coded surface.

In some embodiments, the at least one predefined function may include at least one of activating a screen of the paired device, opening a specific application in the paired device, initiating a communication session, and performing a text editing function.

In some embodiments, the information may further include identification of an individual with contact information stored in the paired device.

In some embodiments, the at least one processor may be further configured to transmit the information to the paired device in order to cause the paired device to initiate a communication session with the individual.

In some embodiments, the at least one processor may send the stylus gesture to the paired device to cause the paired device to initiate a comparison between the gesture and three-dimensional pattern information stored in a memory, reflective of a user's typical movements relative to the non-coded surface, to thereby authenticate the user.

In some embodiments, the transmitter may be configured to communicate with the paired device over a short-range communication protocol.

In some embodiments, the at least one processor may be configured to cause a display to a user of a list of pairable devices for selection, and to subsequently cause a display to the user of a selected paired device.

In accordance with another disclosed embodiment, a method is provided for triggering predefined functionality in a paired device. The method includes projecting coherent light on a non-coded surface opposing a distal end of a stylus, receiving reflections of the coherent light from the non-coded surface when the distal end is moved relative to the non-coded surface, communicating with a paired device using a transmitter, and sending to the paired device, via the transmitter, information relating to the reflections from the non-coded surface. The information may represent a stylus gesture that corresponds to at least one predefined function of the paired device, such that transmittal of the information to the paired device causes the paired device to execute the predefined function In some embodiments, the received reflections may include at least three non-collinear reflections of the coherent light from the non-coded surface. The stylus gesture may be three-dimensional, and the method may further include determining, from the at least three non-collinear reflections, the three-dimensional stylus gesture. Furthermore, the reflections may include first reflections corresponding to movement of the distal end in contact with the opposing surface and second reflections corresponding to movement of the distal end out of contact with the opposing surface, and the information relating to reflections sent to the paired device may correspond to both the first reflections and the second reflections.

In some embodiments, the stylus gesture may include a predefined movement including a series of sub-movements at least one of which is in contact with the non-coded surface and at least one of which is out of contact with the non-coded surface.

In some embodiments, the at least one predefined function may include at least one of activating a screen of the paired device, opening a specific application in the paired device, initiating a communication session, and performing a text editing function.

In some embodiments, the information may further include identification of an individual with contact information stored in the paired device, and wherein the stylus gesture is transmitted to the paired device in order to cause the paired device to initiate a communication session with the individual.

In some embodiments, the stylus gesture may be sent to the paired device to cause the paired device to initiate a comparison between the gesture and three-dimensional pattern information stored in a memory, reflective of a user's typical movements relative to the non-coded surface, to thereby authenticate the user.

In some embodiments, the method may further include causing a display to a user of a list of pairable devices for selection, and subsequently causing a display to the user of a selected paired device.

In some embodiments, the information may represent a gesture that corresponds to a predefined function of activating a screen of the paired device, and that transmittal of the information to the paired device may cause the paired device to initiate a comparison between the gesture and three-dimensional pattern information stored in a memory, reflective of a user's typical movements relative to the non-coded surface, to thereby authenticate the user.

In another disclosed embodiment, device for triggering predefined functionality in a paired device is provided. The device may include at least one processor. The at least one processor may be configured to control a light source configured to project coherent light on a non-coded surface opposing a distal end of a stylus, receive from at least one sensor measurements of reflections of the coherent light from the non-coded surface when the distal end is moved relative to the non-coded surface, and send to the paired device, via a transmitter, information relating to the reflections from the non-coded surface. The information may represent a stylus gesture that corresponds to at least one predefined function of the paired device, such that transmittal of the information to the paired device causes the paired device to execute the predefined function.

In some embodiments, predefined functionalities may be generic functionalities that may be applicable to a wide range of device types. Generic predefined functionalities may include, for example, a functionality to emulate clicking of a mouse, a functionality to change sound volume on the paired device, a functionality to power on or off the paired device, a functionality to save, delete, and insert text, and more. In other embodiments, predefined functionalities may be functionalities unique to a paired device or a category of paired devices. In an example where the paired device is a smartphone, predefined functionalities may include a functionality to initiate or conclude a communication session (e.g., calling), and a functionality to launch a predetermined mobile application on the smartphone (e.g., calendar application). In another example where the paired device is a television, predefined functionalities may include a functionality to turn on the television, cable set-top box, and sound system at the same time and a functionality to change the current channel on the television.

In some embodiments, the predefined functionalities may include activating a screen of the paired device (e.g., waking the device up from a sleep status), opening a specific application in the paired device (e.g., opening a calendar application), initiating a communication session (e.g., initiating a call), performing a text editing function (e.g., deleting a word), or a combination thereof.

In some embodiments, predefined functionalities may relate to biometric authentication of user 100 for various applications on paired device 115. For example, predefined functionalities may include a functionality to initiate a comparison between the information transmitted by stylus 105 with stored information on paired device 115.

In some embodiments, the information may represent a stylus gesture that corresponds to a predefined functionality of activating a screen of the paired device. In this example, the transmittal of the information to the paired device may cause the paired device to initiate a comparison between the gesture and three-dimensional pattern information stored in a memory, reflective of a user's typical movements relative to the non-coded surface, to thereby authenticate the user.

In some embodiments, processor 250 may send the stylus gesture to the paired device to cause the paired device to initiate a comparison between the gesture and three-dimensional pattern information stored in a memory, reflective of a user's typical movements relative to the non-coded surface, to thereby authenticate the user.

In some embodiments, the information may represent writing input, a stylus gesture, or a combination thereof. In an example, the information representing the writing input may be converted to text using handwriting recognition software on paired device 115, and the text may be compared to a text-based password stored on paired device 115. In another example, information representing the writing input may be compared to an image of a handwritten signature stored on paired device 115. In yet another example, the information representing the stylus gesture may be compared to a stored three-dimensional movement pattern, such as a movement pattern representing a handwritten signature. It is understood that paired device 115 may use a known comparison algorithm to compare the information transmitted by stylus 105 with the information stored in paired device 115 and calculate a value representing the degree of similarity. It is also understood that the information representing the writing input and/or stylus gesture may not be identical to the stored information on paired device 115 even when user 100 is an authorized user. Therefore, in some embodiments, user 100 may be authenticated when the calculated value representing the degree of similarity is above a predetermined threshold.

In some embodiments, stylus 105 may encrypt the information transmitted to paired device 115. In an example, information may be encrypted using a secure communication chip that uses public/private key encryption technique.

The ability to accurately identify personal penmanship may enable use of relatively simple signatures as password replacements. User 100 may elect to use simple passwords, such as common words or drawings, for biometric authentication in lower security sites and use full signatures for authentication in high security sites such as for financial transactions.

In some embodiments, predefined functionalities may relate to the pairing process between stylus 105 and pairable devices. In an example, stylus 105 may be paired with one device (e.g., paired device 115). However, in other examples, user 100 may desire stylus 105 to be paired with additional pairable devices. In these embodiments, predefined functionalities may include a functionality to cause a list of pairable devices to be displayed. Once the list is displayed, user 100 may select one or more pairable devices by directly interfacing with paired device 115, by using stylus 105 to trigger a functionality that selects one or more pairable devices, or by using any other user interface available to paired device 115. Once one or more pairable devices are selected by user 100, a pairing process may be initiated to pair the selected pairable device with stylus 105. Additionally, predefined functionalities may also include a functionality to cause the selected pairable device to be displayed.

In some embodiments, predefined functionalities may be triggered by stylus 105 moving relative to surface 110 in accordance with a predetermined stylus gesture. A "stylus gesture" may broadly be defined as the movements that are measured by stylus 105. In some examples, a stylus gesture may include a predefined movement that includes a series of sub-movements at least one of which is in contact with surface 110 and at least one of which is out of contact with surface 110. A "predetermined stylus gesture" may broadly be defined as a stylus gesture that satisfies a predetermined criterion or is similar to a stored pattern of movements. The predetermined criterion and/or the pattern of movements may be stored in stylus 105 or paired device 115. A predetermined stylus gesture may include, for example, side-to-side movements of stylus 105 in a plane substantially parallel to surface 110 and up and down (relative to surface 110) shaking movements of stylus 105. In some embodiments, predefined functionalities may be triggered by moving stylus 105 relative to surface 110 to generate a writing input on surface 110. In some embodiments, predefined functionalities may be triggered by moving stylus 105 relative to surface 110 in accordance with a predetermined stylus gesture and, at a different time, moving stylus 105 relative to surface 110 to generate a writing input on surface 110.

Figure 16B:
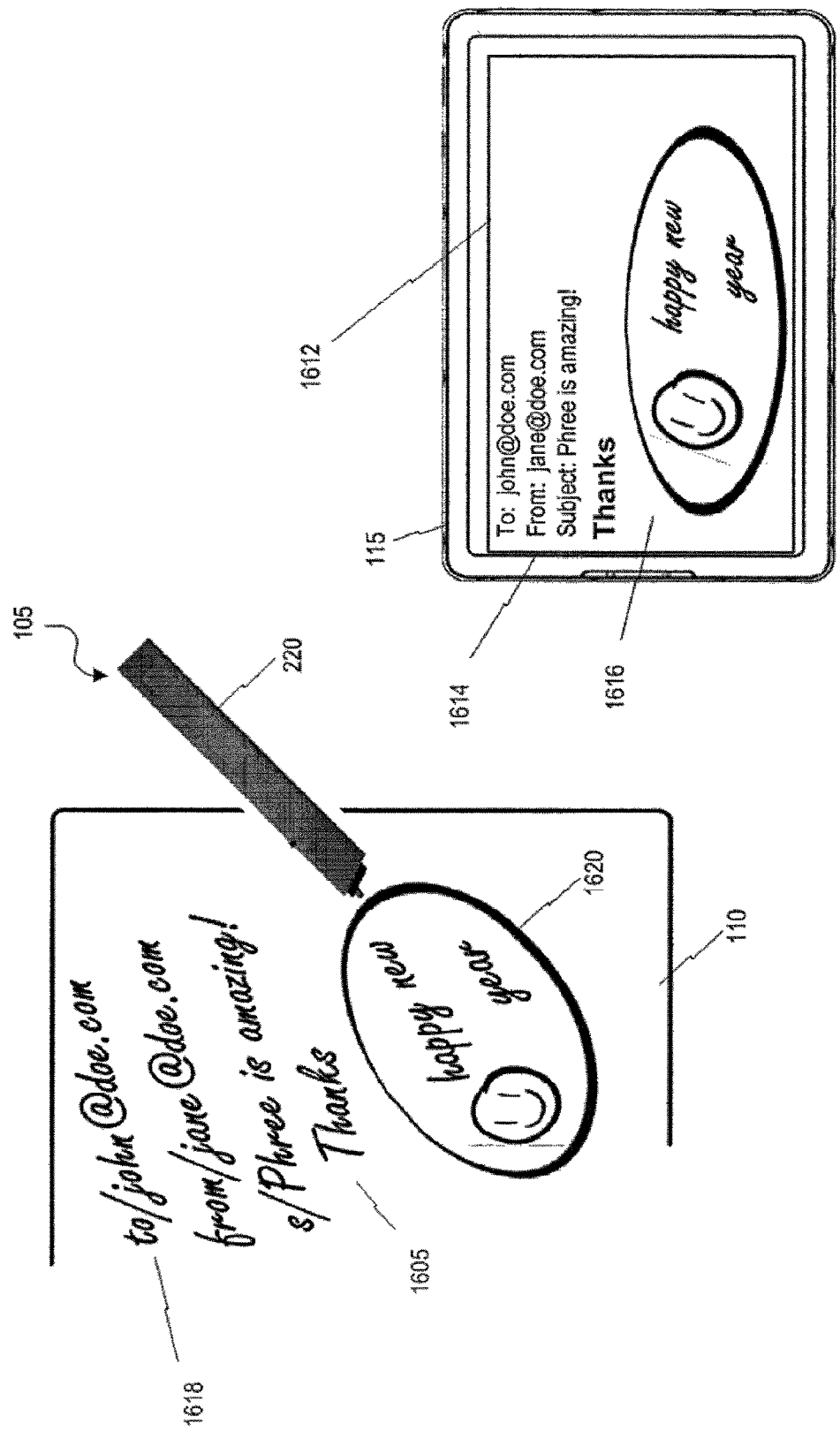
FIG. 16B is a schematic illustration that depicts examples of predefined functionalities being triggered by a writing input and by a combination of writing input and a stylus gesture.

FIG. 16A illustrates an example of a predefined functionality being triggered by a stylus gesture, and FIG. 16B illustrates examples of predefined functionalities being triggered by a writing input and by a combination of writing input and a stylus gesture.

FIG. 16A is a diagrammatic representation of user 100 (not shown in FIG. 16A) moving stylus 105 relative to surface 110 to generate commands for controlling paired device 115, consistent with disclosed embodiments. In FIG. 16A, paired device 115 displays notification window 1602. Notification window 1602 may be displayed, for example, when an email or a text message is received by paired device 115 and paired device 115 is configured to display a notification window when a new email or a text message is received. Notification window 1602 may include a notification detail 1608, option 1606 configured to close notification window 1602, and option 1604 configured to launch an application or window for responding. In some embodiments, paired device 115 may transmit notification information to stylus 105, and screen 220 of stylus 105 may display a content derived from the information transmitted by paired device 115. In FIG. 16A, "new email" notification is transmitted to stylus 105 from paired device 115, and screen 220 of stylus 105 displays the received notification, "new email."

Referring to FIG. 16A, user 100 may interact with paired device 115 to select one of the available options. User 100 may make the selection by interacting directly with paired device 115, for example, using a touch-sensitive screen of paired device 115 or by interacting indirectly using other input options, such as a mouse, a keyboard, button, or any other input options paired device 115 may provide.

Alternatively, user 100 may also make the selection by moving stylus 105 relative to surface 110. For example, when stylus 105 is moved relative to surface 110, processor 250 may send to paired device 115, via the transmitter, information representing a stylus gesture, and the stylus gesture may correspond to one or more predefined functionalities of paired device 115. Therefore, when paired device 115 receives the transmitted information representing the stylus gesture, the corresponding predefined functionalities may be executed on paired device 115.

Referring to FIG. 16A, user 100 is moving stylus 105 side-to-side in a plane parallel to surface 110 in an attempt to select option 1604 to launch an application or window for responding. In response to the movement of stylus 105, processor 250 may send to paired device 115, via the transmitter, the stylus gesture information associated with stylus 105 moving side-to-side in a plane parallel to surface 110. In the example of FIG. 16A, the stylus gesture corresponds to a functionality that launches an application for responding. In an alternative example, the stylus gesture may correspond to a functionality that emulates user 100 who is directly interacting with paired device 115 to select option 1604 to launch an application or window for responding.

FIG. 16B is another diagrammatic representation of user 100 (not shown) moving stylus 105 relative to surface 110 to generate commands for controlling paired device 115, consistent with disclosed embodiments. FIG. 16B shows stylus 105 and paired device 115 of FIG. 16A after user 100 selects option 1604 to launch an application or window for responding. Paired device 115 now shows response window 1612. Response window 1612 may include metadata section 1614 and message section 1616. Metadata section 1614 may include a plurality of text fields, including, for example, a text field to enter the recipient email address and a text field to enter the subject of the message.

Without being able to execute predefined functionalities on paired device 115 using stylus 105, user 100 may need to first select one of the text fields using a keyboard connected to paired device 115 or touch screen of paired device 115 prior to entering the desired text. In some examples, this may be done by pressing a "Tab" key on the keyboard or by touching one of the text fields on the touch screen of paired device 115. Once the text field is selected, user 100 may use stylus to enter the desired text into the selected text field. Paired device 115, upon receiving information corresponding to a stylus gesture, may be configured to execute the functionality of selecting one of the text fields on paired device 115.

In some embodiments, the information transmitted to paired device 115 may correspond to a writing input, and a portion of the text determined from the writing input may correspond to a predefined functionality on paired device 115. In the example of FIG. 16B, user 100 generates writing input by writing text 1618 on surface 110 using stylus 105. When paired device 115 receives the writing input from stylus 105, text data may be determined from the writing input using, for example, hand writing recognition software. In the example of FIG. 16B, the determined text is "to/john@doe.com," and the portion of the text "to/" corresponds to a predefined functionality that inserts the text that follows the portion of the text "to/" into the recipient text field of the email application.

In some embodiments, the information transmitted to paired device 115 may include information representing a stylus gesture in addition to the information representing writing input. In these embodiments, paired device 115 may determine the text from the writing input using, for example, a hand writing recognition software, and the determined text may correspond to one or more predefined functions of paired device 115. The presence of the information representing the stylus gesture may cause paired device 115 to execute predefined functionality that corresponds to the stylus gesture and the information representing the writing input may be used as parameters for the executed functionality.

In an example shown in FIG. 16B, user 100 generates writing input by writing handwritten text 1605, "Thanks," on surface 110 using stylus 105. When paired device 115 receives the writing input from stylus 105, text data "Thanks" may be determined using, for example, handwriting recognition software. Since the text data does not contain a portion that corresponds to a predetermined functionality and paired device 115 did not receive information representing a stylus gesture, the text may simply be displayed on paired device 115.

In another example shown in FIG. 16B, user 100 moves stylus 105 in accordance with a predetermined stylus gesture, such as shaking stylus 105 up and down relative to surface 110, and subsequently moves stylus 105 to generate a writing input by writing handwritten drawing 1620 on surface 110. When paired device 105 receives both the information representing a stylus gesture and the information representing writing input, paired device 105 may execute a functionality that corresponds to the stylus gesture, using the writing input as parameters for the functionality. In FIG. 16B, the functionality corresponding to the stylus gesture is the functionality to insert the received writing input as a picture rather than text. Therefore, the writing input corresponding to text 1620 is displayed as-drawn on surface 110 without being converted to text.

In related embodiments, the writing input may be analyzed by processor 250 to dynamically identify and execute functionalities on paired device 115. For example, when user 100 moves stylus 105 in accordance with a predetermined stylus gesture, and subsequently moves stylus 105 to generate the writing input of "when was the last email sent by the same sender?," paired device 115 may determine one or more functionalities that need to be executed based on the writing input. In the example, the functionalities may include a functionality to open an email application and a functionality to search emails based on the sender.

Figure 17:
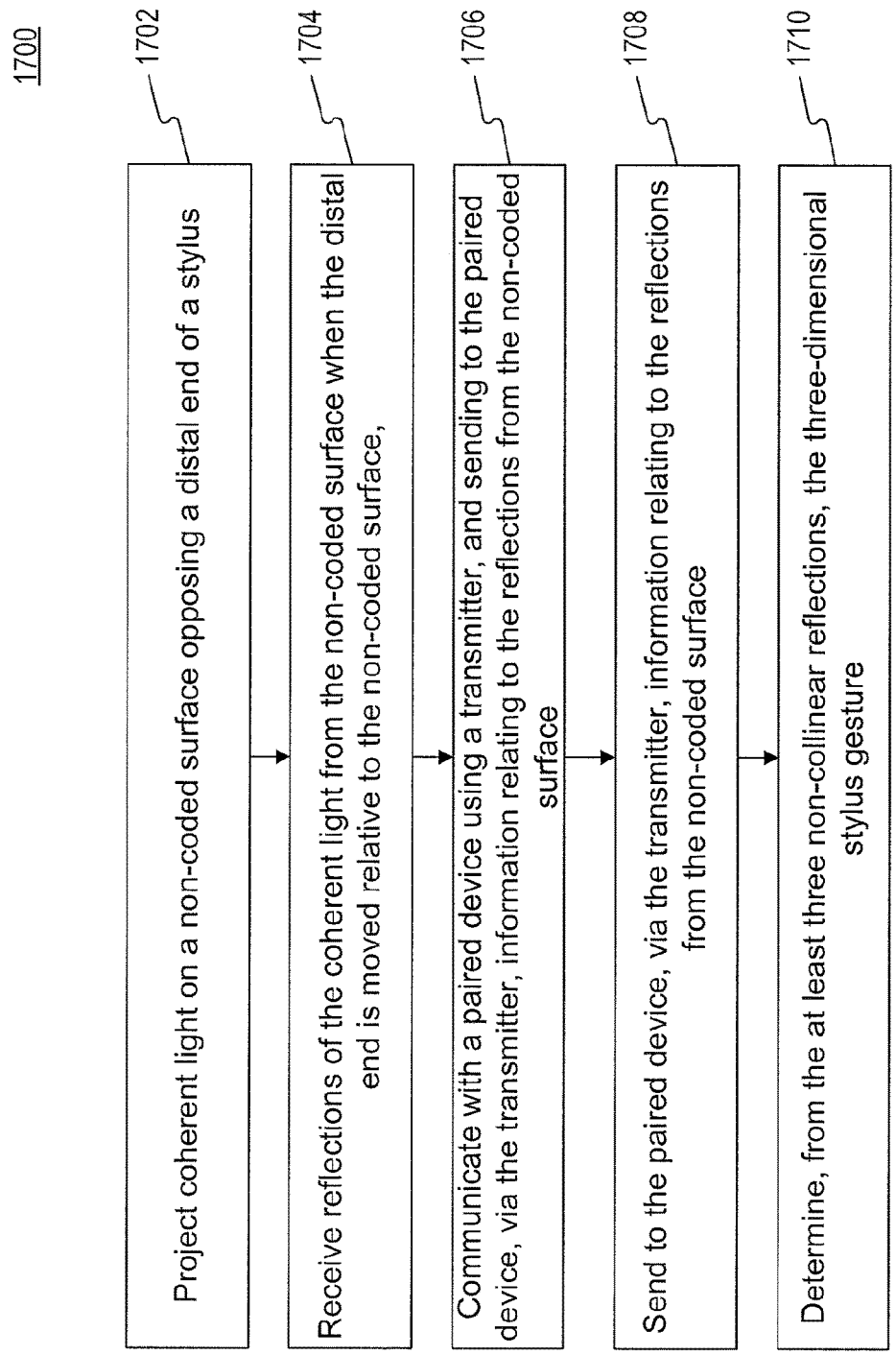
FIG. 17 is a flow diagram of an exemplary process for triggering predefined functionality in a paired device, consistent with disclosed embodiments.

FIG. 17 is a flow diagram showing an exemplary process 1700, consistent with disclosed embodiments. At step 1702, light source 300 may project coherent light 400 on non-coded surface 110 opposing distal end 125 of stylus 105. At step 1704, at least one sensor 200 may receive reflections of coherent light 400 from non-coded surface 110 when distal end 125 is moved relative to the non-coded surface 110. At step 1706, transmitter of stylus 105 may communicate with a paired device 115. At step 1708, at least one processor may send to paired device 115, via transmitter, information relating to the reflections from non-coded surface 110. In some embodiments, transmitter may communicate with the paired device over a short-range communication protocol. A short-range communication protocol may be, for example, Bluetooth. The information may represent a stylus gesture that corresponds to at least one predefined function of paired device 115, such that transmittal of the information to the paired device causes the paired device to execute the predefined function. In embodiments where the predefined functionality relates to initiating a communication session, the information transmitted by stylus 105 may also include identification of an individual with contact information stored in the paired device, and the stylus gesture may be transmitted to the paired device in order to cause the paired device to initiate a communication session with the individual.

In some embodiments, the received reflections may include at least three non-collinear reflections of the coherent light from the non-coded surface. In these embodiments, the stylus gesture may be three-dimensional, and at an optional step 1710, processor may determine three-dimensional stylus gesture from the at least three non-collinear reflections. Furthermore, the reflections may include first reflections corresponding to movement of the distal end in contact with the opposing surface and second reflections corresponding to movement of the distal end out of contact with the opposing surface, and the information relating to reflections sent to the paired device may correspond to both the first reflections and the second reflections. In some embodiments, the reflections may correspond to at least one of text input and graphical input.

In some embodiments, stylus 105 may control a plurality of devices. Several motivations may exist for providing stylus 105 the capability to control the plurality of devices. For a device without a remote control capability, stylus 105 may enable user 100 to control the device without being physically near the device. For a device with a remote control capability, stylus 105 may provide a more convenient and efficient method of controlling the device than the existing remote control capabilities. For example, stylus 105 may provide a better user experience when entering text and/or authenticating the user. Additionally, user 100 may discard or store away a plurality of remote controlling devices and use a single stylus 105 to control all devices.

According to a disclosed embodiment, a stylus for controlling a plurality of unrelated devices is provided. The stylus may include a housing having a distal end configured for movements on a plurality of differing non-coded surfaces constructed of differing materials, at least one sensor in the housing configured to detect in three dimensions the movements when the distal end is in contact with at least one of the plurality of non-coded surfaces and when the distal end is out of contact with the at least one non-coded surface, and a transmitter configured to selectively communicate with the plurality of unrelated devices. The stylus may further include at least one processor. In some embodiments, the at least one processor may be configured to enable the transmitter to be selectively and wirelessly paired with the plurality of unrelated devices, and based on a selection by a user, control, with movements of the distal end, at least one of the plurality of unrelated devices. The processor may be further configured to receive a user-selection of an unrelated device that the user desires to control using movements of the distal end, determine control commands for the selected unrelated device from user movements of the distal end relative to the at least one non-coded surface, instruct the transmitter to communicate with the selected unrelated device, and send, via the transmitter, the movements-based control commands to the selected unrelated device to thereby permit control of the selected unrelated device based on the movements relative to the at least one non-coded surface. In some embodiments, the stylus may further include a screen on the housing. The screen may be configured to display a selected one of the plurality of unrelated devices currently paired to the stylus.

In some embodiments, the transmitter is further configured to send data representing at least some of the user movements using a short-range communication protocol. In an example, the short-range communication protocol may be a Bluetooth protocol. In some embodiments, during a pairing process with an unrelated device, the at least one processor may be further configured to determine, from the user movements, a pairing code to authenticate the connection.

In some embodiments, the at least one processor may be further configured to determine the control command based on a combination of movements on the at least one non-coded surface and movements above the at least one non-coded surface.

In some embodiments, the at least one processor may be further configured to identify the selected unrelated device based on a pattern of movements relative to the at least one non-coded surface.

In some embodiments, the at least one processor may be further configured to identify the selected unrelated device based on input from at least one of: a button, a microphone, a touch screen, and a scroll wheel on the housing.

In some embodiments, the at least one processor may be further configured to enable a common pattern of movements relative to the at least one non-coded surface to control the plurality of unrelated devices.

In some embodiments, the at least one processor may be further configured to receive a first input representing a selection of a device from among the plurality of unrelated devices, and a second input representing a control command for the selected device. The first input and the second input may both be determined based on the movements relative to the at least one non-coded surface. In an example, the second input may include writing input.

According to another disclosed embodiment, a control device may include at least one processor. In some embodiments, the at least one processor may be configured to receive from at least one sensor in a stylus, signals representing three dimensions of movements of a distal end of the stylus. The three dimensions of movements may include movements when the distal end is in contact with at least one non-coded surface and movements when the distal end is out of contact with the at least one non-coded surface. The at least one processor may be further configured to control a transmitter for wirelessly communicating with a plurality of unrelated devices, and based on a selection by a user, selectively control, with movements of the distal end, at least one of the plurality of unrelated devices, receive a user-selection of an unrelated device that the user desires to control using movements of the distal end, determine control commands for the selected unrelated device from user movements of the distal end relative to the at least one non-coded surface, and send, via the transmitter, the movements-based control commands to the selected unrelated device to thereby permit control of the selected unrelated device based on the movements relative to the at least one non-coded surface.

In some embodiments, the at least one processor is further configured to determine the control commands based on a combination of movements on the at least one non-coded surface and movements above the at least one non-coded surface.

In some embodiments, the at least one processor is further configured to identify the selected unrelated device based on a pattern of movements relative to the at least one non-coded surface.

In some embodiments, the at least one processor is further configured to identify the selected unrelated device based on input from at least one of a button, a microphone, a touch screen, and a scroll wheel on the stylus.

In some embodiments, the at least one processor is further configured to cause displaying on a screen on the stylus an indication of the device currently paired to the stylus.

In some embodiments, the at least one processor is further configured to receive a first input representing a selection of a device from among the plurality of unrelated devices, and a second input representing a control command for the selected device.

In some embodiments, the at least one processor is further configured to determine the first input and the second input based on the changing positions of the distal end relative to the at least one non-coded surface.

According to yet another disclosed embodiment, a software product stored on a non-transitory computer readable medium and comprising computer implementable instructions for carrying out a method for controlling a plurality of unrelated devices is provided. The method may include detecting three dimensional movements of a distal end of a stylus, wherein the three dimensional movements include movements when the distal end is in contact with at least one non-coded surface and movements when the distal end is out of contact with the at least one non-coded surface. The method may further include enabling a transmitter to be selectively and wirelessly paired with the plurality of unrelated devices, and based on a selection by a user, controlling, with movements of the distal end, at least one of the plurality of unrelated devices, receiving a user-selection of an unrelated device that the user desires to control using movements of the distal end, determining control commands for the selected unrelated device from user movements of the distal end relative to the at least one non-coded surface, instructing the transmitter to communicate with the selected unrelated device, and sending the movements-based control commands to the selected unrelated device to thereby permit control of the selected unrelated device based on the movements relative to the at least one non-coded surface. In some embodiments, the transmitter may be further configured to send data representing at least some of the user movements using a Bluetooth protocol. In some embodiments, the method may further include identifying the selected unrelated device based on a pattern of movements relative to the at least one non-coded surface.

A device may be available to be controlled by stylus 105 if the device is capable of communicating with stylus 105. For example, a device may be available to be controlled by stylus 105 if the device and stylus 105 support the same or otherwise compatible communication protocol and are in range of each other's wireless signal coverage. In some examples, the communication protocol may be a short-range communication protocol, such as Bluetooth, infrared, Wi-Fi, Li-Fi, near field communication, ultraband, and Zigbee.

In some embodiments, the available devices may be unrelated to each other. For example, the available devices may be a plurality of devices chosen from two or more device categories. Device categories may include, but not limited to, mobile devices (e.g., smartphone, smartwatch, and tablet), entertainment devices (e.g., television, sound receiver, CD/DVD player, and game console), and home appliances (e.g., refrigerator, kitchen stove, home security system, and web camera).

Figure 18:
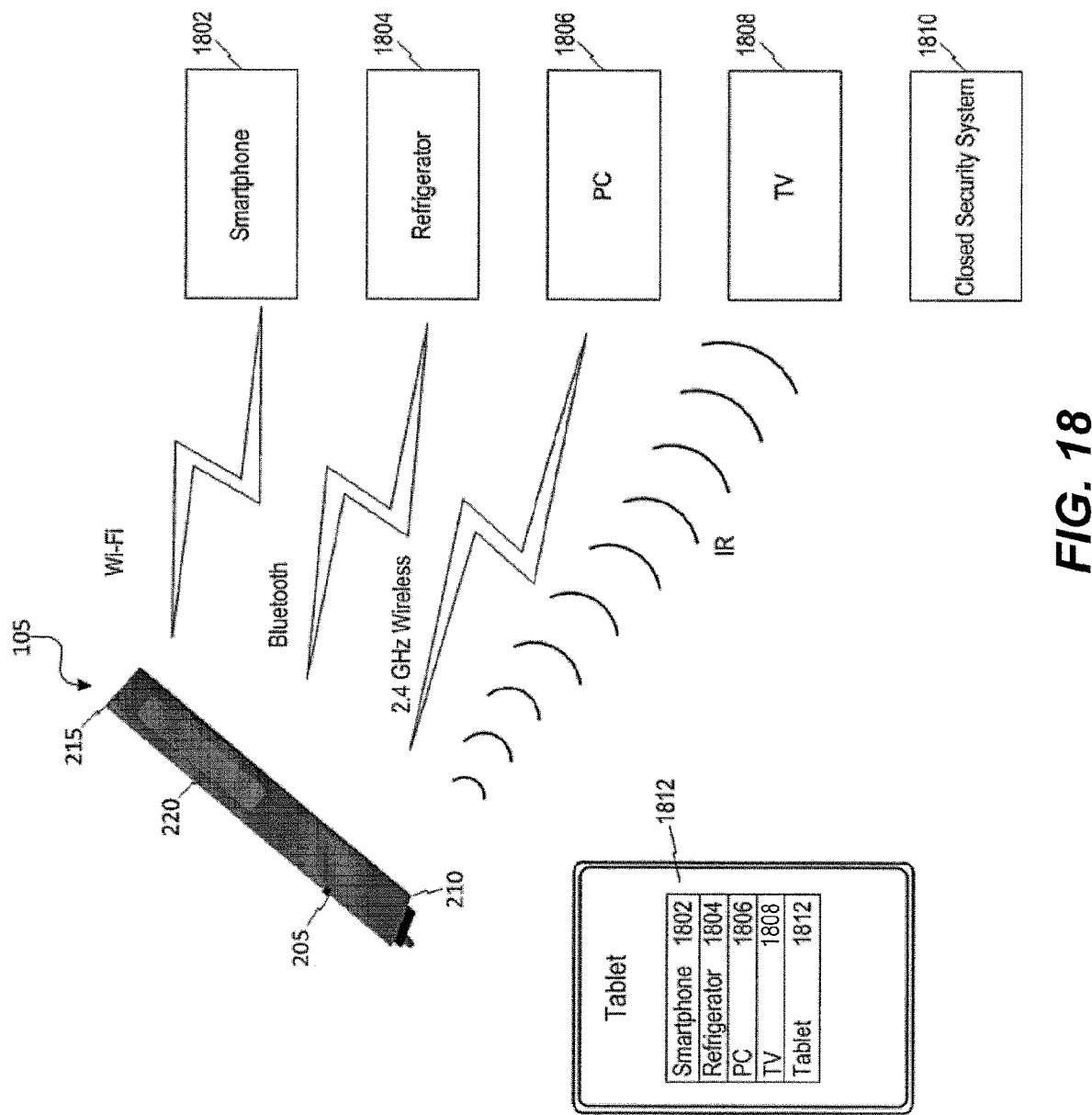
FIG. 18 is a schematic illustration of the example stylus shown in FIG. 1 controlling a plurality of unrelated devices, according to disclosed embodiments.

FIG. 18 shows stylus 105 and devices 1802, 1804, 1806, 1808, and 1810. Devices 1802, 1804, 1806, and 1808 may represent devices that are available to be paired, and already paired device 1812 may represent a device that is unavailable to be paired.

In the example shown in FIG. 18, device 1802 is a smartphone with Wi-Fi capability, available device 1804 is a refrigerator with Bluetooth capability, device 1806 is a personal computer with a 2.4 GHz wireless capability, and device 1808 is a television with an infrared capability. Device 1810 is a security system where the device does not have any wireless capability. Paired device 1812 may be any device that is currently paired.

In some embodiments, processor 250 may enable transmitter 225 to be selectively and wirelessly paired with a plurality of unrelated devices. In these embodiments, it is understood that transmitter 225 is not required to be concurrently paired with two or more of the plurality of unrelated devices. Instead, processor 250 may cause transmitter 225 to be paired with two or more unrelated devices. In some examples, processor 250 may enable transmitter 225 to be paired with one device, and at the same time, enable transmitter 225 to initiate pairing with another unrelated device. In other examples, processor 250 may enable transmitter 225 to be paired with one device, and at the same time, enable transmitter 225 to listen for requests from other unrelated devices. In some embodiments, user 100 may use stylus 105 to select one or more available devices to control. In some examples, user 100 may make the selection by moving stylus 105 in accordance with a predetermined stylus gesture or by moving stylus 105 to generate a writing input. The predetermined stylus gesture and the writing input may each correspond to a control command for the selected available device.

In another example, user 100 may make the selection and send control commands by moving stylus 105 in accordance with a predetermined stylus gesture, and at a different time, moving stylus 105 to generate a writing input. In the example, the stylus gesture may represent an available device that is selected to be controlled and the writing input may correspond to a control command for the selected device. In yet another example, user 100 may make the selection based on a predetermined pattern of stylus movement relative to surface 110.

In some embodiments, user 100 may make the selection using button 205, microphone 210, speaker 215, screen 220 (e.g., a touchscreen), or a combination thereof. In some embodiments, button 205 may take the form of one or more press buttons, switches, touch sensitive controls, scroll wheels, and the like. In some embodiments, screen 220 of stylus 105 may display one or more available devices that are selected by user 100. In some embodiments, screen 220 of stylus 105 may display one or more available devices that are currently paired to stylus 105.

Referring to the example of FIG. 18, user 100 (not shown) may use button 205, microphone 210, speaker 215, or screen 220 on stylus 105 to select one of the available devices 1802, 1804, 1806, 1808, and 1812. (Paired device 1812 may also be considered an available device.)

In some embodiments, user 100 may use one of the paired devices to select one or more devices to control. For example, one of the paired devices may display a list of devices that are available to be controlled using stylus 105. User 100 may select one or more devices directly by using, for example, a touchscreen or microphone of the paired device or indirectly by using any available input devices connected to the paired device, such as a keyboard and a mouse. In some examples, the paired device may be physically attached to stylus 105 and configured to communicate (wired or wirelessly) with stylus 105.

Referring to FIG. 18, user 100 may use paired device 1812 to select one of the available devices 1802, 1804, 1806, 1808, and 1812. For example, paired device 1812 shows a list of available devices including devices 1802, 1804, 1806, 1808, and 1812. User may use the touchscreen of the paired tablet device 1812 to select one or more devices in the list.

A device that is available to be controlled by stylus 105 may or may not be paired with stylus 105 prior to being controlled. In examples where user 100 selects a device that is not paired with stylus 105, a pairing process may be initiated after the selection. The pairing process may involve a process to authenticate the connection between stylus 105 and the selected, unpaired device.

The authentication process may ensure that the attempted pairing of stylus 105 with the selected device is approved by user 100. In an example, the authentication process may include a process to verify that user 100 has physical access to both stylus 105 and the device to be paired. One example process for verifying that user 100 has physical access to both stylus 105 and the device to be paired is to generate a pairing code on stylus 105 and to have user 100 verify the pairing code on the device to be paired. User 100 may verify the pairing code by inputting the pairing code on the device to be paired using a preapproved input device, such as a keyboard, a touchscreen, or a mouse. In some examples, the generated pairing code may be displayed on screen 220 of stylus 105. In some embodiments, stylus 105 may generate the pairing code based on the movements of stylus 105 relative to surface 110.

Figure 19:
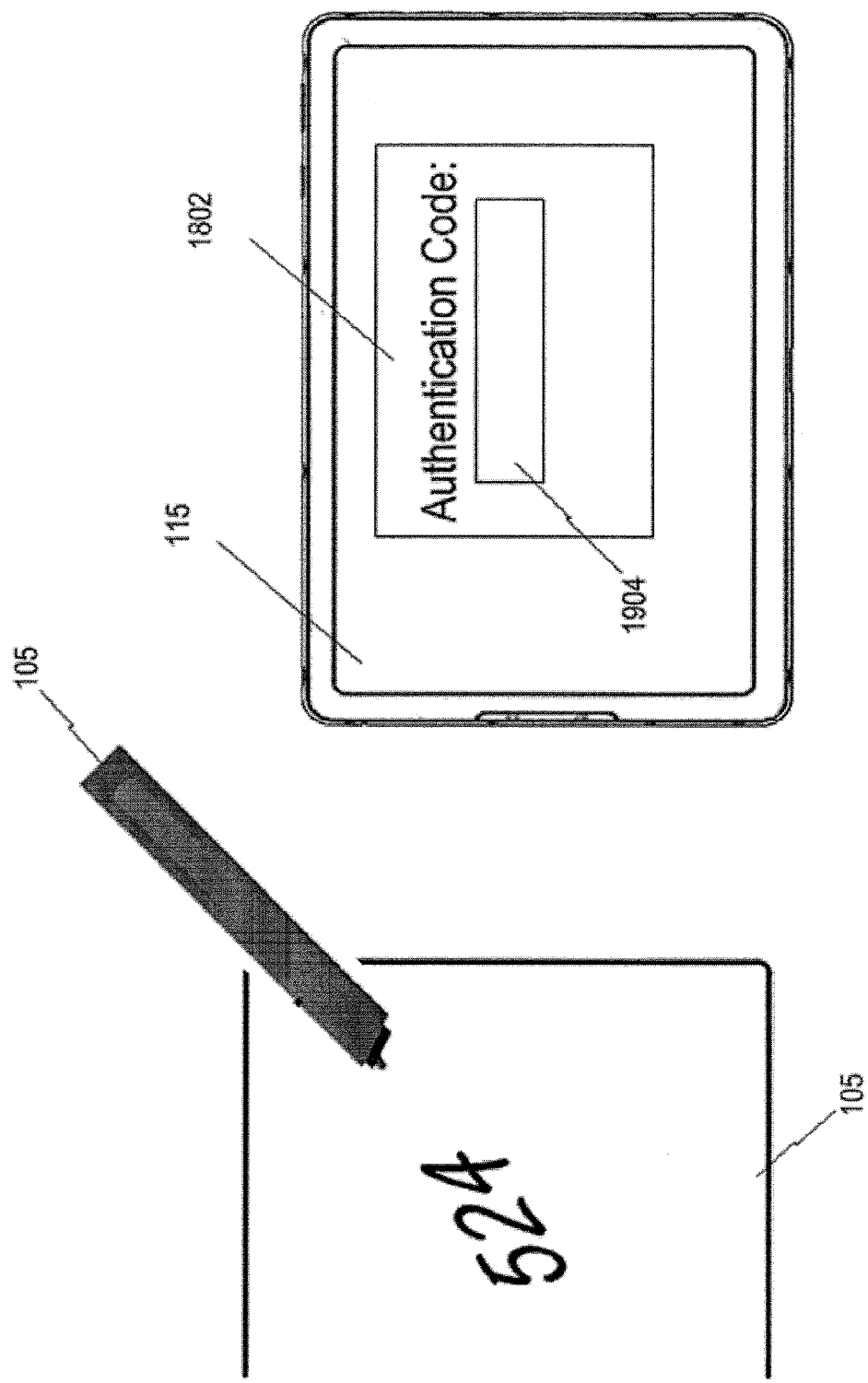
FIG. 19 is a schematic illustration of the example stylus shown in FIG. 1 initiating an exemplary authentication process to pair with a device.

FIG. 19 illustrates an exemplary authentication process initiated after user 100 (not shown) selects device 1802 of FIG. 18 to control. In this example, device 1802 of FIG. 18 is not paired with stylus 105 at the time of the selection, and an authentication process is initiated. FIG. 19 shows stylus 105, selected device 1802, and surface 110, which includes a hand written authentication code "524." User 100 may authenticate the pairing of device 1802 and stylus 105 by entering the authentication code "524" in text field 1904 of device 1802. Alternatively, user 100 may authenticate the pairing of device 1802 and stylus 105 by using stylus 105 to enter an authentication code presented on the display of paired device 115.

In some embodiments, stylus 105 may have been previously paired with the selected, now unpaired device. In these examples, the authentication process may be performed without any participation from user 100 after the selection. Additionally, the authentication may use information stored on the selected device to authenticate the connection. For example, a pairing code used during the prior authentication session may be stored on the previously paired device, and the stored pairing code may be used again to initiate the pairing with stylus 105.

In some embodiments, user 100 may unselect one or more devices that are paired and currently being controlled with stylus 105. In these examples, stylus 105 may cease to control the unselected devices, however, stylus 105 and the devices may remain paired. Alternatively, the pairing may be terminated once stylus 105 ceases to control the unselected devices.

Once user 100 selects a device to be controlled and the device is paired with stylus 105, user 100 may control the device by moving stylus 105 relative to surface 110. In some examples, surface 110 may include a plurality of non-coded surfaces constructed of differing materials. In some embodiments, sensor 200 of stylus 105 may detect the movements in three dimensions when user 100 moves stylus 105 relative to surface 110. The movements may involve distal end 125 of stylus 105 being in contact with surface 110 and/or distal end 125 of stylus 105 being out of contact with surface 110. In some embodiments, the movements may be a combination of movements on and above surface 110.

In some embodiments, stylus 105 may send a first input representing a selection of a device from among the plurality of unrelated devices, and a second input representing a control command for the selected device.

Once the movements are detected by sensor 200, processor 250 may determine control commands in the selected device that corresponds to the detected movements. Subsequently, stylus 105 may send the determined control commands to the selected device.

In some embodiments, the control commands may be generic control commands applicable to a wide range of devices. Generic control commands may include, for example, commands to power on/off. In other embodiments, the control commands may be unique to a category of devices. For example, the commands for entertainment devices may include, for example, commands to play, pause, stop, and change volume. In yet another example, the control commands may be unique to a device. For example, the control commands for a brand "A" smartphone may include commands to launch an application that is only available on the brand "A" smartphone.

It is understood that the same movements may correspond to different control commands for two different devices. For example, when user 100 selects a first device to control and moves stylus 105, a first set of control commands may be sent to the first device. However, when user 100 selects a second device to control and moves stylus 105 in the same manner, a second set of control commands may be sent to the second device. In some embodiments, user 100 may select a plurality of devices to control. In these embodiments, control commands sent to selected devices may not be the same, even though the movement detected by stylus 105 is the same. For example, when user 100 moves stylus 105, a first set of commands may be sent to a selected first device and a second set of commands may be sent to a second selected device. In alternative embodiments, control commands sent to the selected device may be the same. In these embodiments, the control commands may be applicable to all selected devices. For example, user 100 may select a plurality of entertainment devices to control, and control commands to mute sound may be sent to all selected devices.

In some embodiments, processor may instruct transmitter 225 to communicate with selected device. For example, processor may instruct transmitter 225 to send a preamble message to prepare the selected device for two-way communication. Subsequently, processor may send, via transmitter 225, the determined control commands to the selected device(s).

Figure 20:
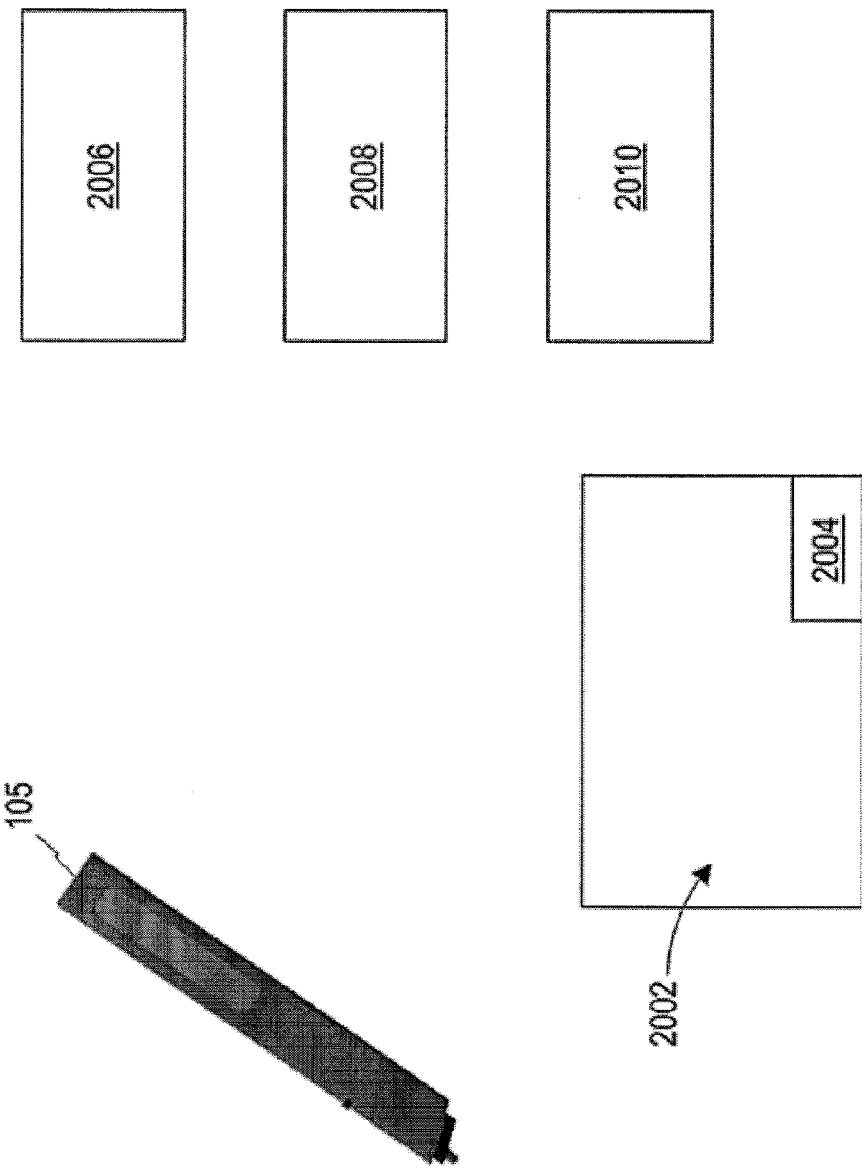
FIG. 20 is a block diagram showing a control device configured to control a plurality of unrelated devices.

FIG. 20 is a block diagram showing stylus 105, control device 2002, and a plurality of devices 2006, 2008, and 2010. According to a disclosed embodiment, control device 2002 may include at least one processor 2004. In some embodiments, the at least one processor may be configured to receive from at least one sensor in a stylus, signals representing three dimensions of movements of a distal end of the stylus. The three dimensions of movements may include movements when the distal end is in contact with at least one non-coded surface and movements when the distal end is out of contact with the at least one non-coded surface. The at least one processor may be further configured to control a transmitter for wirelessly communicating with a plurality of unrelated devices, and based on a selection by a user, selectively control, with movements of the distal end, at least one of the plurality of unrelated devices, receive a user-selection of an unrelated device that the user desires to control using movements of the distal end, determine control commands for the selected unrelated device from user movements of the distal end relative to the at least one non-coded surface, and send, via the transmitter, the movements-based control commands to the selected unrelated device to thereby permit control of the selected unrelated device based on the movements relative to the at least one non-coded surface.

In the example of FIG. 20, control device 2002 is separate from stylus 105 and the plurality of unrelated devices. However, control device 2002 may be a part of stylus 105 in some embodiments. Alternatively, control device 2002 may be a part of one of the plurality of unrelated devices.

Figure 21:
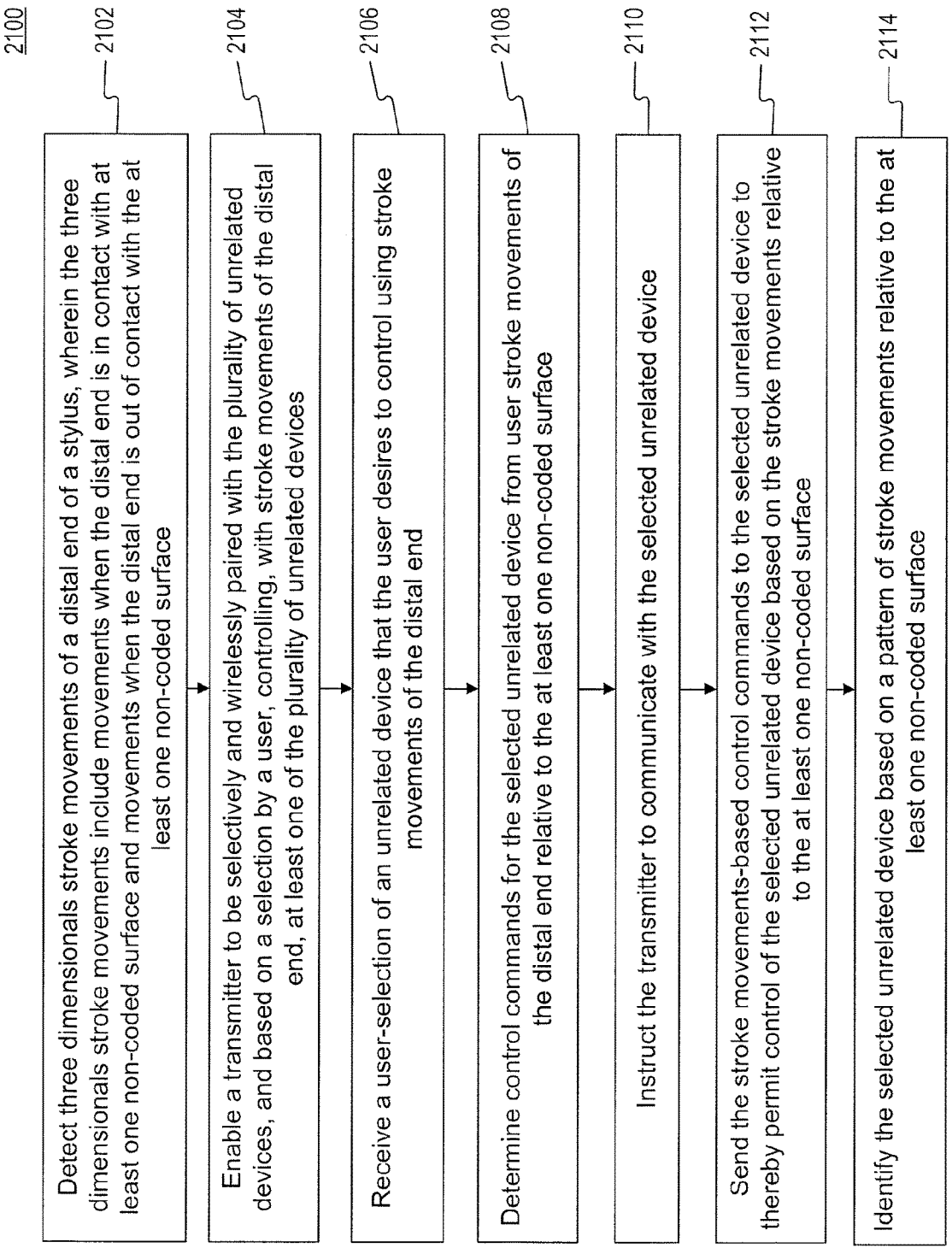
FIG. 21 is a flow diagram of an exemplary process for controlling a plurality of unrelated devices, consistent with disclosed embodiments.

FIG. 21 is a flow diagram of process 2100 for controlling a plurality of unrelated devices, consistent with disclosed embodiments. In an example, process 2100 may be carried out using a software product stored on a non-transitory computer readable medium, and the software product may include data and computer implementable instructions for carrying out process 2100. At step 2102, sensor 200 may detect three dimensional movements of a distal end of a stylus. The three dimensional movements include movements when the distal end is in contact with at least one non-coded surface and movements when the distal end is out of contact with the at least one non-coded surface. At step 2104, processor 250 may enable a transmitter to be selectively and wirelessly paired with the plurality of unrelated devices, and based on a selection by a user, controlling, with movements of the distal end, at least one of the plurality of unrelated devices. At step 2106, processor 250 may receive a user-selection of an unrelated device that the user desires to control using movements of the distal end. At step 2108, processor 250 may determine control commands for the selected unrelated device from user movements of the distal end relative to the at least one non-coded surface. At step 2110, processor 250 may instruct the transmitter to communicate with the selected unrelated device. At step 2112, processor 250 may send the movements-based control commands to the selected unrelated device to thereby permit control of the selected unrelated device based on the movements relative to the at least one non-coded surface. In some embodiments, the transmitter may be further configured to send data representing at least some of the user movements using a Bluetooth protocol. At an optional step 2114, processor 250 may identify the selected unrelated device based on a pattern of movements relative to the at least one non-coded surface.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices; for example, hard disks, floppy disks, or CD ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A stylus for generating writing input, the stylus comprising:
   an elongated body having a distal end;
   a light source configured to project coherent light on an opposing surface adjacent the distal end;
   at least one sensor including at least three pairs of light detectors and configured to coherently detect first reflections of the coherent light from the opposing surface while the distal end moves in contact with the opposing surface, and to coherently detect second reflections of the coherent light from the opposing surface while the distal end moves above the opposing surface and out of contact with the opposing surface, wherein the at least one sensor is further configured to generate at least one data stream indicative of changes in the first reflections and changes in the second reflections as detected by the at least three pairs of light detectors; and
   at least one processor configured to receive the at least one data stream from the at least one sensor and to enable determination of three dimensional movement of the distal end from the changes in first reflections and the changes in second reflections.

2. The stylus of claim 1, wherein determining three dimensional movement of the distal end includes determining an incremental position change of the distal end in three orthogonal directions.

3. The stylus of claim 1, wherein the at least three pairs of light detectors are arranged in a substantially co-planar relationship with respect to each other and each pair is configured to detect a differing reflection of the coherent light.

4. The stylus of claim 1, wherein the at least one data stream includes information from each of the at least three pairs of light detectors, and the at least one processor is configured to determine a different component of the three dimensional movement of the distal end from the information associated with a corresponding pair of light detectors.

5. The stylus of claim 4, wherein the at least one data stream further includes information about detected force above a predetermined threshold applied against the opposing surface by the distal end when it is in contact with the opposing surface.

6. The stylus of claim 1, further including an optical aperture through which the coherent light, the first reflections, and the second reflections are configured to pass, and wherein the optical aperture has an opening size of between about 1.6 mm and about 8 mm.

7. The stylus of claim 1, further including a transmitter configured to transmit data associated with the at least one data stream to a paired device and to thereby cause a display of the writing input on the paired device.

8. The stylus of claim 1, wherein the at least one processor is configured to determine the three-dimensional movement of the distal end when the distal end is spaced between 20 mm and 30 mm from the opposing surface.

9. The stylus of claim 1, wherein an optical power of the light source is between about 50 microwatts and about 1000 microwatts, and the light source is configured to project coherent light having a coherence length of at least about 50 mm and a wavelength between about 650 nm and about 1000 nm.

10. The stylus of claim 1, further including at least one movement sensor and wherein determine the three-dimensional movement of the distal end is based on a combination of an output of the at least one sensor and an output of the at least one movement sensor.

11. The stylus of claim 1, wherein the at least one processor is further configured to:
    determine from the at least one data stream, text input resulting from the three-dimensional movement of the distal end during a first writing input period in a first area of the opposing surface;
    cause text captured during the first writing input period to be presented on a display;
    determine from the at least one data stream, text input resulting from the three-dimensional movement of the distal end during a second writing input period in a second area of the opposing surface; and
    cause text captured during the second writing input period to be contiguously presented on the display with the text captured during the first writing input period despite that the text input during the first writing input period and text input during the second writing input period did not occur contiguously.

12. The stylus of claim 11, wherein the at least one processor is configured to determine the text input during the first writing input period and the text input during the second writing input period in an absence of detection of code on the opposing surface and without detection of physical marks made by the stylus on the opposing surface.

13. The stylus of claim 11, wherein the determined text input from the first area is non-horizontal and wherein causing the text captured during the first writing input period to be presented on the display involves aligning the text input to be presented horizontally.

14. The stylus of claim 11, wherein the determined text input from the first area is a first part of a sentence and the determined text input from the second area is a second part of the sentence, and the at least one processor is further configured to cause the first and second parts of the sentence to be presented in a same line.

15. The stylus of claim 11, wherein the determined text input during the first writing input period occurs along a first azimuth and the determined text input during the second writing input period occurs along a second azimuth, non-aligned with the first azimuth, and wherein the at least one processor is further configured to cause the determined text input during the first and second writing input periods to be displayed along a common azimuth.

16. The stylus of claim 11, wherein the determined text input from the first area has a first character size and the determined text input from the second area has a second character size different from the first character size, and wherein the at least one processor is further configured to cause the first text and the second text to be displayed in a substantially common character size.

17. The stylus of claim 11, wherein the determined text input from the first area has a general first slant and the determined text input from the second area has a general second slant different from the first slant, and wherein the at least one processor is further configured to cause the first text input and the second text input to be displayed at a substantially common slant.

18. The stylus of claim 11, wherein:
- during the first writing period, determine text input resulting from changing positions of the distal end relative to a first surface; and
- during the second writing period, determine text input resulting from changing positions of the distal end relative to a second surface constructed of a material different from a material of the first surface.

19. A device for generating writing input, the device comprising:
- at least one processor configured to:
  - control a light source configured to project coherent light on an opposing surface adjacent a distal end of a stylus;
  - receive from at least one sensor including at least three pairs of light detectors at least one data stream indicative of changes in measurements of first reflections of the coherent light from the opposing surface coherently detected by the at least three pairs of light detectors while the distal end moves in contact with the opposing surface and changes in measurements of second reflections of the coherent light from the opposing surface coherently detected by the at least three pairs of light detectors while the distal end moves above the opposing surface and out of contact with the opposing surface; and
  - enable determination of three-dimensional movement of the distal end from the changes in first reflections and the changes in second reflections.

* * * * *